United States Patent
Misra et al.

(10) Patent No.: US 11,822,038 B2
(45) Date of Patent: *Nov. 21, 2023

(54) SYSTEMS AND METHODS FOR DETERMINING PROPERTIES OF POROUS, FLUID-FILLED GEOLOGICAL FORMATIONS BASED ON MULTI-FREQUENCY MEASUREMENTS

(71) Applicant: Schlumberger Technology Corporation, Sugar Land, TX (US)

(72) Inventors: Siddharth Misra, Austin, TX (US); Dean Homan, Damon, TX (US); Yuteng Jin, Norman, OK (US); John Rasmus, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,985

(22) Filed: Feb. 15, 2021

(65) Prior Publication Data

US 2021/0165121 A1    Jun. 3, 2021

Related U.S. Application Data

(63) Continuation-in-part of application No. 16/940,492, filed on Jul. 28, 2020.
(Continued)

(51) Int. Cl.
*G01V 3/30* (2006.01)
*E21B 47/092* (2012.01)
*G01V 3/26* (2006.01)

(52) U.S. Cl.
CPC .............. *G01V 3/30* (2013.01); *E21B 47/092* (2020.05); *G01V 3/26* (2013.01)

(58) Field of Classification Search
CPC ... G01V 3/30; G01V 3/26; G01V 3/38; E21B 47/092; E21B 49/00
See application file for complete search history.

(56) References Cited

U.S. PATENT DOCUMENTS 3,643,738 A * 2/1972 Dreher .................... E21B 49/00
166/268
10,697,910 B2 * 6/2020 Mitchell .............. G01N 24/081
(Continued)

FOREIGN PATENT DOCUMENTS

CA    2787301 A1 * 7/2011 ............... G01V 3/32
CN    114235641 A * 3/2022
(Continued)

OTHER PUBLICATIONS

CN-114235641-A_Translated (Year: 2022).*
(Continued)

*Primary Examiner* — Alessandro V Amari
*Assistant Examiner* — Michael J Singletary
(74) *Attorney, Agent, or Firm* — Frederick Carbone

(57) ABSTRACT

Aspects of the present disclosure relate to a method for determining a contact angle, a wettability, or both, of one or more types of solid particles within a geological formation. The method may include identifying a relative conductive of the type of solid particles and identifying a frequency range for one or more EM measurements. The method may also include determining a contact angle associated with at least one type of solid particles within the geological formation using the electromagnetic measurements corresponding to the frequency range.

11 Claims, 29 Drawing Sheets

Related U.S. Application Data

(60) Provisional application No. 62/879,882, filed on Jul. 29, 2019.

(56) References Cited

U.S. PATENT DOCUMENTS

| | | | |
|---|---|---|---|
| 2018/0113088 A1* | 4/2018 | Misra | G01V 3/26 |
| 2019/0233713 A1* | 8/2019 | Chawathe | C09K 8/58 |
| 2021/0033746 A1 | 2/2021 | Misra et al. | |

FOREIGN PATENT DOCUMENTS

| | | | | |
|---|---|---|---|---|
| WO | WO-2016176541 A1 * | 11/2016 | | G01N 27/048 |
| WO | WO-2021076529 A1 * | 4/2021 | | |

OTHER PUBLICATIONS

WO-2021076529-A1_Translated (Year: 2021).*
CA-2787301-A1_Translated (Year: 2011).*
WO-2016176541-A1_Translated (Year: 2016).*
Misra, S., Torres-Verdín, C., Revil, A., Rasmus, J., & Homan, D. (2016). Interfacial polarization of disseminated conductive minerals in absence of redox-active species—Part 1: Mechanistic model and validation. Geophysics, 81(2), E139-E157.
Bona, N., Rossi, E., Venturini, C., Capaccioli, S., Lucchesi, M., & Rolla, P. A. (1998). Characterization of rock wettability though dielectric measurements. Revue de l'Institut Français du Pétrole, 53(6), 771-783.
Bona, N., Rossi, E., & Capaccioli, S. (1999). Electrical Measurements in the 100Hz-10GHz for Efficient Rock Wettability Evaluation. In SPE International Symposium on Oilfield Chemistry SPE 50720, Society of Petroleum Engineers (11 pages).
Moss, A. K., Jing, X. D., & Archer, J. S. (2002). Wettability of reservoir rock and fluid systems from complex resistivity measurements. Journal of Petroleum Science and Engineering, 33(1-3), 75-85.
Al-Ofi, S. M., Dyshlyuk, E., Sauerer, B., Valori, A., Ali, F., & Abdallah, W. (Aug. 2018). Correlating Dielectric Dispersion Data and Wettability Index of a Carbonate Rock. In SPE Kingdom of Saudi Arabia Annual Technical Symposium and Exhibition Society of Petroleum Engineers, SPE-192224-MS (20 pages).
Nguyen, B. L., Bruining, J., & Slob, E. C. (Jan. 1999). Effects of wettability on dielectric properties of porous media. In SPE Annual Technical Conference and Exhibition. Society of Petroleum Engineers, SPE56507 (8 pages).
Revil, A., Schmutz, M., & Batzle, M. L. (2011). Influence of oil wettability upon spectral induced polarization of oil-bearing sands. Geophysics, 76(5), A31-A36.
Fiegel, J., Jin, F., Hanes, J., & Stebe, K. (2005). Wetting of a particle in a thin film. Journal of colloid and interface science, 291(2), 507-514.
Grosse et al., (1998) Broad frequency range study of the dielectric properties of suspensions of colloidal polystyrene particles in aqueous electrolyte solutions. Journal of Colloid and interface science, 205(1), 26-41.
Sen, P. et al., (1983) The Frequency dependent dielectric and conductivity response of sedimentary rocks. Journal of microwave power, 18(1), 95-105.
Delgado et al., (1998) The Effect of the concentration of dispersed particles on the mechanisms of low-frequency dielectric dispersion (LFDD) in colloidal suspensions. Colloids and Surfaces A: Physicochemical and Engineeering Aspects, 140(1-3), 139-149.

* cited by examiner

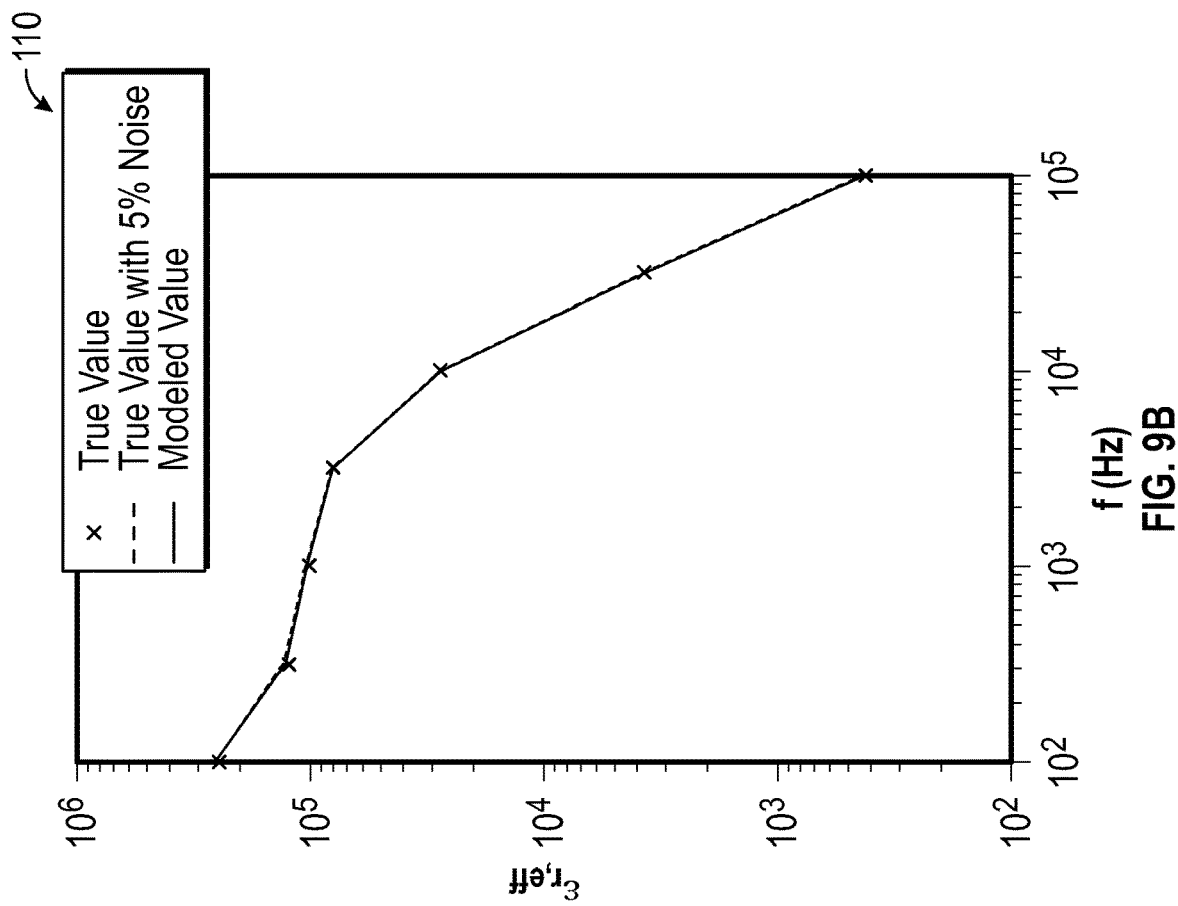
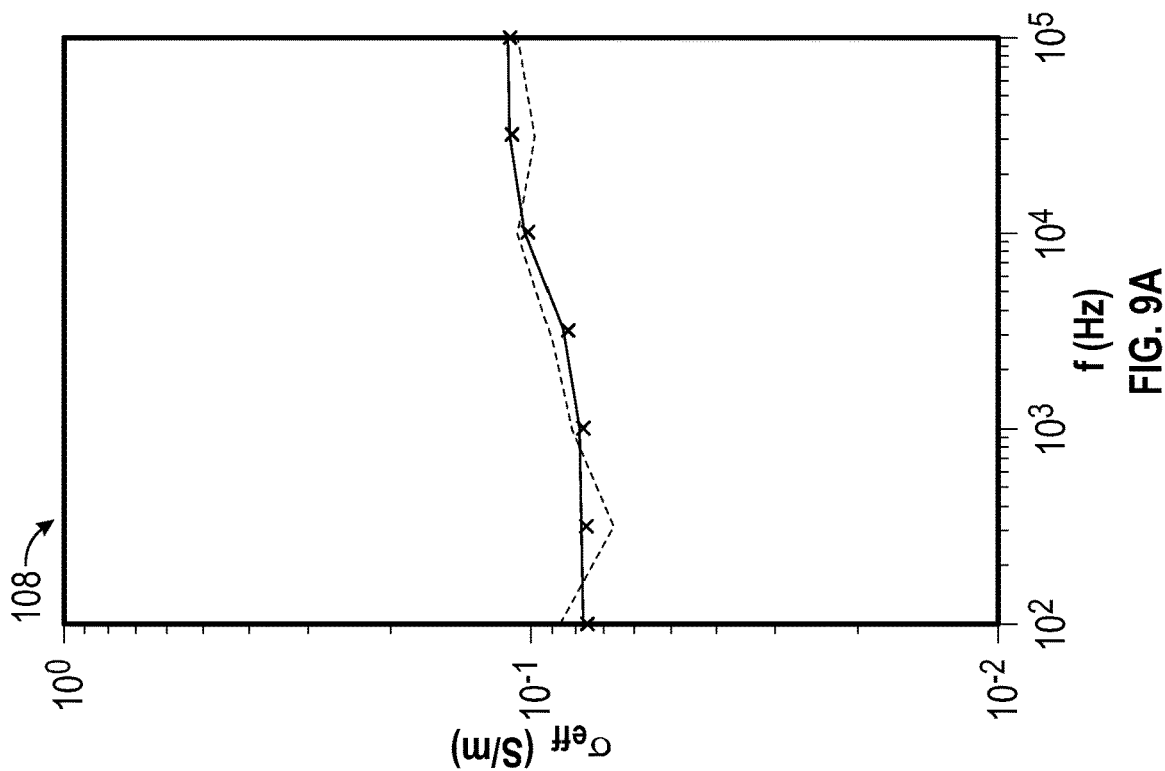
FIG. 9A
FIG. 9B

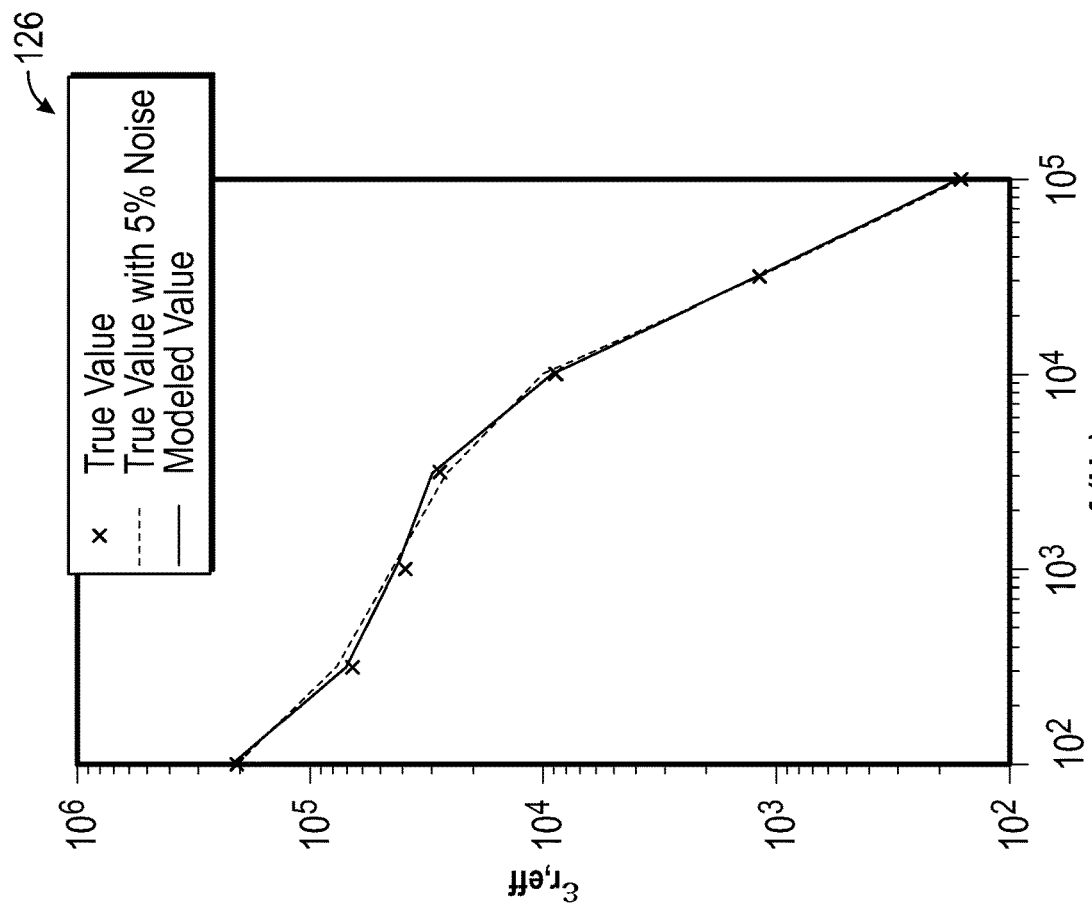
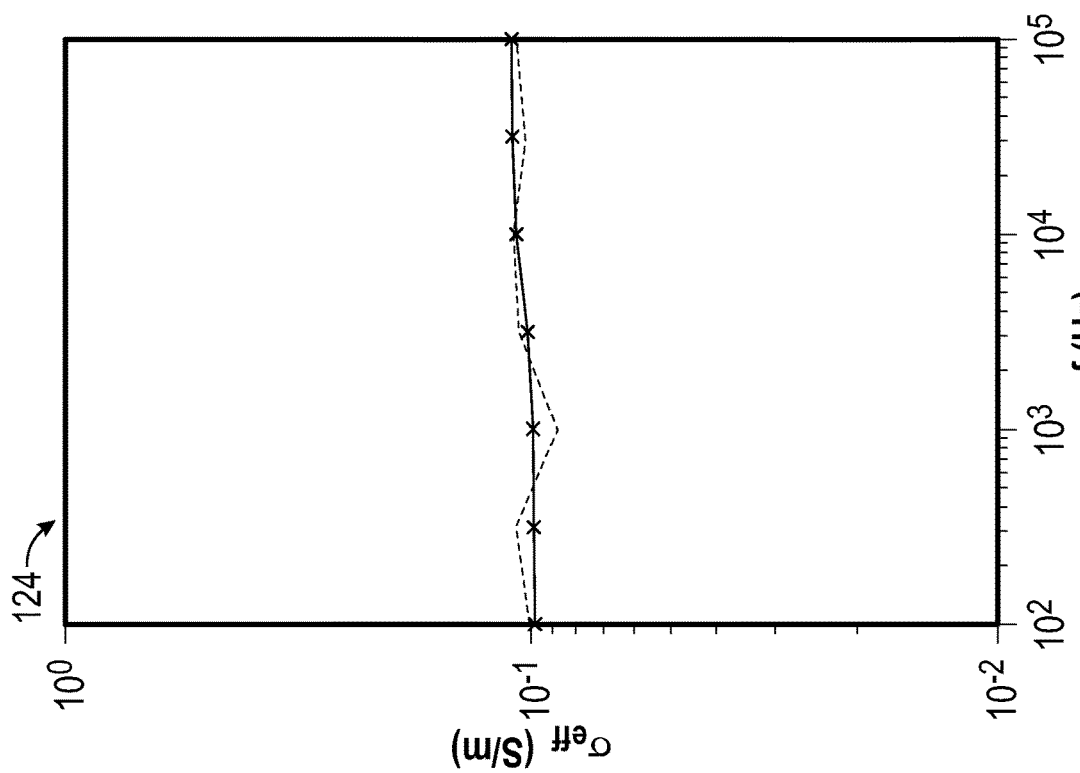
FIG. 12A
FIG. 12B

SYSTEMS AND METHODS FOR DETERMINING PROPERTIES OF POROUS, FLUID-FILLED GEOLOGICAL FORMATIONS BASED ON MULTI-FREQUENCY MEASUREMENTS

CROSS-REFERENCE TO RELATED APPLICATION

This is a continuation in part of U.S. patent application Ser. No. 16/940,492, which is based on and claims priority to U.S. Provisional Application Ser. No. 62/879,882, filed Jul. 29, 2019, which is incorporated herein by reference in its entirety.

BACKGROUND

This disclosure relates to determining properties of porous, fluid-fluid geological formations based on multi-frequency electromagnetic measurements.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The measurements may be used to infer properties and characteristics of the geological formation surrounding the wellbore. The discovery and observation of resources using downhole techniques generally takes place down in the wellbore with certain sensors. Electromagnetic well-logging sensors or induction well-logging sensors use electromagnetic waves to acquire measurements, which may inform the decisions involved in hydrocarbon exploration and production. The composition of the geological formation may increase the complexity of the measurements by adding artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment of the present disclosure relates to a method for determining a wettability of one or more types of solid particles within a geological formation. The method includes identifying at least one type of solid particle within the geological formation. The method also includes identifying a frequency range for an electromagnetic measurement based on the identified at least one type of solid particle within the geological formation. Further, the method includes receiving a plurality of electromagnetic (EM) measurements associated with the geological formation, wherein the plurality of EM measurements are within the identified frequency range. Further still, the method includes determining a contact angle associated with solid particles within the geological formation based on the received plurality of EM measurements.

Another embodiment of the present disclosure relates to a non-transitory, computer-readable medium comprising instructions that, when executed by at least one processor, cause the at least one processor to receive an input indicative of a conductivity of at least one solid particle present within a geological formation. The instructions may also cause the processor to retrieve a mechanistic model based on a relative conductivity of the at least one solid particle. Further, the instructions may cause the processor to identify a frequency range for an electromagnetic measurement based on the mechanistic model. Even further, the instructions may cause the processor to receive a plurality of electromagnetic (EM) measurements associated with the geological formation, wherein the plurality of EM measurements are within the identified frequency range. Further still, the instructions may cause the processor to determine a contact angle associated with solid particles within the geological formation based on the received plurality of EM measurements.

Another embodiment of the present disclosure relates to a system. The system includes a non-transitory machine-readable medium storing a first mechanistic model and a second mechanistic model. The system also includes a processor configured to execute instructions stored in the non-transitory, machine readable medium to perform operations. The operations include identifying a type of solid particle present within a geological formation. The operations also include identifying at least one model to use based on a relative conductivity of the type of the solid particle, wherein the model comprises the first mechanistic model, the second mechanistic model, or both. Further, the operations include receiving, as an input to the identified at least one model, one or more inputs indicative of estimated properties of the porous, fluid-filled geological formation, wherein the mechanistic model correlates one or more fluid phases, compositions, or both, to a contact angle of at least one type of solid particle and correlates an interfacial polarization of the at least one type of solid particle to the contact angle of the at least one type of solid particle. Further still, the operations include generating, as an output by the identified at least one model, a set of frequencies to measure by a downhole tool, wherein the set of frequencies corresponds to where frequency dispersions in conductivity, permittivity, or both are measureable.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9A shows multi-frequency electromagnetic (EM) measurements and model predictions based on inversion-derived estimates of effective conductivity associated with FIGS. 7A, 7B, and 7C and FIGS. 8A, 8B, and 8C, in accordance with an embodiment;

FIG. 9B shows multi-frequency electromagnetic (EM) measurements and model predictions based on inversion-derived estimates of effective permittivity associated with FIGS. 7A, 7B, and 7C and FIGS. 8A, 8B, and 8C, in accordance with an embodiment;

FIG. 12A shows multi-frequency EM measurements and model predictions for effective conductivity based on inversion-derived estimates associated with FIGS. 10A, 10B, and 10C and FIGS. 11A, 11B, and 11C, in accordance with an embodiment;

FIG. 12B shows multi-frequency EM measurements and model predictions for effective permittivity based on inversion-derived estimates associated with FIGS. 10A, 10, and IOC and FIGS. 11A, 11B, and 11C, in accordance with an embodiment;

DETAILED DESCRIPTION

Figure 1:
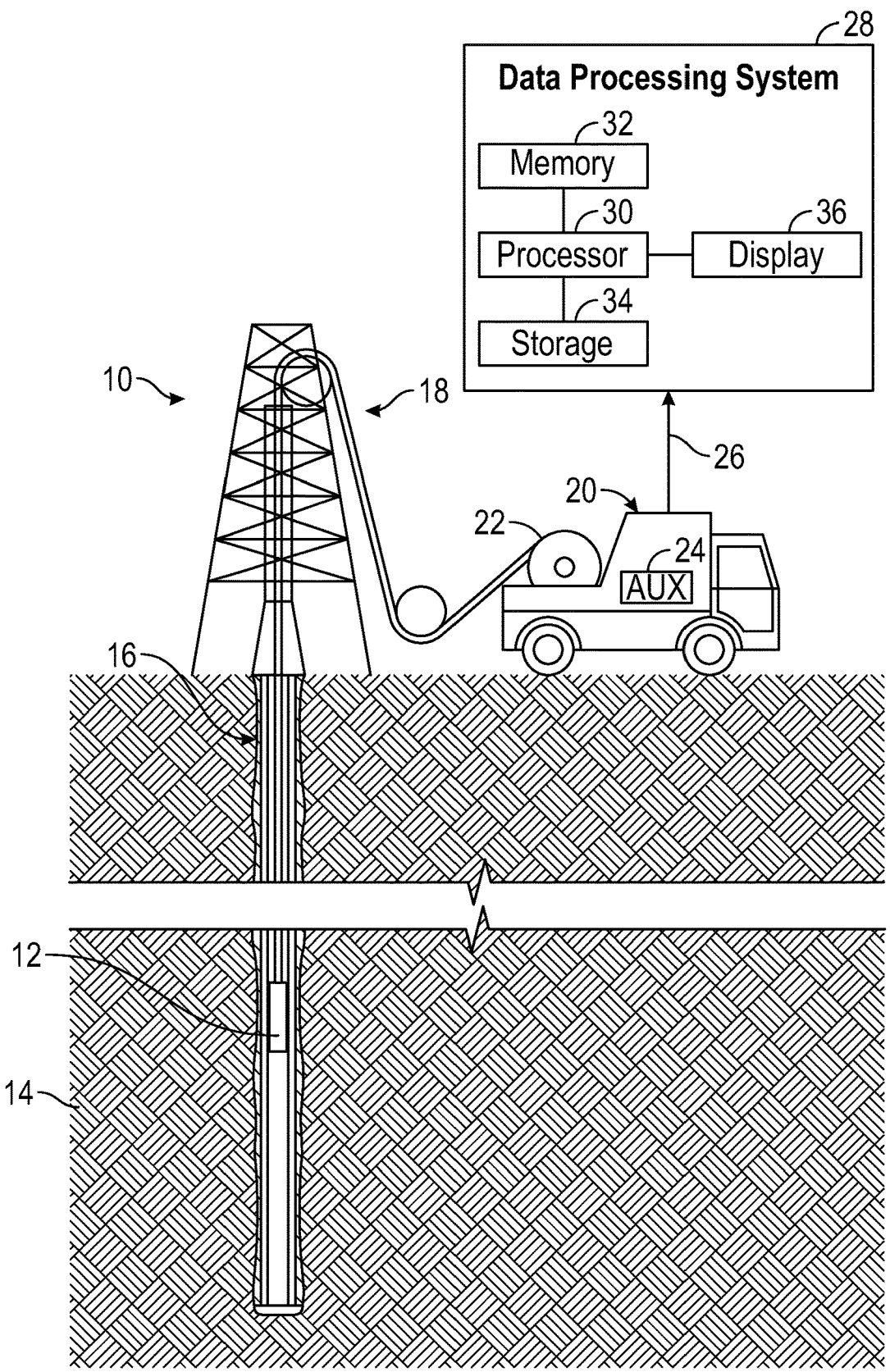
FIG. 1 is an example of a neutron-induced gamma-ray spectroscopy system, in accordance with an embodiment.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, "wettability" refers to a tendency of one fluid to spread on and/or adhere to a solid surface in the presence of other immiscible fluids. "Wettability" may be quantified by a contact angle where a liquid interface meets a solid surface.

As discussed above, electromagnetic well-logging or induction well-logging may inform certain decisions related to hydrocarbon exploration and production. Certain existing techniques in electromagnetic well logging may use models that assume that conductive particles, like graphite and pyrite, and surface-charge-bearing nonconductive particles, like quartz, calcite and clays, are completely water wet (e.g., the contact angle between a liquid and a solid surface is zero). It is presently noted that wettability of conductive particles and surface-charge-bearing nonconductive particles governs the preferential spreading of fluids on the surface of the particles that influences the interfacial polarization phenomena and charge transport/accumulation around the particles. Consequently, wettability of conductive particles influences the electromagnetic properties of fluid-filled porous materials. Further, the wettability and the electrical properties are closely related such that wettability can be estimated using the electromagnetic properties. For example, the dielectric permittivity of oil-wet sand is smaller than that of the water-wet sand at low water saturation, while the dielectric permittivity of oil-wet sand becomes much larger than that of the water-wet sand at higher water saturation. Additionally, it is noted that both resistivity and magnitude of the phase increase with the increase of oil saturation for sand saturated with non-wetting oil, while they both decrease with the increase of oil saturation for sand partially saturated with wetting oil.

Accordingly, one aspect of the present disclosure relates to systems and methods for using a material and subsurface characterization model to quantify the effects of wettability of conductive particles. Moreover, the model may be implemented to determine the wettability effects of solid particles that produce interfacial polarization phenomena on multi-frequency electromagnetic measurements. Further, the material and subsurface characterization model, in accordance with the present disclosure, provides a novel technique for identifying a range of operating frequencies for electromagnetic measurements to characterize the contact angle of solid particles that are present within a subsurface formation.

With this in mind, FIG. 1 illustrates an electromagnetic well-logging system 10 that may employ the systems and methods of this disclosure. The electromagnetic well-logging system 10 may be used to convey an electromagnetic well-logging tool 12 through a geological formation 14 via a wellbore 16. The electromagnetic well-logging tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the electromagnetic well-logging tool 12.

Moreover, although the electromagnetic well-logging tool 12 is described as a wireline downhole tool, it should be appreciated that any suitable conveyance may be used. For example, the electromagnetic well-logging tool 12 may instead be conveyed as a logging-while-drilling (LWD) tool as part of a bottom hole assembly (BHA) of a drill string, conveyed on a slickline or via coiled tubing, and so forth. For the purposes of this disclosure, the electromagnetic well-logging tool 12 may be any suitable measurement tool that obtains electromagnetic logging measurements through depths of the wellbore 16.

Many types of electromagnetic well-logging tools 12 may obtain electromagnetic logging measurements in the wellbore 16. These include, for example, the Rt Scanner, AIT, and Thrubit Electromagnetic tools by Schlumberger Technology Corporation, but electromagnetic logging measurements from other downhole tools by other manufacturers may also be used. The electromagnetic well-logging tool 12 may provide electromagnetic logging measurements 26 to a data processing system 28 via any suitable telemetry (e.g., via electrical signals pulsed through the geological formation 14 or via mud pulse telemetry). The data processing system 28 may process the electromagnetic logging measurements 26 to identify a contact angel and/or wettability at various depths of the geological formation 14 in the wellbore 16.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the electromagnetic logging measurements 26.

Figure 2:
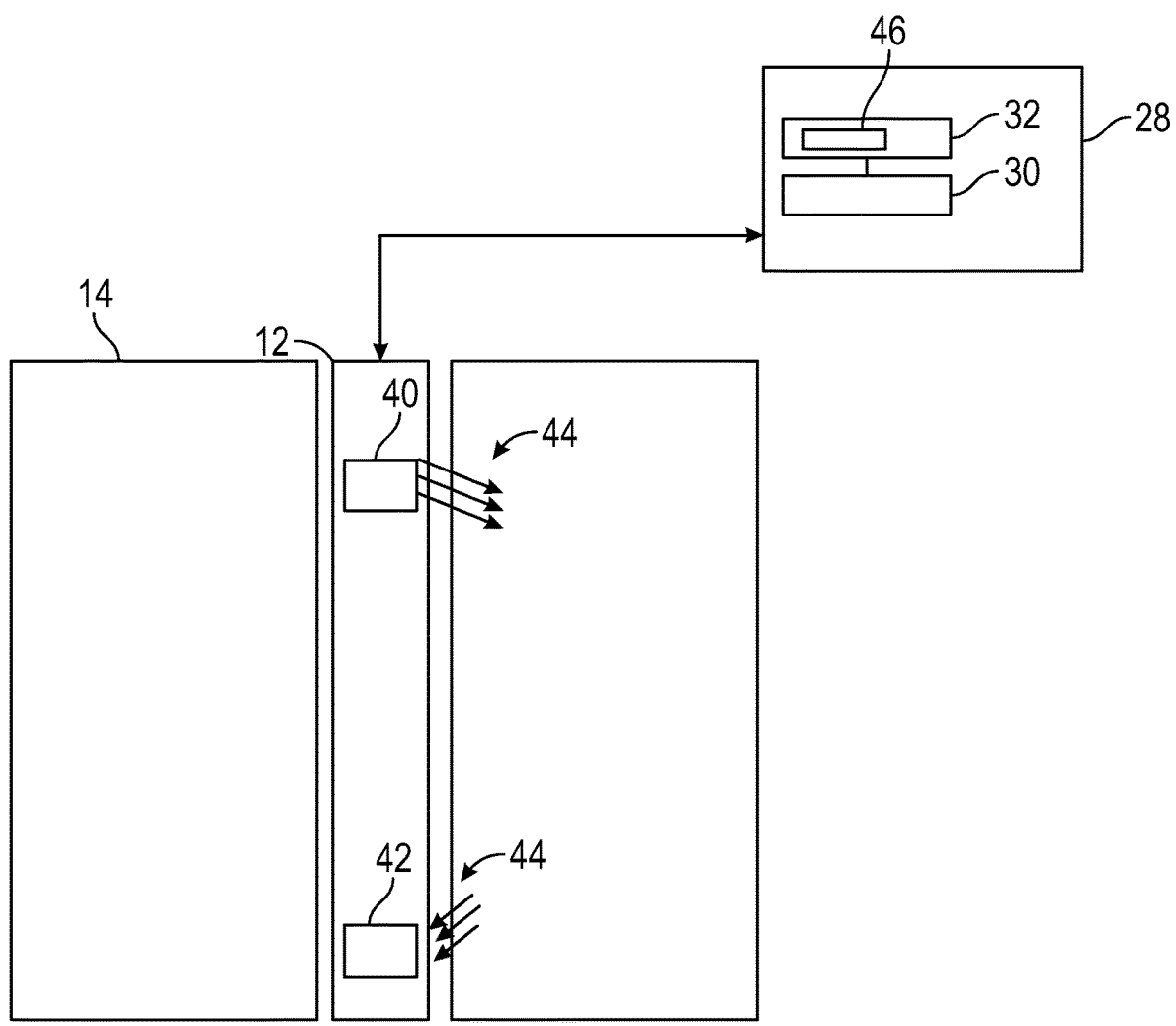
FIG. 2 is an example of a neutron-induced gamma-ray spectroscopy downhole tool, in accordance with an embodiment.

FIG. 2 shows an example of an electromagnetic well-logging tool 12 that may acquire electromagnetic measurements. The illustrated embodiment of the electromagnetic well-logging tool 12 includes a transmitter 40 and a receiver 42. While only one transmitter 40 and one receiver 42 are shown, it should be noted that the number of transmitters and receivers is not a limit on the scope of the present disclosure. Generally speaking, the transmitter 40 induces electric eddy currents to produce electromagnetic waves 44 having a set of frequencies in a direction of the magnetic dipole moment of the transmitter 40. The electromagnetic waves 44 that interact with the geological formation 14 are subsequently received by the receiver 42 to generate electromagnetic measurements.

As shown in FIG. 2, the illustrated embodiment of the electromagnetic well-logging tool 12 is communicatively coupled to the data processing system 28, which includes a material and subsurface characterization model 46 stored in the memory 32. As discussed in further detail below, the material and subsurface characterization model 46 may be utilized by the processor 30 of the data processing system 28 to determine a set of frequencies that the electromagnetic well-logging tool 12 may operate to acquire electromagnetic measurements. Further, the electromagnetic measurements may be processed according to the present disclosure to quantify the wettability effects of graphite, clays and other conductive or surface-charge-bearing nonconductive particles for improving subsurface electromagnetic log measurement interpretation in various subsurface geological formations to better quantify the water content/saturation in the subsurface.

Figure 3:
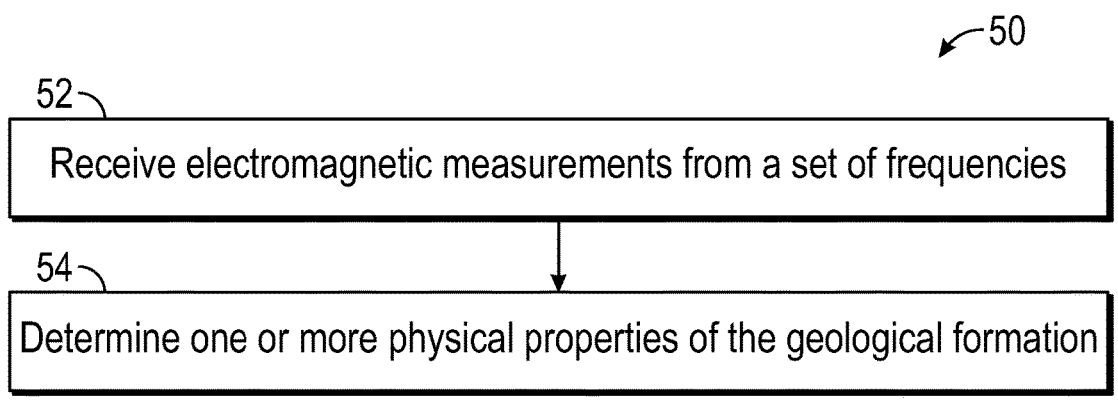
FIG. 3 is an example of a process for determining properties of a fluid-filled formation, in accordance with an embodiment.

FIG. 3 illustrates a process 50 for determining one or more physical properties of a fluid-filled geological formation. Although described in a particular order, which represents a particular embodiment, it should be noted that the process 50 may be performed in any suitable order. Additionally, embodiments of the process 50 may omit process blocks and/or include additional process blocks. Moreover, in some embodiments, the process 50 may be implemented at least in part by executing instructions stored in a tangible, non-transitory, computer-readable medium, such as memory 32 implemented in a data processing system 28, using processing circuitry, such as a processor 30 implemented in the data processing system 28.

In general, the illustrated process 50 includes receiving (process block 52) electromagnetic measurements from a set of frequencies (e.g., emitted by the electromagnetic well-logging tool 12), and determining (process block 54) one or more physical properties of the geological formation.

As described herein, in some embodiments, the set of frequencies emitted by the electromagnetic well-logging tool 12 may be determined based on the material and subsurface characterization model 46. For example, an operator may determine a number (e.g., 1, 2, 3, 4, 5 etc.) properties of a fluid-filled porous material to be estimated (e.g., determined) and provide these at inputs to a suitable computing system (e.g., the data processing system 28). In some embodiments, the properties to be estimated may include contact angle of conductive particles, contact angle of surface-charge-bearing particles, fluid saturations, fluid conductivity/salinity, surface conductance of solid particles, diffusion coefficients of charge carriers in various components of the material, and volume fractions of fluid and solid components in the materials. Further, the operator may provide an initial assumption of the composition of the geological formation, and the properties of the fluid and solid components in the geological formation. Based on the initial assumption, the operator may apply the material and subsurface characterization model 46 to identify the set of frequencies where frequency dispersions in conductivity and/or permittivity will be dominant and measureable (e.g., absent certain effects related to the complex conductivity and/or complex permittivity as described herein). In some embodiments, the set of frequencies may be a range of frequencies or one or more discrete frequencies.

The identified frequency range may be provided as an output to the electromagnetic well-logging tool 12. For example, the data processing system 28 may provide an output that instructs the electromagnetic well-logging tool 12 to tune the electromagnetic (EM) measurement to measure multi-frequency complex conductivity/permittivity of the fluid-filled porous material within the identified frequency ranges, or at specific frequencies in the frequency range. In some embodiments, the number of discrete frequencies included in the identified frequency range or the number of specific frequencies may be at least 3 times the number of physical properties to be estimated as described above.

As such, the electromagnetic well-logging tool 12 may perform the electromagnetic (EM) measurements of multi-frequency complex conductivity/permittivity on the fluid-filled porous material using the measurement settings tuned and finalized in the steps as described above. In some embodiments, a Markov-Chain Monte-Carlo may be applied to the EM measurements received in process block 52 to determine properties such as the contact angles and other physical properties as described herein.

The material and subsurface characterization model 46 may include multiple relationships, or be generated based on multiple models. For example, the material and subsurface characterization model 46 may include a first mechanistic model for a solid particle being preferentially surrounded by one of the fluid phases or fluid components surrounding the solid particle as a function of the contact angle of the solid particle. Further, the material and subsurface characterization model 46 may include a second mechanistic model that quantifies the interfacial polarization due to a solid particle (conductive or surface-charge-bearing nonconductive particle) preferentially surrounded by one of the fluid phases/components surrounding the solid particle as function of the contact angle of the solid particle and the operating frequency of the externally applied electromagnetic field.

The material and subsurface characterization model 46 may be developed by solving the Young-Laplace equation for a spherical grain in a mixture of wetting and non-wetting fluids with a known proportion of the two fluids. For example, Young-Laplace equation may be used to compute the shape of the wetting and non-wetting fluid interface (meniscus) at equilibrium by applying appropriate boundary conditions. In this way, the following expressions may be obtained: the wetting angle of the conductive or surface-charge-bearing nonconductive particle as a function of contact angle of the solid particle and the properties of fluid phases/components surrounding the solid particle. It should be noted that the interfacial polarization due to conductive and surface-charge-bearing nonconductive solid particles depends on the nature of preferential wetting of the solid particle. As such, the subsurface characterization model 46 may be used to quantify the effects of contact angle (wettability) of solid grains/particles (conductive or surface-charge-bearing nonconductive particle) on the net charge transport and net charge accumulation as a function of the frequency of the external electromagnetic field at various fluid saturations and solid wettability. The net charge transport determines the conductivity and net charge accumulation determines the permittivity that govern the electromagnetic measurements and log responses of the fluid-filled porous material.

Figure 4:
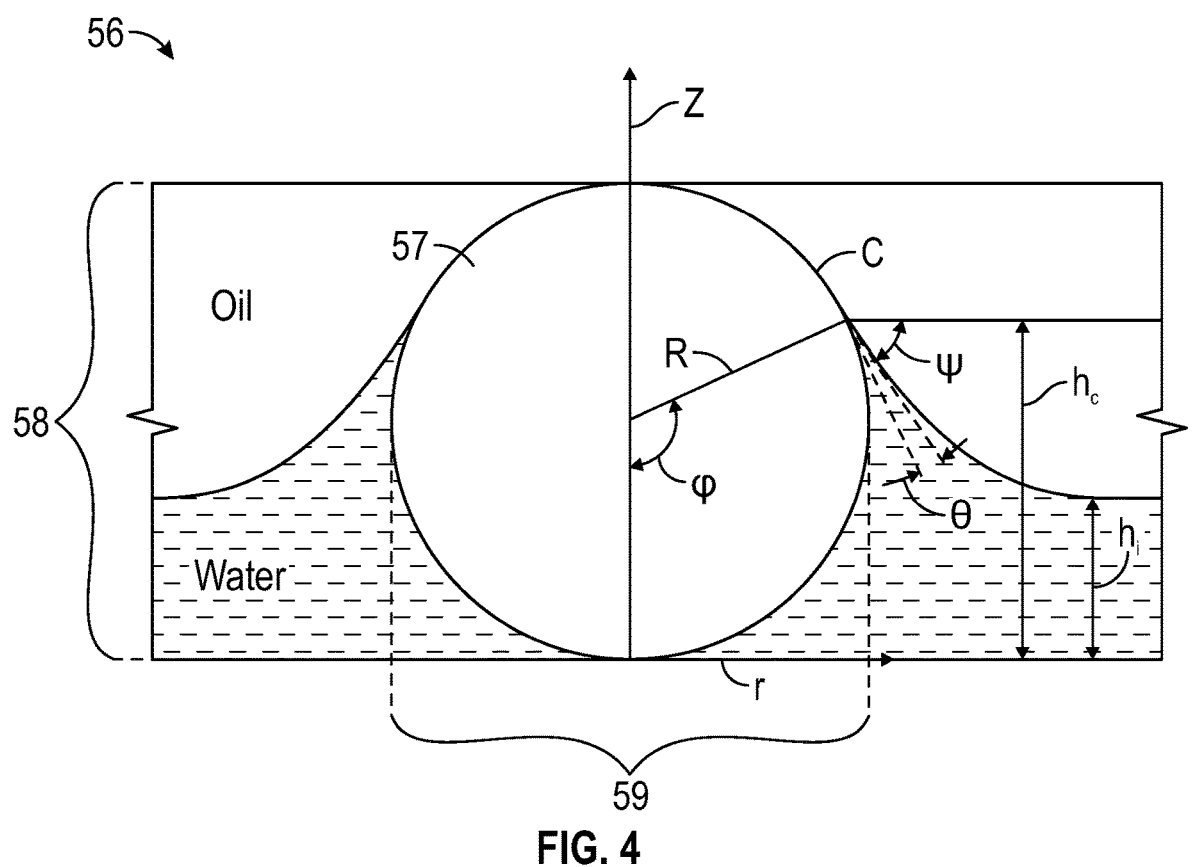
FIG. 4 is an example illustration of a cross section of a volume that includes a solid suspended in an oil-water media, in accordance with an embodiment.

At the representative volume level, developing the material and subsurface characterization model 46, in accordance with the techniques of the present disclosure, may include assuming the non-wetting layer (e.g., oil) stays at the top, wetting layer (e.g., water) goes to the bottom, the two layers have (e.g., the non-wetting layer and the wetting layer) one common interface, and the two layers are spread across a length scale that is orders of magnitude larger than the size of the spherical solid particle. The height of these two layers are in proportion to the corresponding fluid saturations. The solid particle suspends at the interface of wetting and non-wetting fluids, as shown in the FIG. 4, is discussed below. The wetting phase may surround the solid particle to satisfy the contact angle. The climb or height of the interface between the wetting layer and the non-wetting layer generates a wetting angle, which represents the degree of exposure of the particle to the wetting phase. The interfacial polarization phenomena due to such solid particles are entirely governed by the extent to which the solid particle is surround by the wetting phase versus non-wetting phase, which is governed by the wettability and contact angle of the solid particle. For example, when water wets a conductive mineral, its interfacial polarization effects on the complex conductivity/permittivity measurements will be enhanced. In another example, when the conductive mineral is preferentially oil wet, its interfacial polarization effects on the complex conductivity/permittivity measurements will diminish.

FIG. 4 is an example illustration of a cross-section of a volume 56 (e.g., within a geological formation) that includes a solid particle 57 suspended in an oil-water media, in accordance with an embodiment. In general, the volume 56 may be assumed for developing the model, as discussed herein. As shown, the solid particle 57 is a circle (e.g., a cross-section of a sphere); however, it should be noted that, in some embodiments, the solid particle may be ellipsoidal (e.g., a diameter 58 of the solid particle 57 may be greater than or less than a diameter 59 of the solid particle 57) or have a radial normal distribution of radii.

In the illustrated cross-section of the volume 56 shown in FIG. 4, C denotes the point where the oil-water interface (e.g., interface between the non-wetting layer and the wetting layer) contacts the particle surface; $\theta$ is the contact angle of conductive particle; $\varphi$ is the wetting angle; $\psi$ is the angle between oil-water interface and the horizon (x-axis) at point C; R is the radius of conductive particle; $h_i$ is the uniform height of oil-water interface in the absence of wetting of the conductive particle (far-field height); $h_c$ is the height where the oil-water interface contacts the particle surface, such that $h_c = R(1-\cos\varphi)$; r is the horizontal distance perpendicular to the vertical axis z; and h(r) is the height of oil-water interface at any distance r away from the vertical axis z.

Young-Laplace Equation

As discussed herein, developing the material and subsurface characterization model 46 may include solving the Young-Laplace equation to quantify the shape of the oil-water interface. For example, the shape of the oil-water interface, where oil is non-wetting phase and water is the wetting phase, at equilibrium may be described by the Young-Laplace equation:

$$(\rho_w - \rho_o)g[h(r) - h_i] = 2H\sigma$$

where $\rho_w$ and $\rho_o$ are the density of water and oil, respectively; g denotes gravitational acceleration; H is mean curvature of the meniscus surface; and $\sigma$ is interfacial tension between oil and water.

Under a small slope assumption, where the Bond number, $$B_0 = \frac{(\rho_w - \rho_o)gR^2}{\sigma},$$

is small, the gravity force is negligible, so the mean curvature may remain constant everywhere on the oil-water interface. For the material and subsurface characterization model 46, the meniscus surface is axisymmetric. As a result, the Young-Laplace equation can be expressed in cylindrical coordinates as:

$$\frac{(\rho_w - \rho_o)g[h(r) - h_i]}{\sigma} = h'' + \frac{h'}{r}$$

where h' and h" represents $$\frac{dh}{dr} \text{ and } \frac{d^2h}{dr^2},$$

respectively.

By defining some dimensionless variables, such as $$\hat{r} = \frac{r}{L_c}, \hat{h} = \frac{h}{L_c}, G(\hat{r}) = \frac{h(r) - h_i}{L_c}, \text{ where } L_c = \sqrt{\frac{\sigma}{(\rho_w - \rho_o)g}}$$

is capillary length, the Young-Laplace equation becomes a modified Bessel differential equation:

$$G'' + \frac{G'}{\hat{r}} - G = 0$$

where G' and G" represents and $$\frac{dG}{d\hat{r}} \text{ and } \frac{d^2G}{d\hat{r}^2},$$

respectively.

Boundary Conditions (BC)

As discussed herein, developing the material and subsurface characterization model 46 may include solving the Young-Laplace equation with certain boundary conditions. For example, a first boundary condition may be the height of oil-water interface at infinite distance, $h(r)|_{r \to \infty}$, is equal to $h_i$.

$$\lim_{\hat{r} \to \infty} G = 0$$

$$(\lim)_T(\hat{r} \to \infty)G = 0$$

A secondary boundary condition may be the height of oil-water interface at distance $r = R \sin \varphi$ is $h_c$.

$$G(\hat{r} = B_o \sin \varphi) = \hat{h}_c - \hat{h}_i$$

Shape of the Oil-Water Interface

The Young-Laplace equation is solved using the boundary conditions to obtain the expression for the shape of the oil-water interface:

$$\hat{h} = \hat{h}_i + \frac{\hat{h}_c - \hat{h}_i}{K_0(\sqrt{B_o} \sin \varphi)} K_0(\hat{r})$$

where K_0 is modified Bessel function of the second kind of order 0.

An Expression of Wetting Angle

Wetting angle may be expressed as:

$$\varphi = 180 - \theta - \frac{\hat{h}_c - \hat{h}_i}{K_0(\sqrt{B_o} \sin \varphi)} K_1(\sqrt{B_o} \sin \varphi)$$

where K_1 is modified Bessel function of the second kind of order 1.

Effective Medium Model

In some embodiments, developing the material and subsurface characterization model 46 may include using an effective medium model. For example, to simulate the wettability effects of solid particles constituting a fluid-filled porous material on the electromagnetic properties of the material (e.g., multi-frequency complex conductivity and complex permittivity), the newly developed model of wetting angle of a solid particle may include a petrophysical model to express the complex conductivity/permittivity due to the interfacial polarization of the solid particles at various saturations, wettability, and operating frequencies.

From an effective medium standpoint, the effective complex conductivity of a porous fluid-filled geomaterial containing conductive particles of any wettability (e.g., graphite particle) and fully wetted surface-charge-bearing nonconductive particles (e.g., water-wet sand and clay particles) at any saturation of the wetting phase (e.g., water) may be expressed as:

$$\frac{K_{\text{eff}} - K_w}{K_{\text{eff}} + 2K_w} = $$

$$\phi_c p_w f_{c,w}(\omega) + \phi_c(1 - p_w)f_{c,nw}(\omega) + \phi_{n1} f_{n1}(\omega) + \phi_{n2} f_{n2}(\omega) + \phi_{nw} f_{nw}(\omega)$$

Where $K_{\text{eff}}$ is the effective complex conductivity of the porous fluid-filled geomaterial; $K_w$ is the complex conductivity of pore-filling wetting phase, which may be brine or saline water in some cases, with an assumption that the complex conductivity of pore-filling non-wetting phase, which is oil in in the illustration of the cross-section of the volume 56, is negligible; f is the dipolarizability due to interfacial polarization of solid particle; ω is the angular frequency of the external EM field; φ is the volume fraction of solid particles or the fluid phases; $p_w$ is the proportion of a single solid particle surface that is covered by wetting phase (water) determined using the newly developed model of wetting angle of a solid particle; and subscripts c, n1, n2, nw, and w represent the conductive particle of any wettability (e.g., graphite), water-wet surface-charge-bearing nonconductive particle #1 (e.g., sand), water-wet surface-charge-bearing nonconductive particle #2 (e.g., clay), non-wetting phase (e.g., oil), and wetting phase (e.g., water), respectively.

When a solid particle is not fully wet, the interfacial polarization effect of such a solid particle is determined as a volumetric mixing of interfacial polarization when the solid particle is completely surrounded by non-wetting fluid phase, $f_{c,n,w}$, and that when completely surround by wetting fluid phase, $f_{c,w}$, expressed as $pp_w f_{c,w}(\omega) + \phi_c(1-p_w)f_{c,nw}(\omega)$, where $p_w$ is the proportion of the solid particle surface that is covered by wetting phase (water) determined using the newly developed model of wetting angle of a solid particle.

The proportion of a single graphite surface that covered by water or oil may be expressed as:

$$p_w = \frac{1 - \cos\varphi}{2}$$

where $\varphi$ is the wetting angle.

Dipolarizability of conductive particle (e.g., graphite) completely immersed in wetting phase may be expressed as:

$$f_c(\omega) = -\frac{1}{2} + \frac{3}{2}\frac{i\omega}{\left[\frac{2}{a}\frac{\sigma_w}{\varepsilon_w}\frac{E_w}{G_w} - \frac{2}{a}\frac{K_w}{K_c}\frac{\sigma_c}{\varepsilon_c}\frac{F_c}{H_c} + i\omega\left(\frac{2K_w}{K_c} + 1\right)\right]}$$

where:

$$E_w = \frac{q}{\gamma_w^2 \varepsilon_w} e^{-a\gamma_w}\left[\frac{1}{a\gamma_w} + \frac{1}{(a\gamma_w)^2}\right]$$

$$G_w = \frac{q}{\gamma_w \varepsilon_w} e^{-a\gamma_w}\left[\frac{1}{a\gamma_w} + \frac{2}{(a\gamma_w)^2} + \frac{2}{(a\gamma_w)^3}\right]$$

$$F_c = \frac{q}{\gamma_c \varepsilon_c}\left[\frac{\cosh(a\gamma_c)}{a\gamma_c} - \frac{\sinh(a\gamma_c)}{(a\gamma_c)^2}\right]$$

$$F_c = \frac{q}{\gamma_c \varepsilon_c}\left[\frac{2\cosh(a\gamma_c)}{(a\gamma_c)^2} - \frac{\sinh(a\gamma_c)}{a\gamma_c} - \frac{2\sinh(a\gamma_c)}{(a\gamma_c)^3}\right]$$

$$\gamma_j = \sqrt{\frac{i\omega}{D_j} + \frac{\sigma_j}{\varepsilon_j D_j}}, \text{ for } j = w \text{ or } c$$

where $\omega$ is the angular frequency of the electric field; i is square root of $-1$; a is characteristic length of inclusion phase; $\lambda$ is surface conductance of nonconductive particle; $\sigma$ is electrical conductivity; $\varepsilon$ is dielectric permittivity; and D is diffusion coefficient of charge carriers.

Dipolarizability of nonconductive particle (e.g., clay, sand, oil) completely immersed in wetting phase may be expressed as:

$$f_{ncond}(\omega) = \frac{Q(R+A) - P}{Q(R-2A) + 2P}$$

where:

$$A = \frac{1}{a^2}$$

$$P = \gamma_w^2 + \xi_w^2 \frac{G^*}{H^*} + \frac{2G^*}{a^2 L}$$

$$Q = \frac{1}{iF+1}\left[2 - \frac{a^2 \xi_h^2}{H^*}\left(\frac{L}{iF} + E\right) - \frac{2E}{L}\right]$$

$$R = \frac{P}{Q}\left(\frac{iFE+L}{iF+1}\right)$$

$$H^* = \frac{aL_w}{F_w}, \; G^* = \frac{aG_w}{E_w}, \; L = \frac{2\lambda}{a\sigma_w}, \; E = \frac{\varepsilon_n}{\varepsilon_w}, \; F = \frac{\omega \varepsilon_w}{\sigma_w}$$

$$F_w = \frac{q}{\xi_w^2 \varepsilon_w} e^{-a\xi_w}\left[\frac{1}{a\xi_w} + \frac{1}{(a\xi_w)^2}\right]$$

$$L_w = \frac{q}{\xi_w \varepsilon_w} e^{-a\xi_w}\left[\frac{1}{a\xi_w} + \frac{2}{(a\xi_w)^2} + \frac{2}{(a\xi_w)^3}\right]$$

-continued $$\xi_j = \sqrt{\frac{i\omega}{D_j}}, \text{ for } j = n \text{ or } w$$

Based on certain assumptions of the properties of solid particles and fluid phases in the fluid-filled porous material and the list of unknown properties to be estimated, the new mechanistic model is used to identify the frequency range where frequency dispersions in conductivity and/or permittivity will be dominant and measurable for purposes of desired estimations. Electromagnetic (EM) measurements in all the following cases (presented in FIGS. 6 to 8) were tuned to be within the frequency range identified using the mechanistic model, such that the number of discrete frequencies as which the measurements were acquired is at least 3 times the number of physical properties to be estimated. The following case demonstrates the use of mechanistic model to plan the electromagnetic (EM) data acquisition procedure.

TABLE 1

Example properties of wetting phase

| | $D_w$ (m²/s) | $\varepsilon_{r,w}$ | $\sigma_w$ (S/m) | $\rho_w$ (kg/m³) | $\sigma$ (N/m) |
|---|---|---|---|---|---|
| Water | $10^{-9}$ | 70 | 0.1 | 1000 | 0.05 |

TABLE 2

Example properties of solid particles, i is c for conductive particle (e.g., graphite), i is n for surface-charge-bearing nonconductive particle (e.g., clay and sand), and i is nw for non-wetting phase (e.g., oil).

| | $\phi_i$ (%) | $\alpha_i$ (μm) | $D_i$ (m²/s) | $\varepsilon_{r,i}$ | $\sigma_i$ (S/m) | $\lambda$ (S) | $\theta$ (°) |
|---|---|---|---|---|---|---|---|
| Graphite | 10 | 200 | $5 \times 10^{-5}$ | 12 | 500 | — | 0~180 |
| Sand | 70 | 1000 | — | 4 | — | $10^{-9}$ | — |
| Clay | 10 | 100 | — | 8 | — | $10^{-8}$ | — |
| Oil | 1~9 | 100 | — | 2 | — | $10^{-30}$ | — |

Figure 5A:
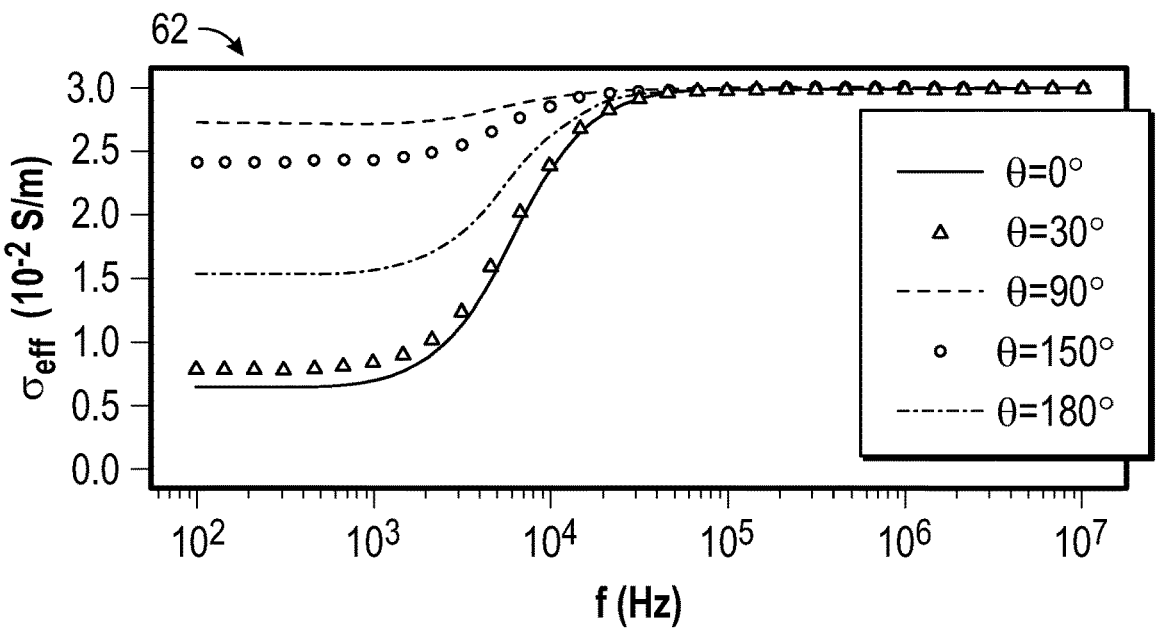
FIG. 5A shows a graph illustrating an example of determined effective conductivity for fluid-filled porous material for different contact angles with a 10% oil saturation, in accordance with an embodiment.
Figure 5B:
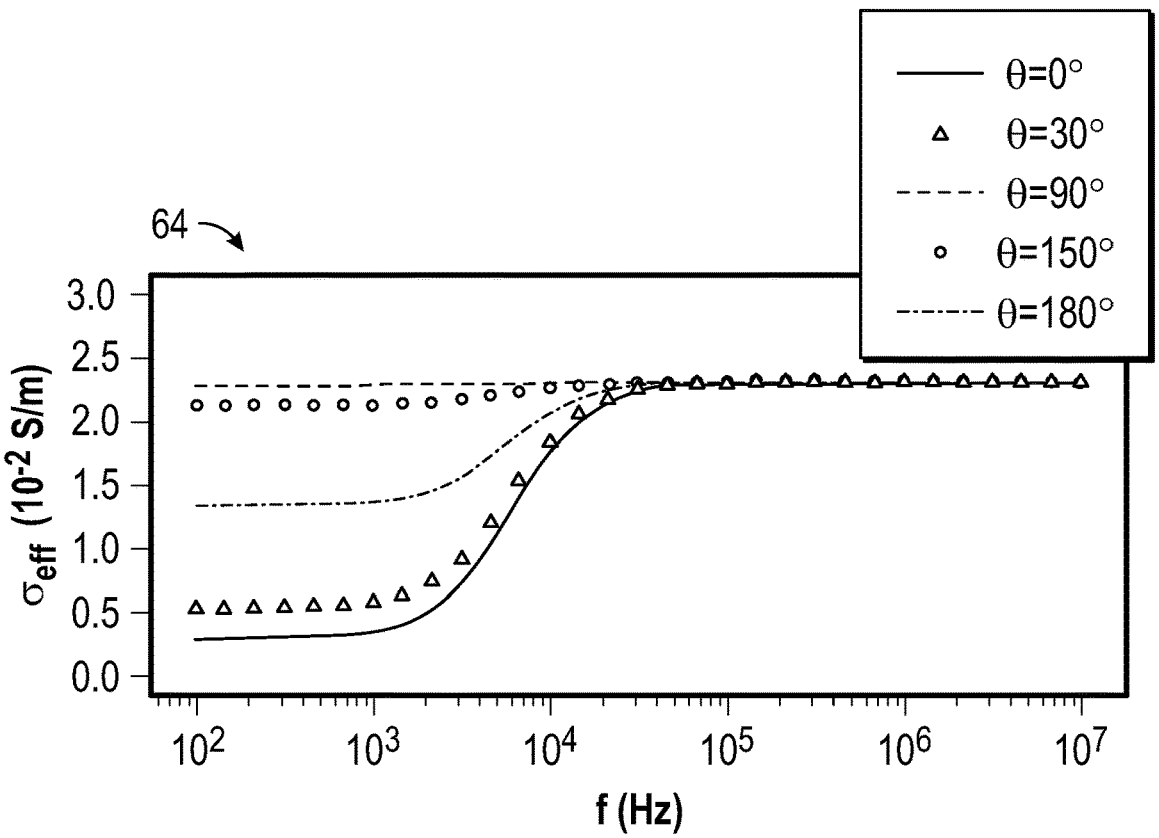
FIG. 5B shows a graph illustrating an example of determined effective conductivity for fluid-filled porous material for different contact angles with a 90% oil saturation, in accordance with an embodiment.
Figure 5C:
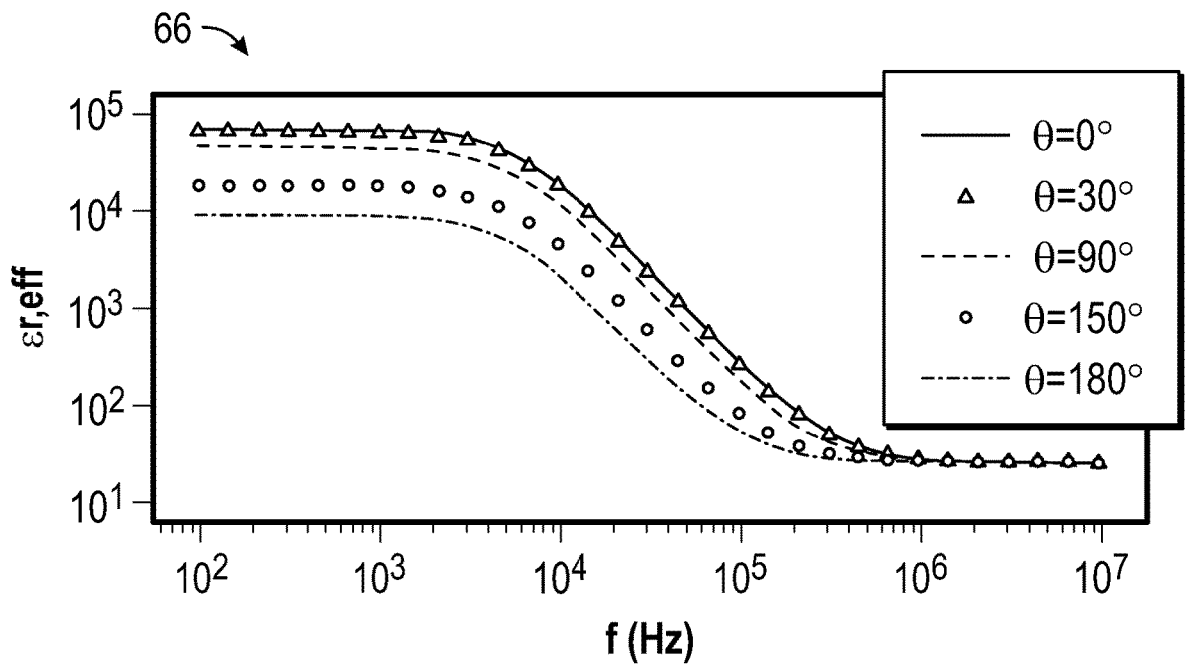
FIG. 5C shows a graph illustrating an example of determined effective permittivity for fluid-filled porous material for different contact angles with a 10% oil saturation, in accordance with an embodiment.
Figure 5D:
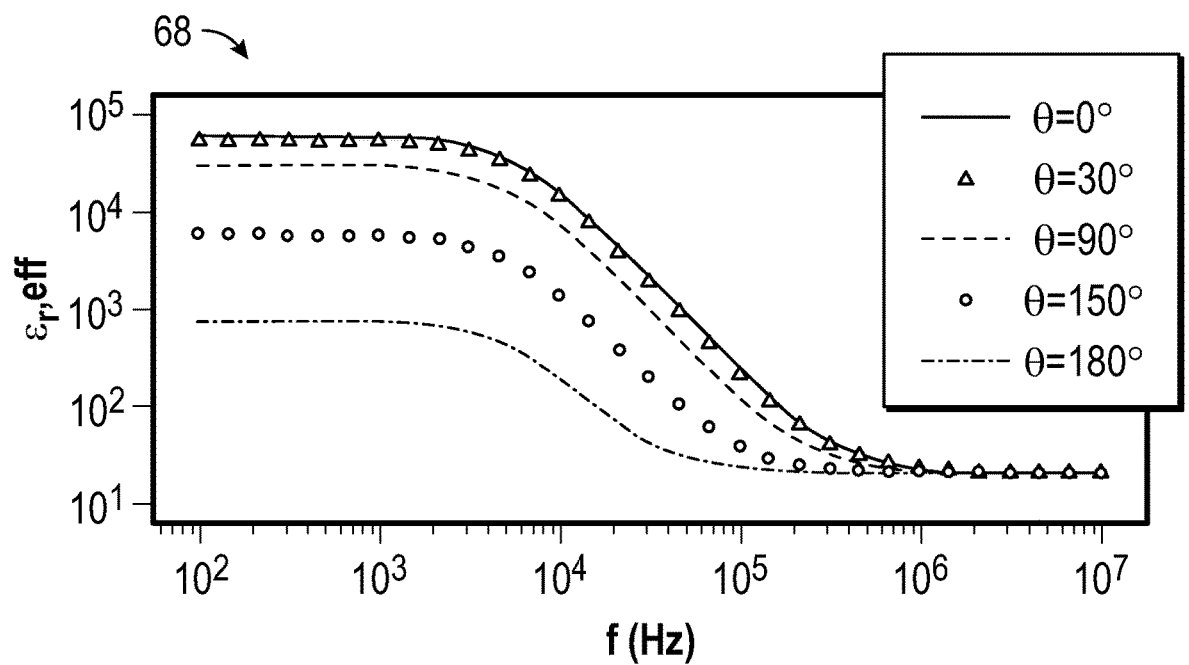
FIG. 5D shows a graph illustrating an example of determined effective permittivity for fluid-filled porous material for different contact angles with a 90% oil saturation, in accordance with an embodiment.

FIGS. 5A and 5B show graphs of effective conductivity and FIGS. 5C and 5D show graphs of effective permittivity for mixtures including a conductive solid particle. More specifically, the curves in the graph 62 and graph 64 show effective conductivity, and the curves in the graph 66 and graph 68 show effective permittivity. When comparing the different curves in graph 62 and graph 66, or graph 64 and graph 68, the frequency dispersion reduces as contact angle increases, which means the conductive particle becomes oil wet. This is because, as contact angle increases, the graphite surface is covered more by oil, which has much fewer charge carriers than water and impedes the interfacial polarization in the fluid phase which lowers charge accumulation. As oil saturation increases, both σ_eff and ε_(r,eff) will reduce due to the increase in the volume fraction of oil as nonconductive inclusion. Both σ_eff and ε_(r,eff) will converge to a single value at high frequency because the charge carriers rapidly respond to the alternating external EM field and there is no net accumulation around particles, resulting in an apparent increase in conductivity. Consequently, conductivity reaches to a high value and permittivity reaches to a low value (representing only dipole moment of water) at high frequency close to 1 GHz. In the contrast, at low frequency, the charge carriers quickly reach the equilibrium distribution around the conductive particles' interface, so that the polarized particles act as insulators, which lead to lower σ_eff and higher ε_(r,eff). σ_eff at low frequency can be modeled using effective medium model assuming the conductive particles to be insulators.

Figure 6A:
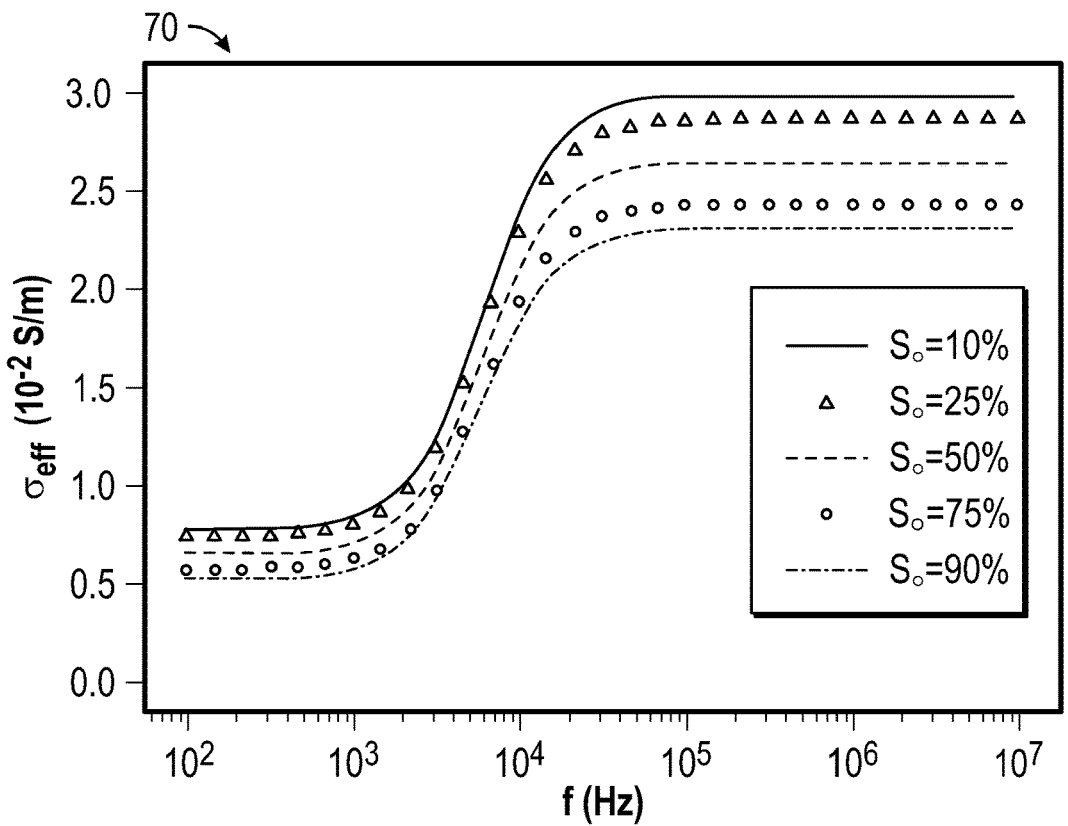
FIG. 6A shows a graph illustrating an example of determined effective conductivity for fluid-filled porous material for different oil saturations with a contact angle of 30°, in accordance with an embodiment.
Figure 6B:
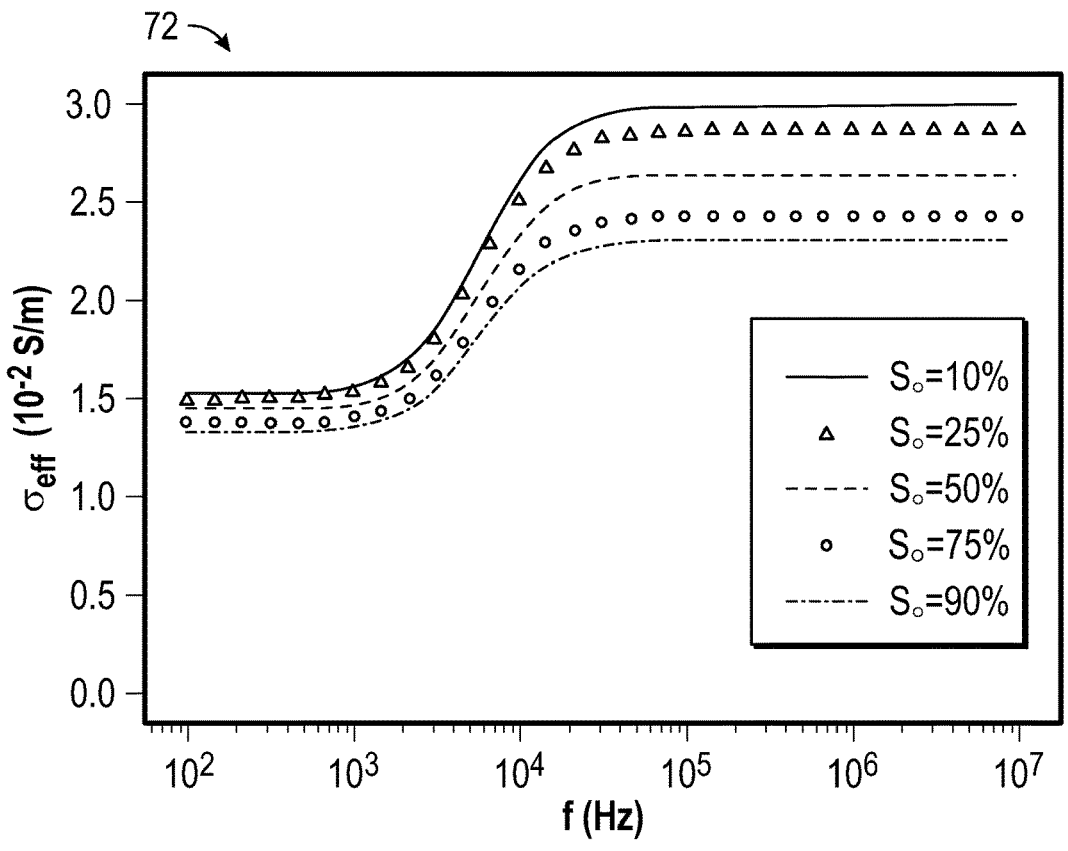
FIG. 6B shows a graph illustrating an example of determined effective conductivity for fluid-filled porous material for different oil saturations with a contact angle of 90°, in accordance with an embodiment.
Figure 6C:
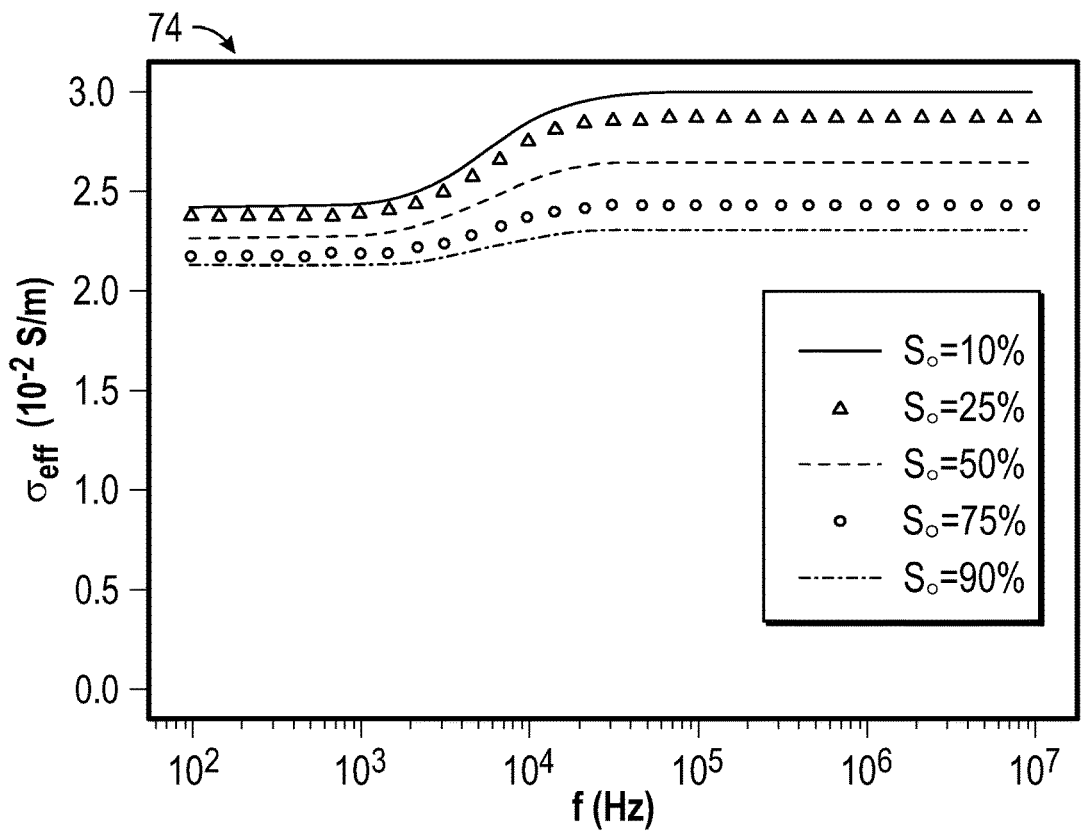
FIG. 6C shows a graph illustrating an example of determined effective conductivity for fluid-filled porous material for different oil saturations with a contact angle of 150°, in accordance with an embodiment.
Figure 6D:
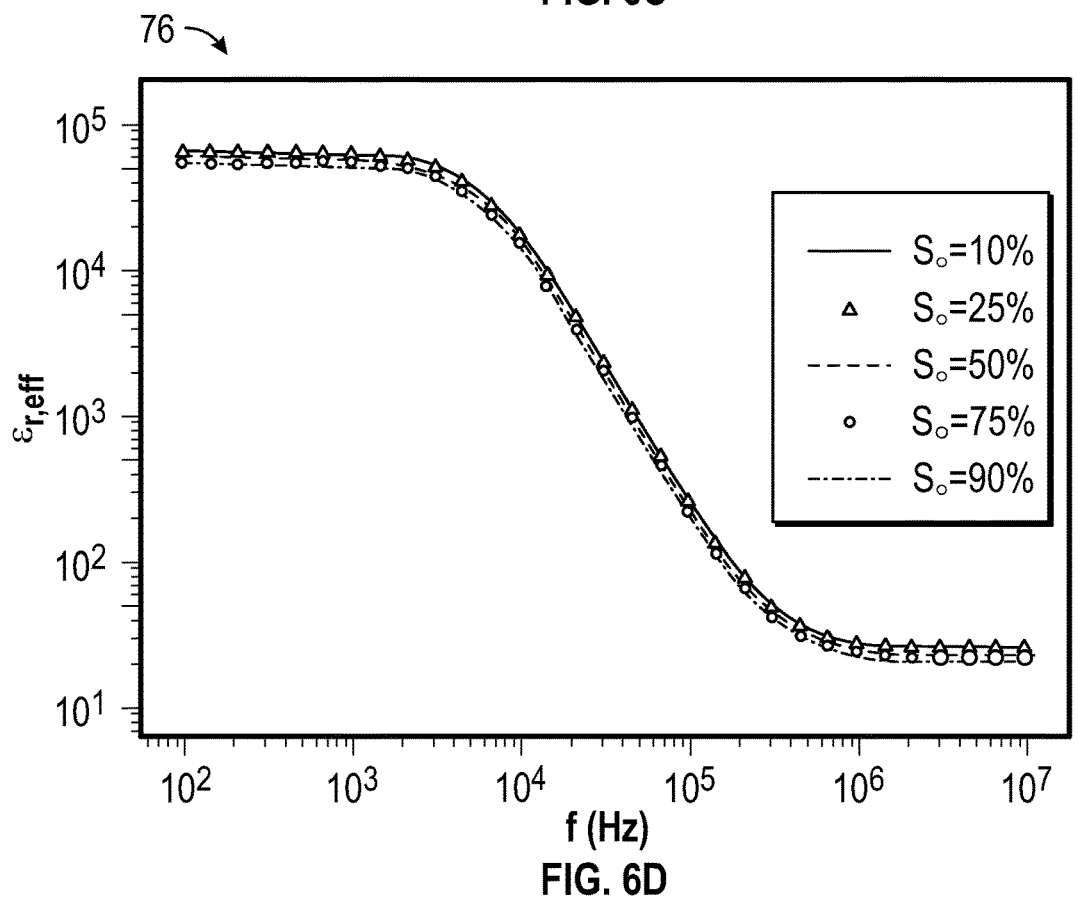
FIG. 6D shows a graph illustrating an example of determined effective permittivity for fluid-filled porous material for different oil saturations with a contact angle of 30°, in accordance with an embodiment.
Figure 6E:
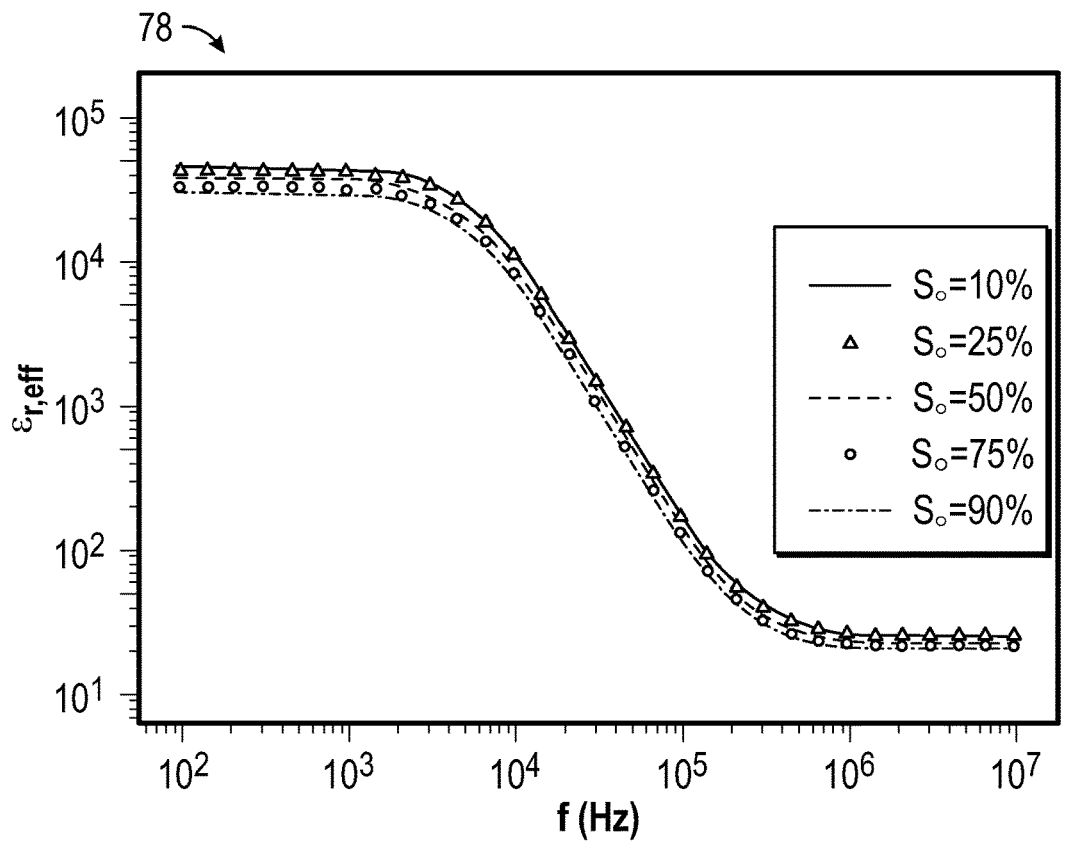
FIG. 6E shows a graph illustrating an example of determined effective permittivity for fluid-filled porous material for different oil saturations with a contact angle of 90°, in accordance with an embodiment.
Figure 6F:
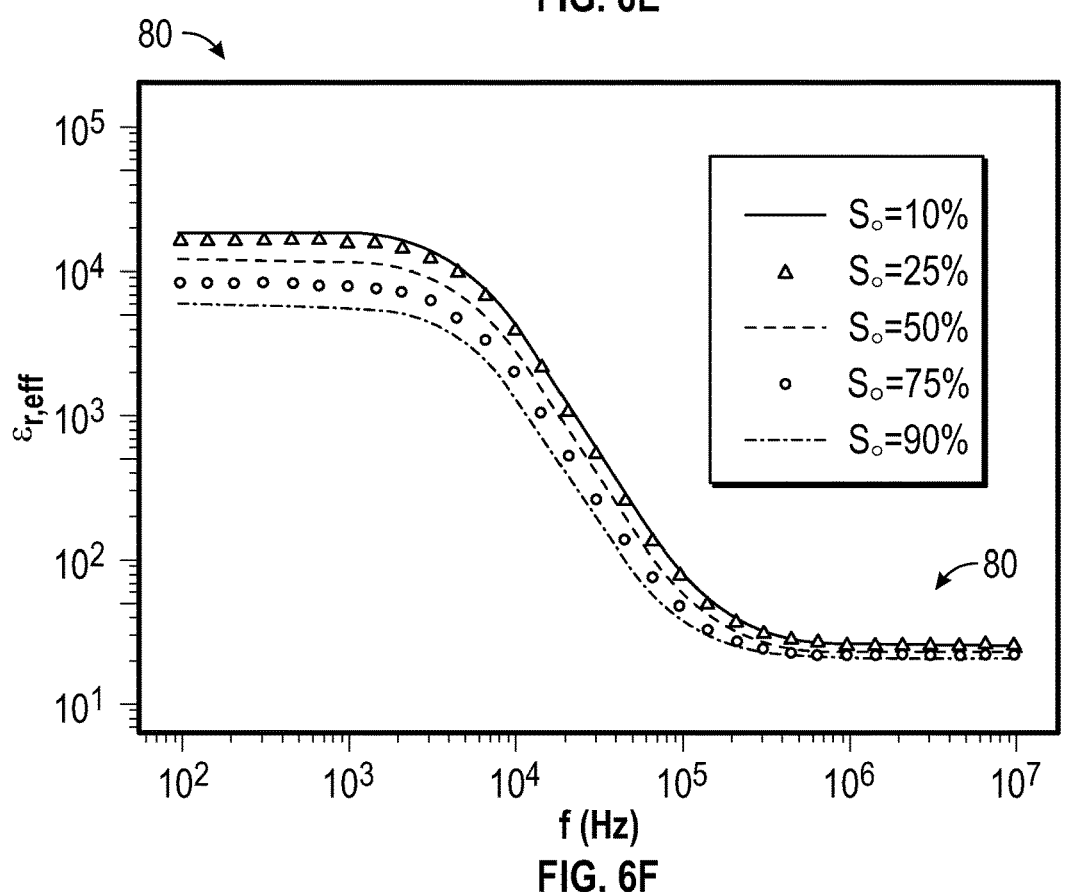
FIG. 6F shows a graph illustrating an example of determined effective permittivity for fluid-filled porous material for different oil saturations with a contact angle of 150°, in accordance with an embodiment.

FIGS. 6A, 6B, and 6C (i.e., FIGS. 6A-C) show graphs of effective conductivity and FIGS. 6D, 6E, and 6F (i.e., FIGS. 6D-F) effective permittivity for mixtures including a conductive solid particle. More specifically, the curves in the graph 70, graph 72, and graph 74 show effective conductivity, and the curves in the graph 76, graph 78, and graph 80 show effective permittivity. When comparing the different curves in graph 70 and graph 76, graph 72 and graph 78, and graph 74 and graph 80, the frequency dispersion reduces as oil saturation increases because graphite surface is covered more by oil, similar to the effect of contact angle. It should be noted that as oil saturation increases, both σ_eff and ε_(r,eff) will reduce due to the increase in the volume fraction of oil because the oil behaves as nonconductive inclusion. Also, by comparing the rate of change among curves in graph 62 and graph 66 (e.g., as shown in FIGS. 5A and 5C) and graph 70 and graph 76 (e.g., as shown in FIGS. 6A and 6D), it is evident that the effect of change in oil saturation from 10% to 70% on the frequency dispersion of conductivity and permittivity is much lower than the effect of change in contact angle from 0° to 180°. This indicates that the contact angle plays a primary effect and oil saturation plays a secondary effect in controlling the multi-frequency behavior.

The following three cases demonstrate the efficacy of the electromagnetic (EM) data acquisition procedure followed by data processing workflow. Based on some assumption of the properties of solid particles and fluid phases in the fluid-filled porous material and the list of unknown properties to be estimated, the new mechanistic model is used to identify the frequency range where frequency dispersions in conductivity and/or permittivity will be dominant and measurable for purposes of desired estimations. Electromagnetic (EM) measurements in all the following cases (presented in FIGS. 5A, 5B, 5C, and 5D, FIGS. 6A-C, FIGS. 6D-F, and FIGS. 7A, 7B, and 7C) were tuned to be within the frequency range identified using the mechanistic model, such that the number of discrete frequencies at which the measurements were acquired is at least 3 times the number of physical properties to be estimated. Using the MCMC inversion coupled with the mechanistic model, several properties of the fluid-filled porous materials were estimated, the primary being the simultaneous estimations of oil saturation (or water saturation) and contact angle (or wettability).

Figure 7A:
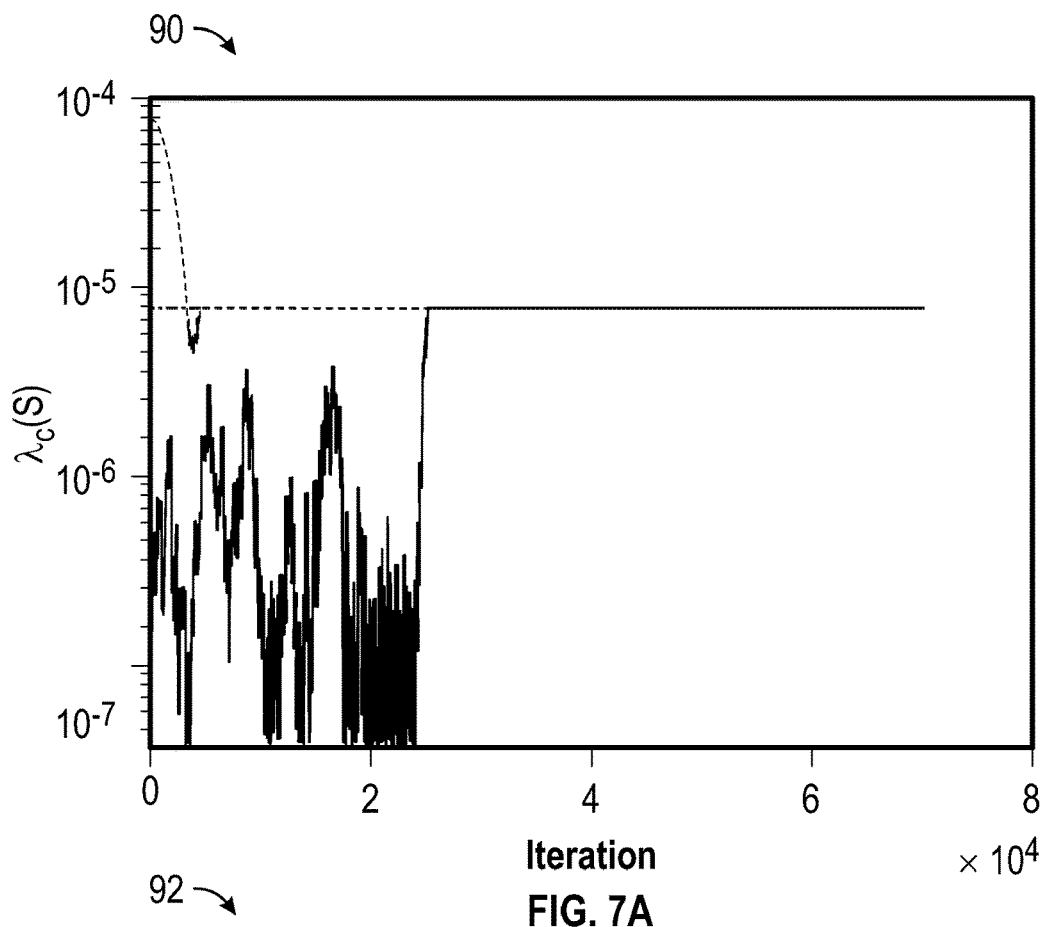
FIG. 7A shows graphs depicting a history of Markov Chain Monte Carlo (MCMC) inversion-derived estimates of clay surface conductance for oil-water-filled porous material containing water-wet sands, clays, and graphite, in accordance with an embodiment.
Figure 7B:
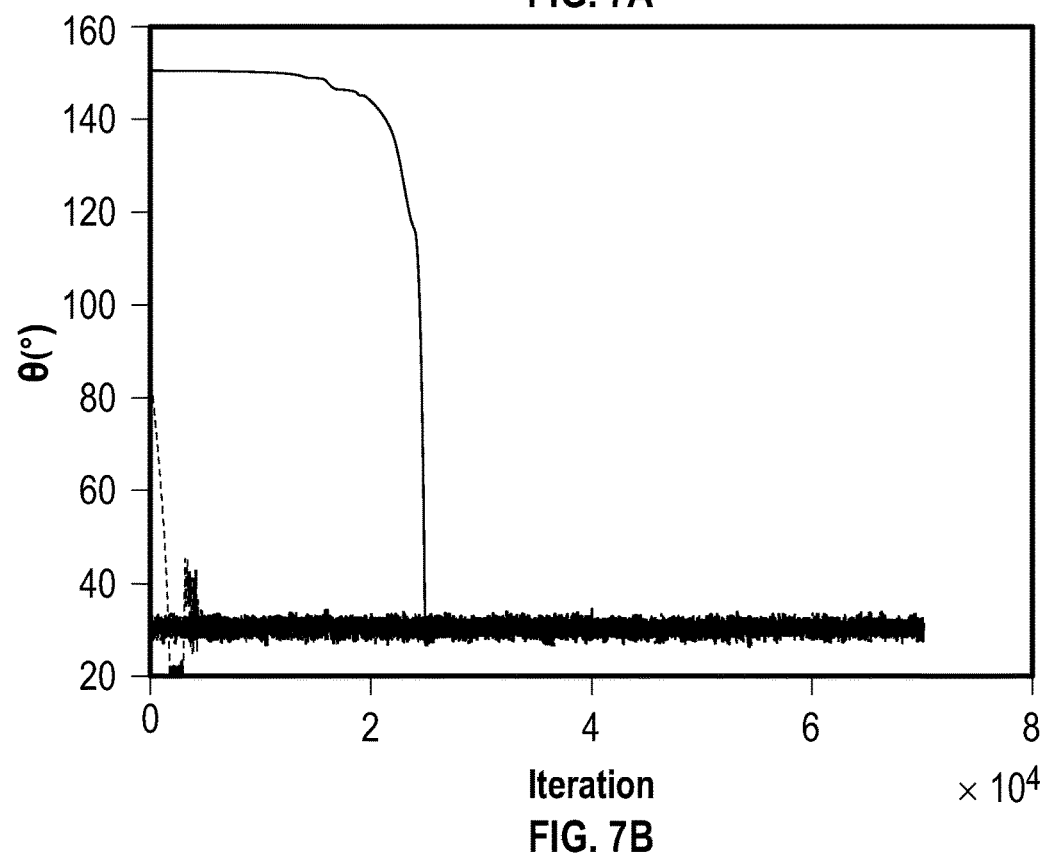
FIG. 7B shows graphs depicting a history of Markov Chain Monte Carlo (MCMC) inversion-derived estimates of graphite contact angle for oil-water-filled porous material containing water-wet sands, clays, and graphite, in accordance with an embodiment.
Figure 7C:
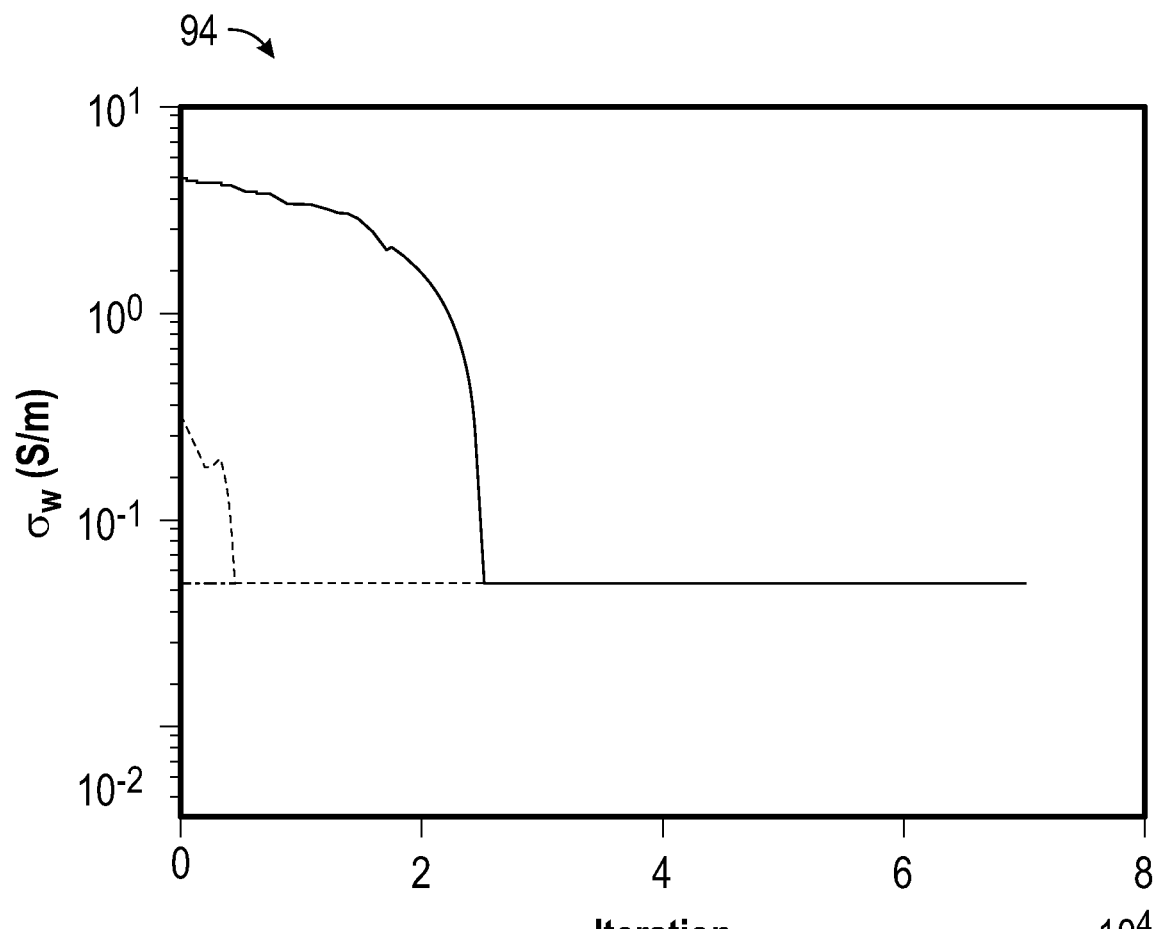
FIG. 7C shows graphs depicting a history of Markov Chain Monte Carlo (MCMC) inversion-derived estimates of water conductivity for oil-water-filled porous material containing water-wet sands, clays, and graphite, in accordance with an embodiment.

FIGS. 7A, 7B, and 7C (i.e., FIGS. 7A-C) show a graph 90, a graph 92, and a graph 94, which each depict a history of Markov Chain Monte Carlo (MCMC) inversion-derived estimates. More specifically, the graph 90, the graph 92, and the graph 94 illustrate the MCMC inversion of multi-frequency EM measurements of conductivity and permittivity (shown in FIGS. 9A and 9B) to estimate clay surface conductance $\lambda_c$ (e.g., shown in graph 90), graphite contact angle θ (e.g., shown in graph 92), and water conductivity $\sigma_w$ (e.g., shown in graph 90) for oil/water-filled porous material containing water-wet sand, clays, and graphite.

Figure 8A:
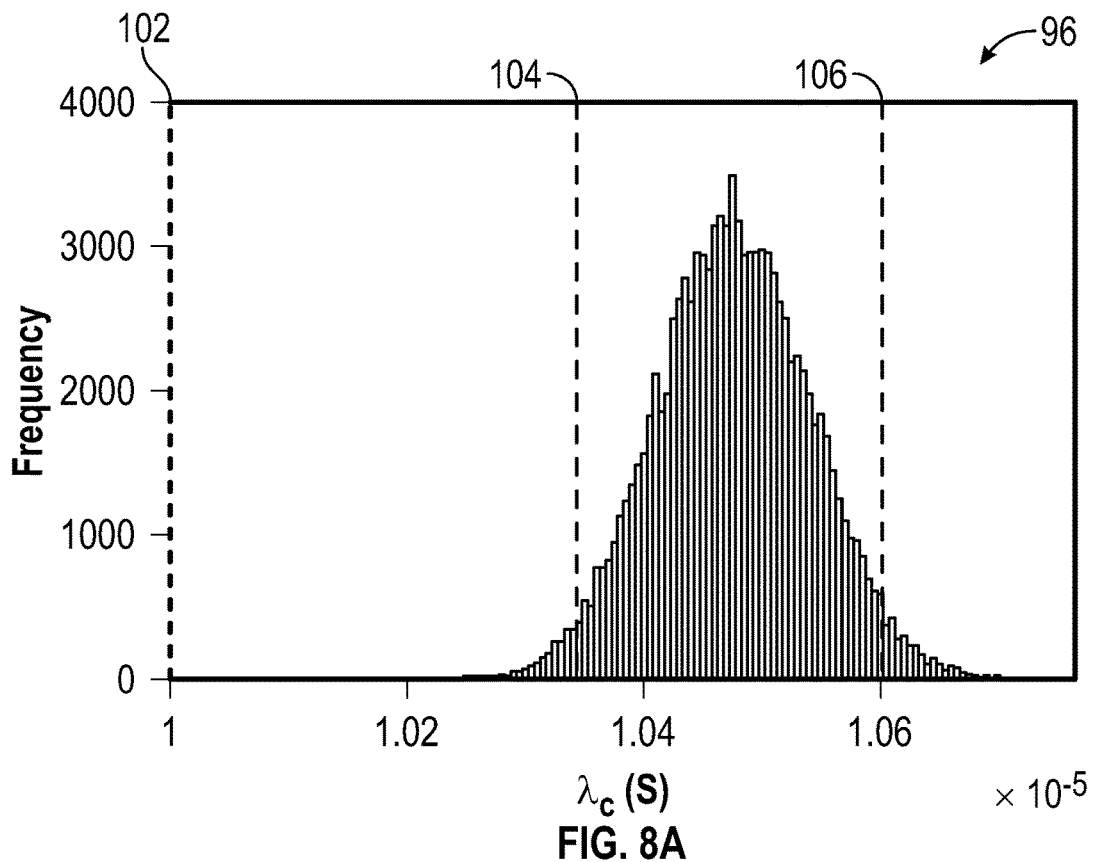
FIG. 8A shows graphs depicting a histogram of MCMC inversion-derived estimates of clay surface conductance of FIG. 7A, in accordance with an embodiment.
Figure 8B:
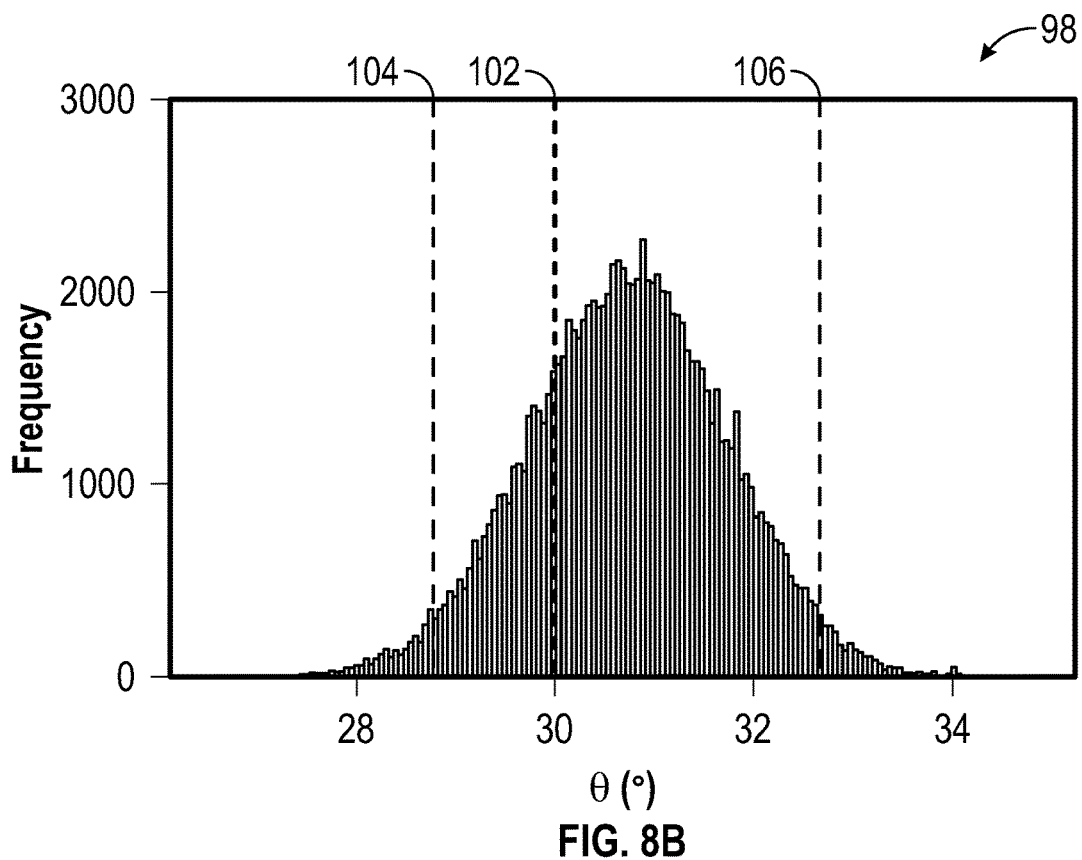
FIG. 8B shows graphs depicting a histogram of MCMC inversion-derived estimates of graphite contact angle of FIG. 7B, in accordance with an embodiment.
Figure 8C:
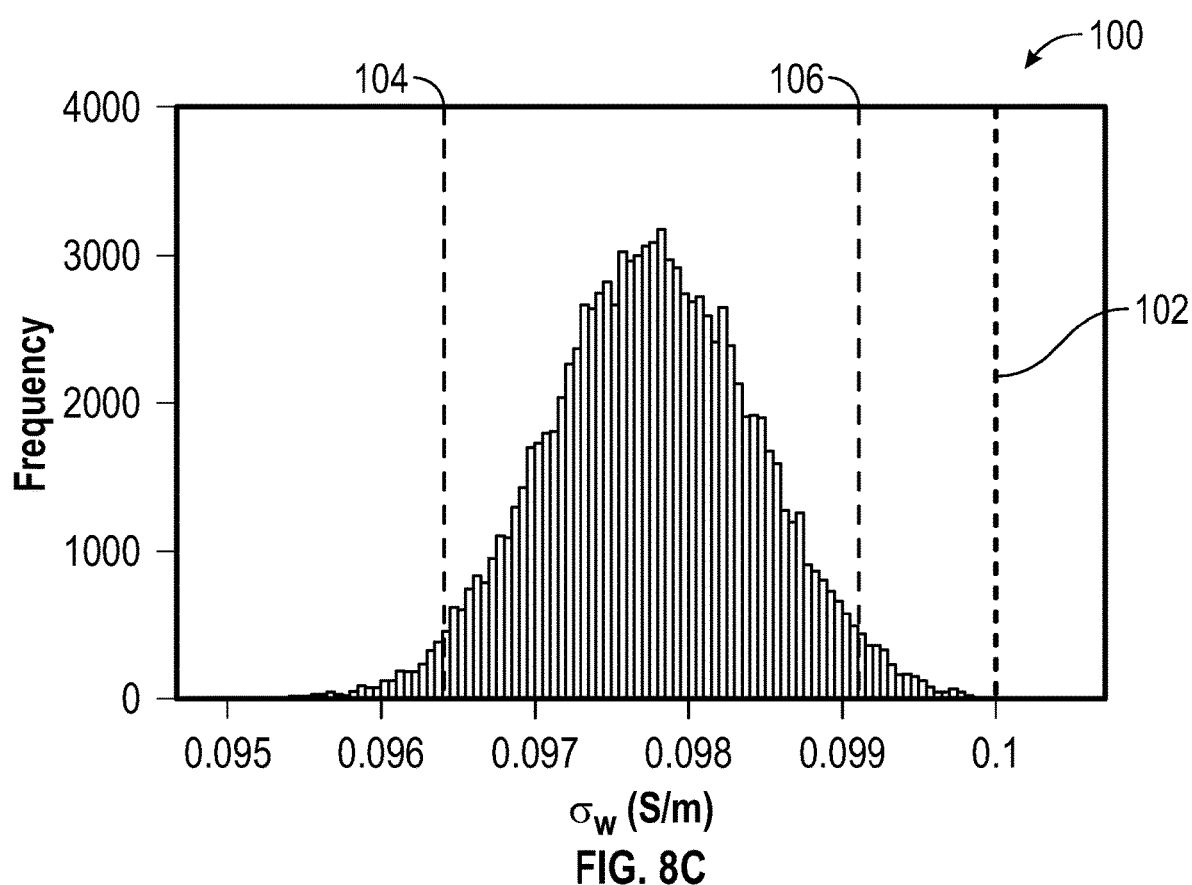
FIG. 8C shows graphs depicting a histogram of MCMC inversion-derived estimates of water conductivity of FIG. 7C, in accordance with an embodiment.

FIGS. 8A, 8B, and 8C (i.e., FIGS. 8A-C) show a graph 96, a graph 98, and a graph 100, which each depict a histogram of MCMC inversion-derived estimates of clay surface conductance, graphite contact angle, and water conductivity. The graph 96, the graph 98, and the graph 100 represent histograms of MCMC inversion-derived estimates of clay surface conductance $\lambda_c$ (e.g., shown in graph 96), graphite contact angle θ (e.g., shown in graph 98), and water conductivity $\sigma_w$ (e.g., shown in graph 100). A line 102 represents the original values of the properties and the region between lines 104 and 106 represent 90% highest posterior density (HPD) interval of the inversion-derived estimates.

FIGS. 9A and 9B show a graph 108 of multi-frequency EM measurements and a graph 110 of model predictions based on inversion-derived estimates. More specifically, the graph 108 and the graph 110 illustrates a comparison of the multi-frequency EM measurements against the mechanistic model predictions for effective permittivity based on the inversion-derived estimates for effective conductance and effective permittivity.

Figure 10A:
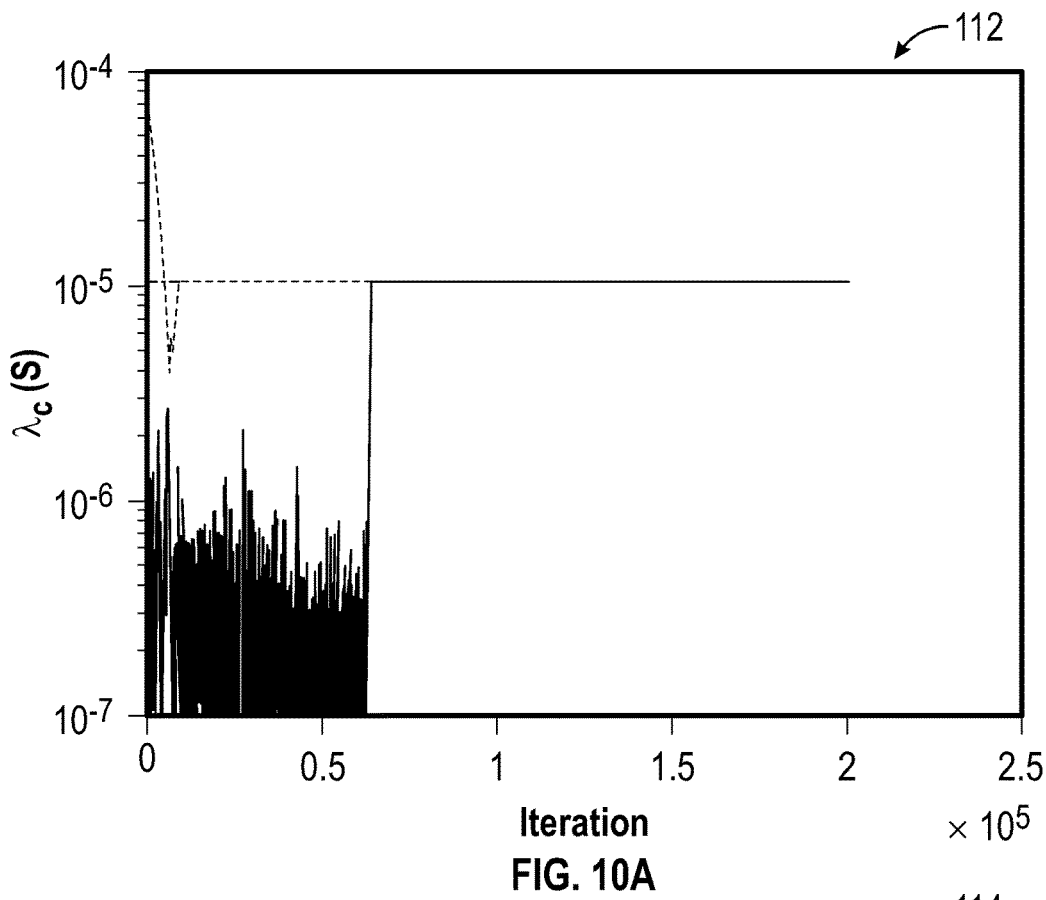
FIG. 10A shows graphs depicting a history of Markov Chain Monte Carlo (MCMC) inversion-derived estimates for clay surface conductance for oil-water-filled porous material containing water-wet sands, clays, and slightly oil-wet graphite, in accordance with an embodiment.
Figure 10B:
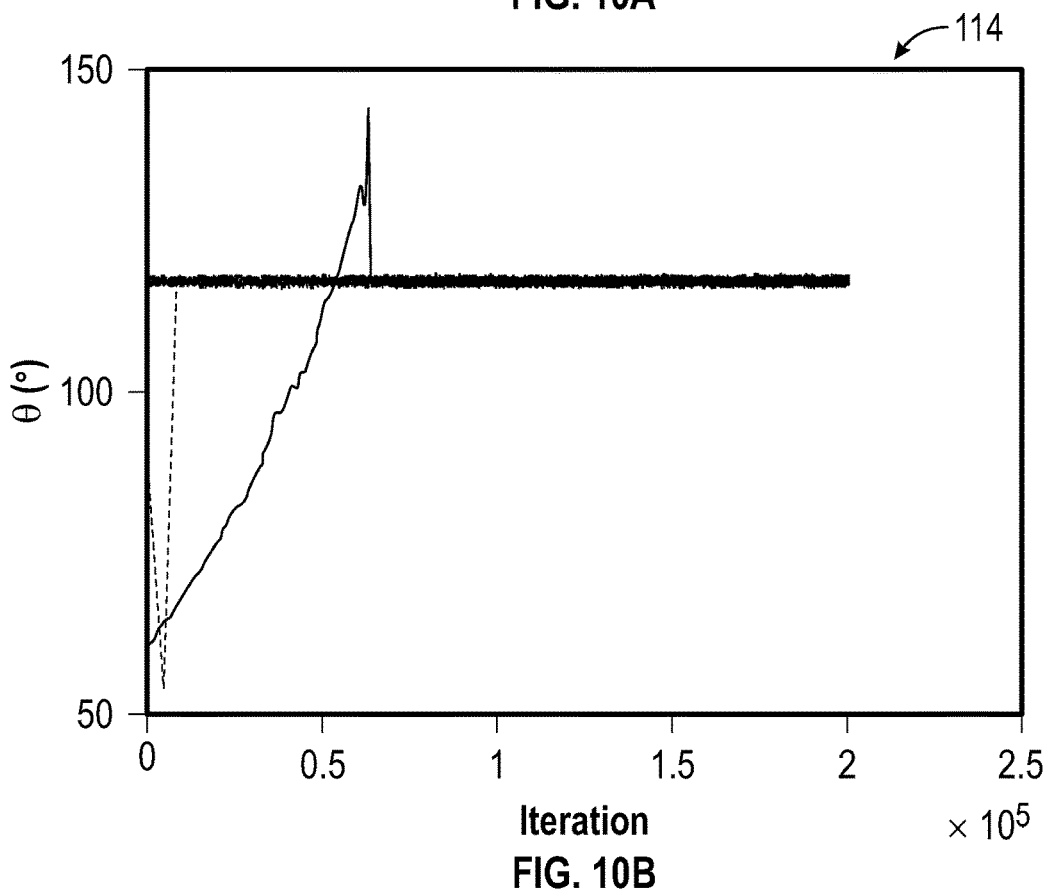
FIG. 10B shows graphs depicting a history of Markov Chain Monte Carlo (MCMC) inversion-derived estimates for graphite contact angle for oil-water-filled porous material containing water-wet sands, clays, and slightly oil-wet graphite, in accordance with an embodiment.
Figure 10C:
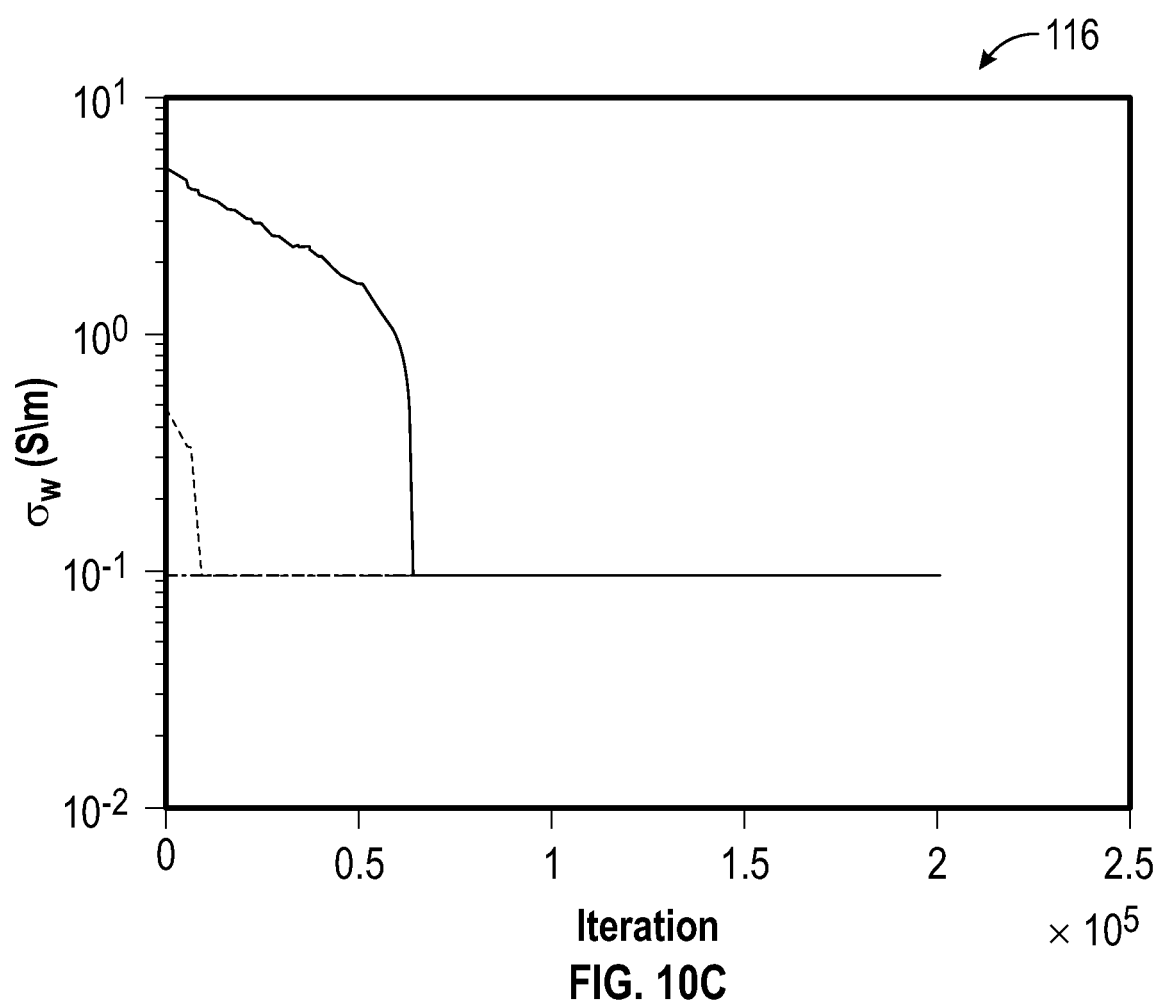
FIG. 10C shows graphs depicting a history of Markov Chain Monte Carlo (MCMC) inversion-derived estimates for water conductivity for oil-water-filled porous material containing water-wet sands, clays, and slightly oil-wet graphite, in accordance with an embodiment.

FIGS. 10A, 10B, and 10C show a graph 112, a graph 114, and a graph 116, which each depict a history of Markov Chain Monte Carlo (MCMC) inversion-derived estimates. More specifically, the graph 112, the graph 114, and the graph 116 illustrate the MCMC inversion of multi-frequency EM measurements of conductivity and permittivity (shown in FIGS. 12A and 12B) to estimate clay surface conductance $\lambda_c$ (e.g., shown in graph 112), graphite contact angle θ (e.g., shown in graph 114), and water conductivity $\sigma_w$ (e.g., shown in graph 116) for oil/water-filled porous material containing water-wet sand and clays and slightly oil-wet graphite.

Figure 11A:
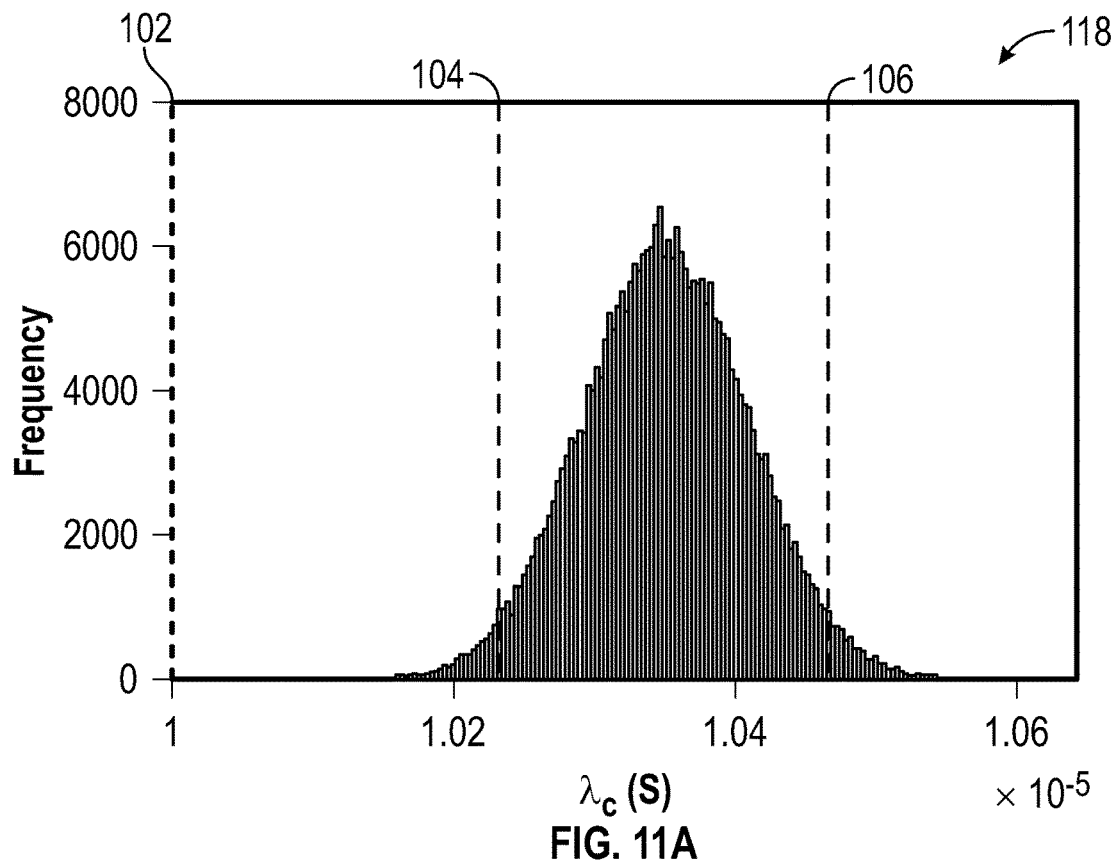
FIG. 11A shows graphs depicting a histogram of MCMC inversion-derived estimates of clay surface conductance of FIG. 10A, in accordance with an embodiment.
Figure 11B:
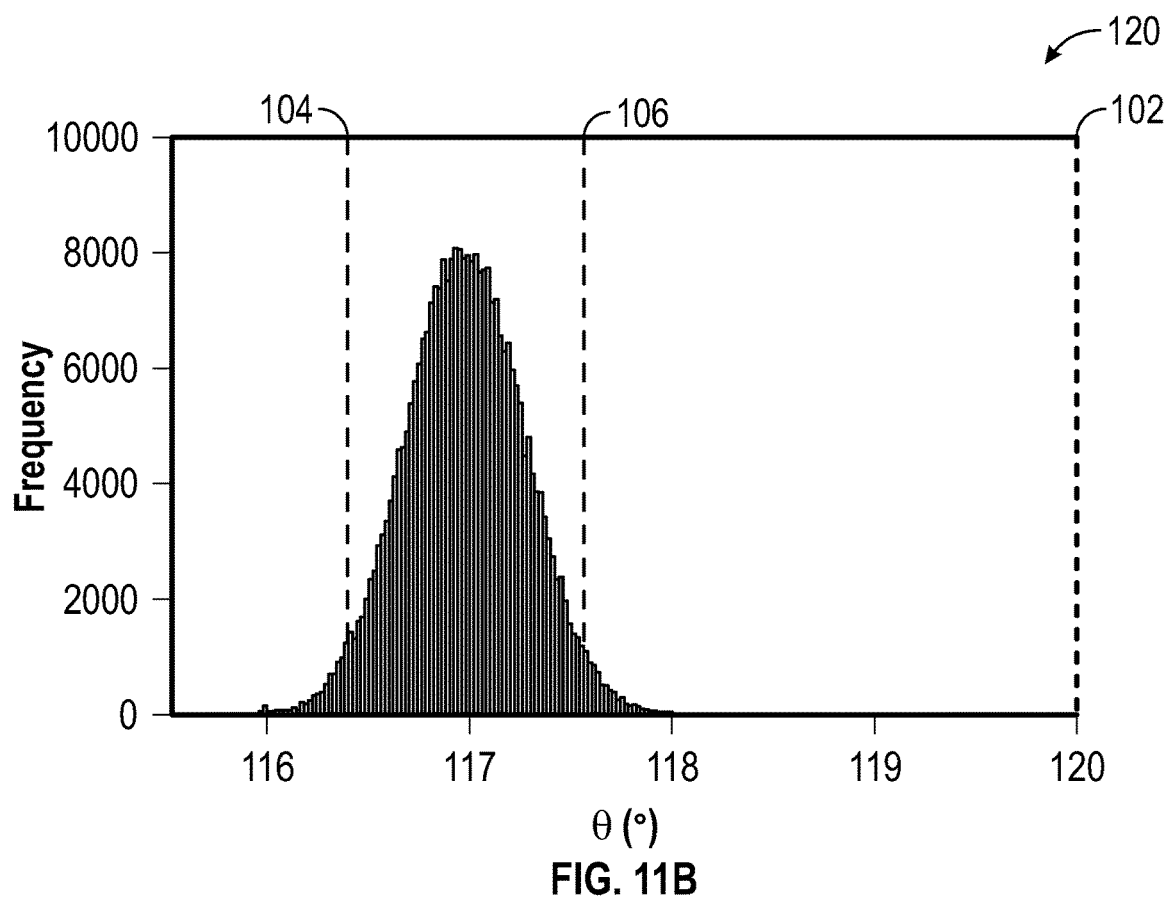
FIG. 11B shows graphs depicting a histogram of MCMC inversion-derived estimates of graphite contact angle of FIG. 10B, in accordance with an embodiment.
Figure 11C:
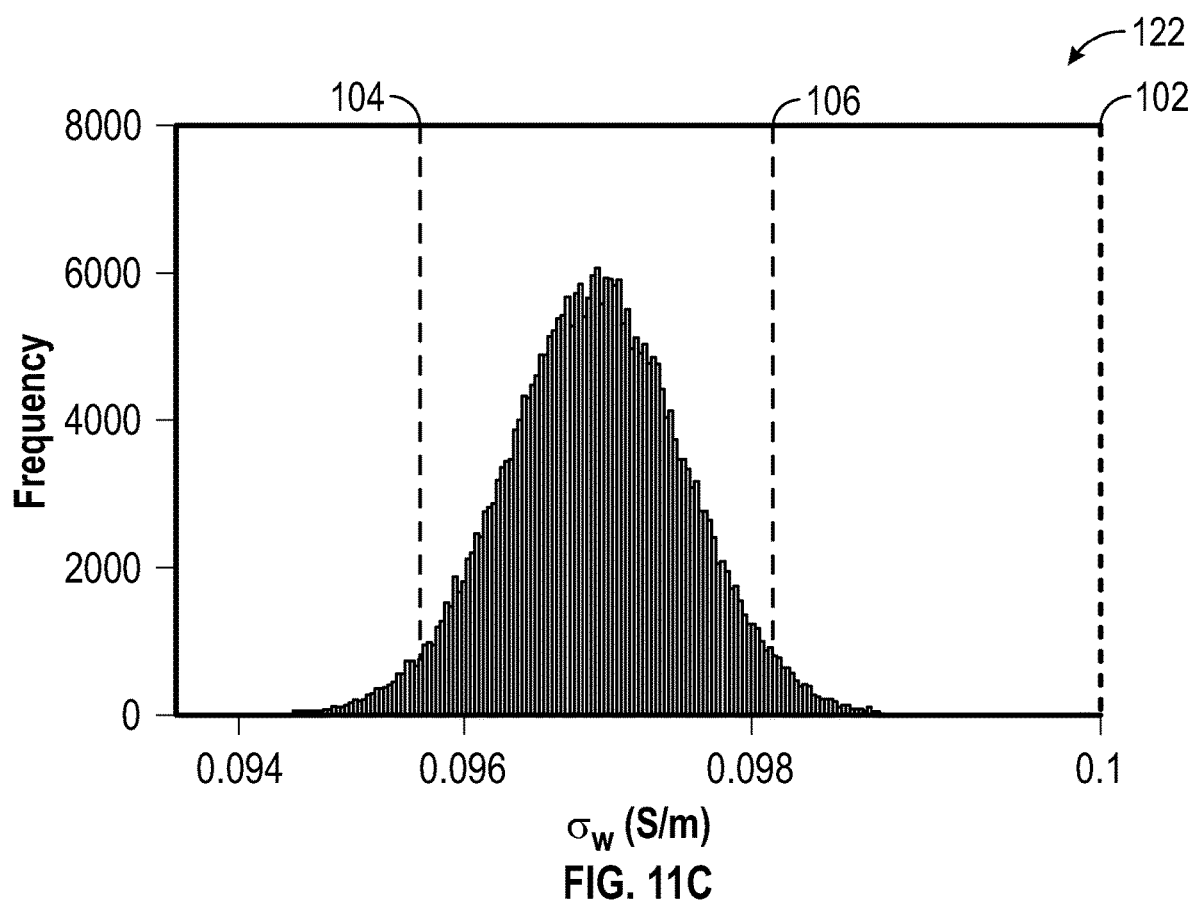
FIG. 11C shows graphs depicting a histogram of MCMC inversion-derived estimates of water conductivity of FIG. 10C, in accordance with an embodiment.

FIGS. 11A, 11B, and 11C show a graph 118, a graph 120, and a graph 122, which each depict a histogram of MCMC inversion-derived estimates of clay surface conductance, graphite contact angle, and water conductivity. More specifically, the graph 118, the graph 120, and the graph 120 illustrate a histogram of MCMC inversion-derived estimates of clay surface conductance $\lambda_c$ (e.g., shown in graph 118), graphite contact angle θ (e.g., shown in graph 120), and water conductivity $\sigma_w$ (e.g., shown in graph 122). The line 102 represents the original values of the properties and the region between lines 104 and 106 represent 90% HPD interval of the inversion-derived estimates.

FIGS. 12A and 12B show a graph 124 of multi-frequency MS measurements and a graph 126 of model predictions based on inversion-derived estimates. More specifically, the graph 124 and graph 126 illustrate a comparison of the multi-frequency EM measurements against the mechanistic model predictions based on the inversion-derived estimates of effective conductance and effective permittivity.

Figure 13A:
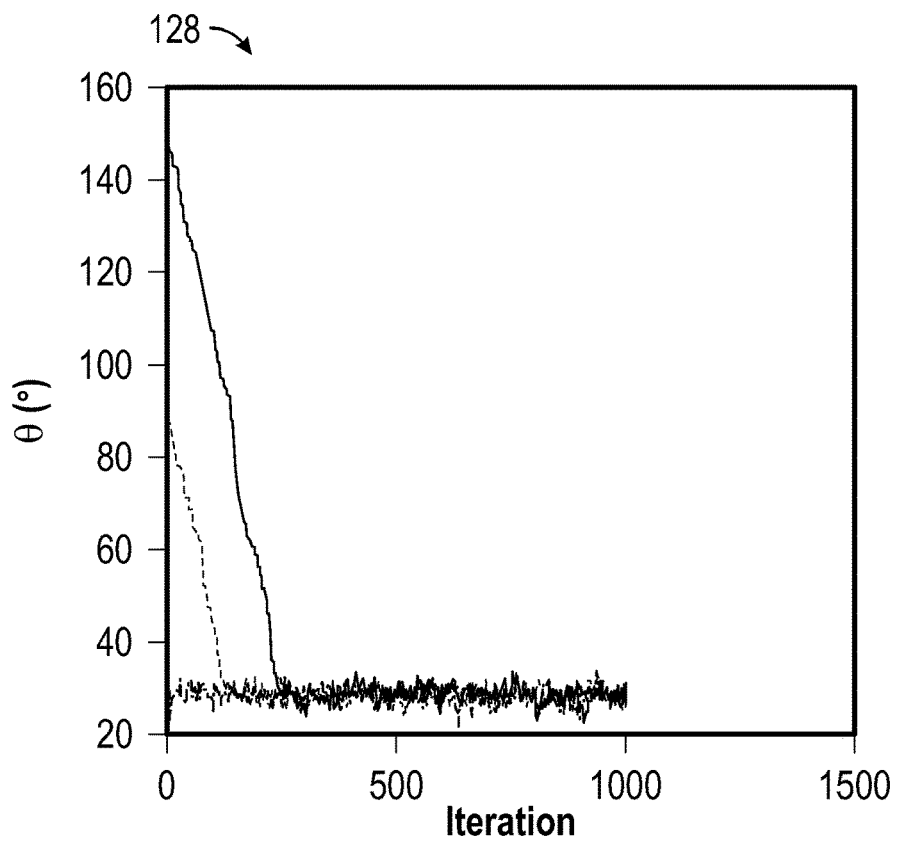
FIG. 13A shows a graph depicting a history of Markov Chain Monte Carlo (MCMC) inversion-derived estimates for contact angle for oil/water-filled porous material containing water-wet sand and clays and oil-wet graphite, in accordance with an embodiment.
Figure 13B:
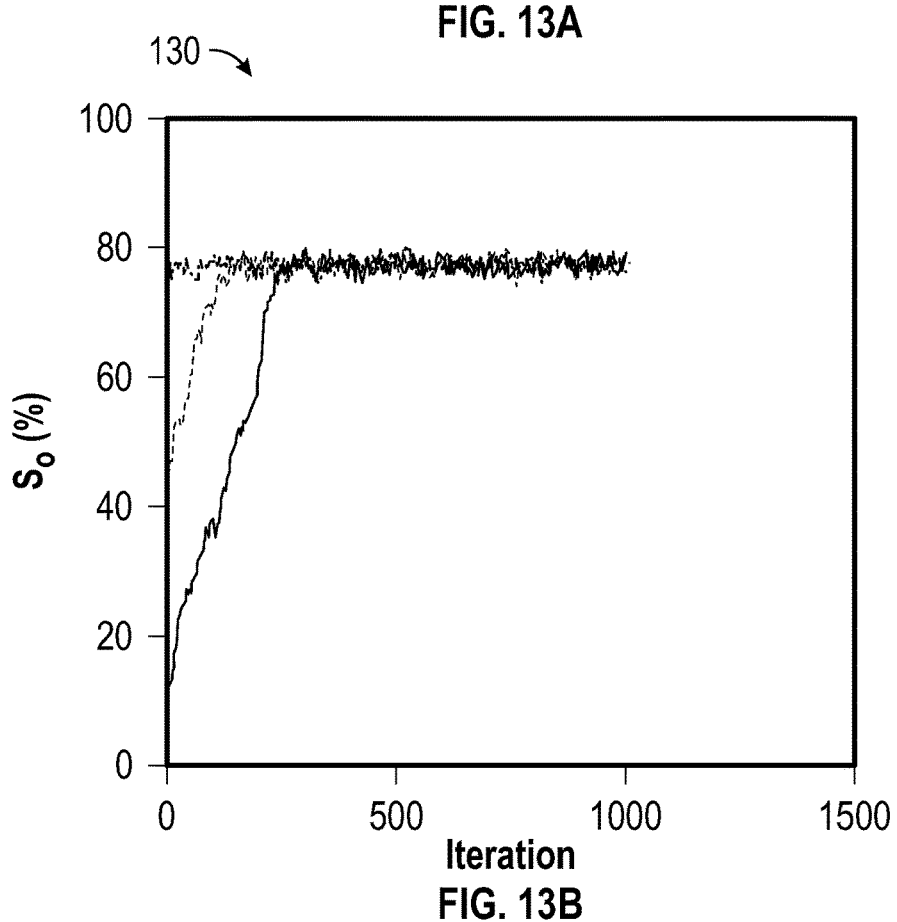
FIG. 13B shows a graph depicting a history of Markov Chain Monte Carlo (MCMC) inversion-derived estimates for contact angle for oil saturation oil/water-filled porous material containing water-wet sand and clays and oil-wet graphite, in accordance with an embodiment.

FIGS. 13A and 13B show a graph 128 and a graph 130 that each history of Markov Chain Monte Carlo (MCMC) inversion-derived estimates. More specifically, the graph 128 and the graph 130 illustrate the MCMC inversion of multi-frequency EM measurements of conductivity and permittivity (shown in FIGS. 15A and 15B) to estimate graphite contact angle θ and oil saturation $S_o$ for oil/water-filled porous material containing water-wet sand and clays and oil-wet graphite.

Figure 14A:
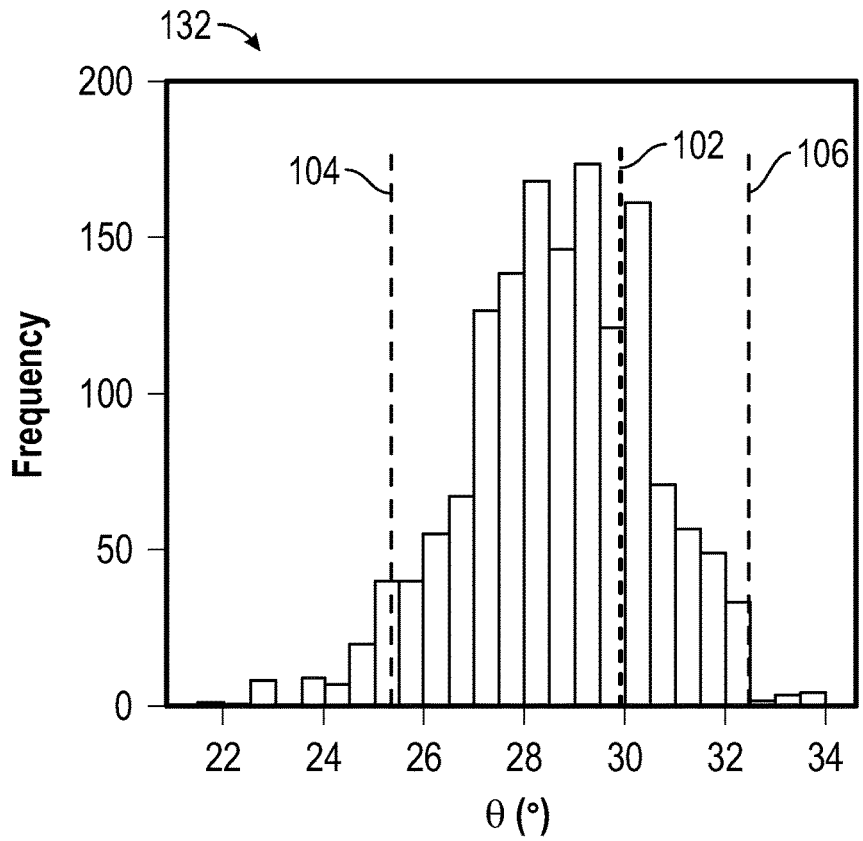
FIG. 14A shows a graph depicting a histogram of MCMC inversion-derived estimates of clay surface conductance of FIG. 13A, in accordance with an embodiment.
Figure 14B:
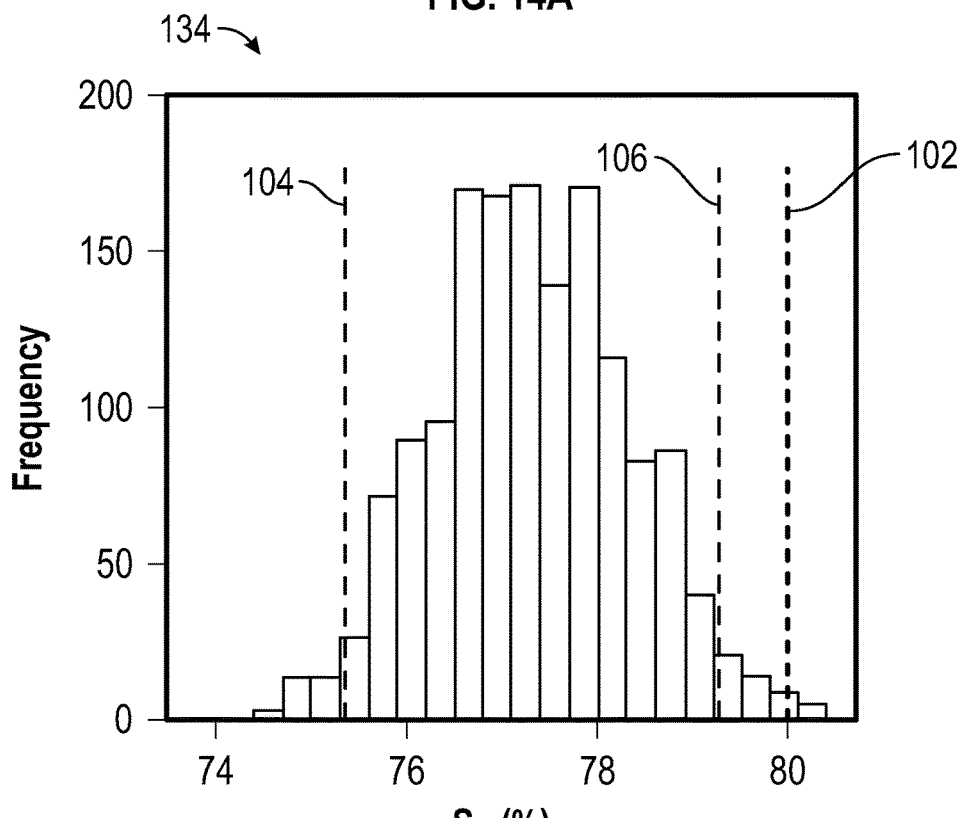
FIG. 14B shows a graph depicting a histogram of MCMC inversion-derived estimates of oil saturation of FIG. 13B, in accordance with an embodiment.

FIGS. 14A and 14B show a graph 132 and a graph 134 that each depict a third histogram of MCMC inversion-derived estimates of clay surface conductance, graphite contact angle, and water conductivity. More specifically, the graph 132 and the graph 134 illustrate the histogram of MCMC inversion-derived estimates of graphite contact angle θ and oil saturation $S_o$. The line 102 represents the original values of the properties and the region between lines 104 and 106 represent 90% HPD interval of the inversion-derived estimates.

Figure 15A:
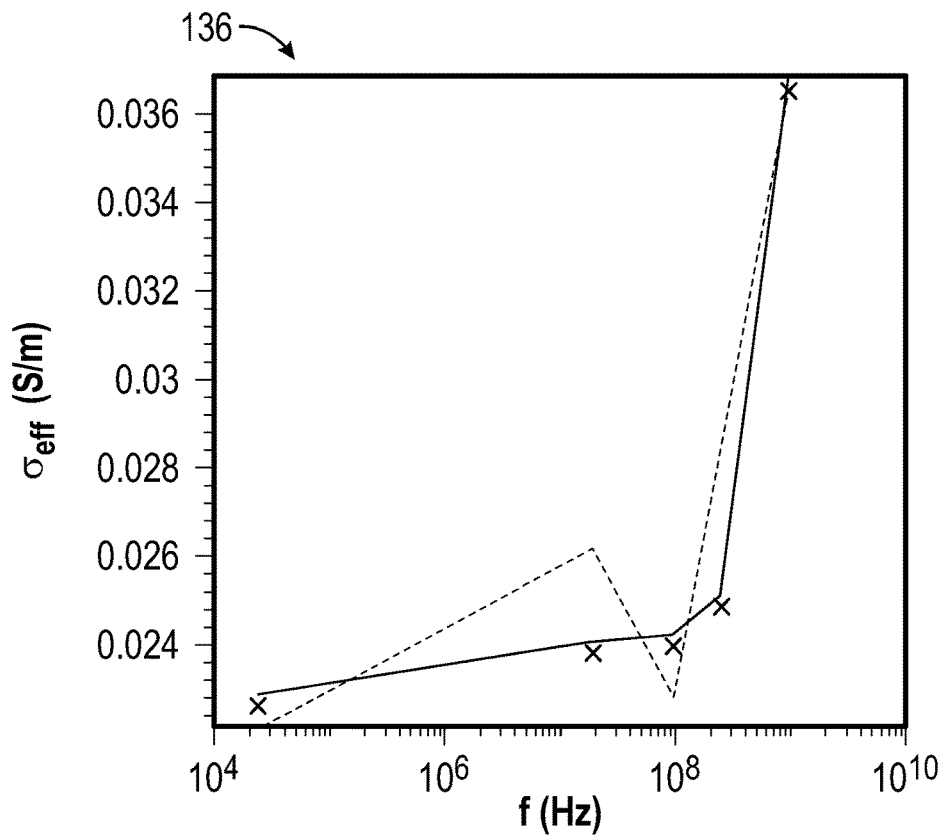
FIG. 15A shows multi-frequency EM measurements and model predictions for effective conductance based on inversion-derived estimates associated with FIGS. 13A and 13B, and FIGS. 14A and 14B, in accordance with an embodiment.
Figure 15B:
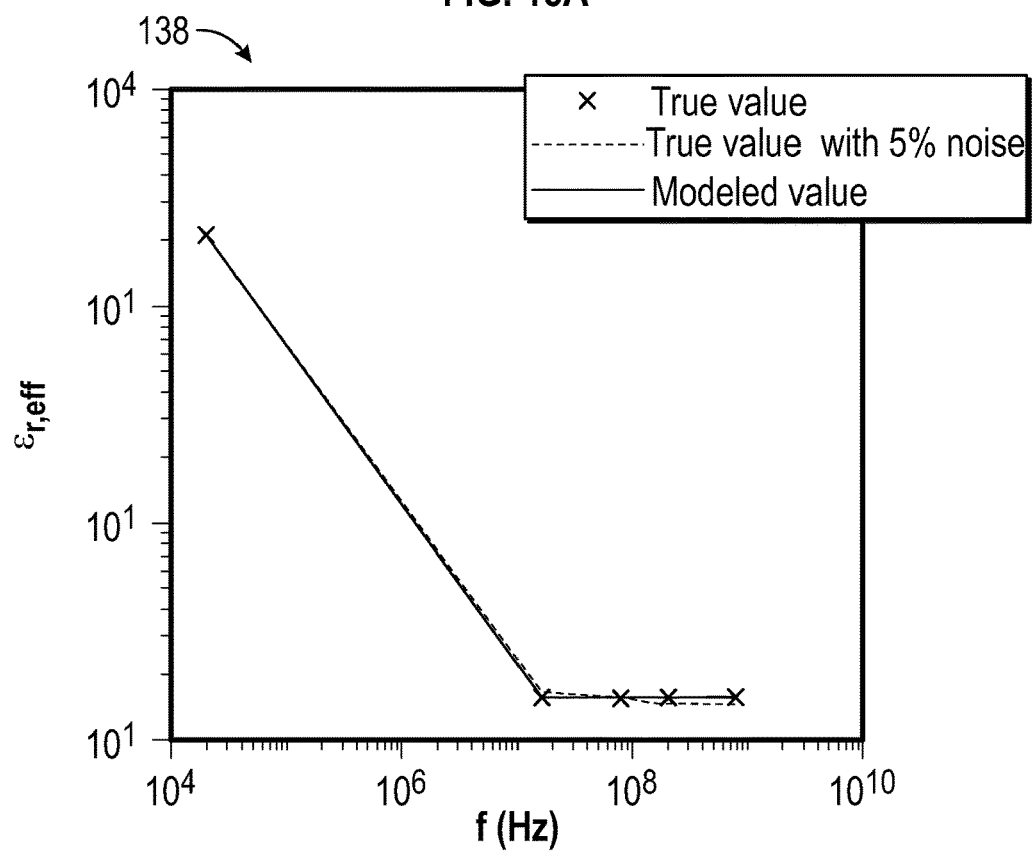
FIG. 15B shows multi-frequency EM measurements and model predictions for effective permittivity based on inversion-derived estimates associated with FIGS. 13A and 13B, and FIGS. 14A and 14B, in accordance with an embodiment.

FIGS. 15A and 15B show a graph 136 of multi-frequency MS measurements and a graph 138 model predictions based on inversion-derived estimates. More specifically, the graph 136 and the graph 138 illustrate a comparison of the multi-frequency EM measurements against the mechanistic model predictions based on the inversion-derived estimates of effective conductance and effective permittivity.

Accordingly, the present disclosure is directed to techniques for quantitatively determining effects of wettability (e.g., contact angle) of conductive particles on the multi-frequency complex conductivity of fluid-filled porous materials, such as a geological formation. In some embodiments, the techniques include developing a material and subsurface characterization model 46. The material and subsurface characterization model 46 may be developed by solving the Young-Laplace equation as discussed herein. Additionally, the material and subsurface characterization model 46 may be developed by applying, invoking, or utilizing the Poisson-Nernst-Planck (PNP) equation to quantify dipolarizability of a partially wetted graphite particle. Further, developing the model may include using an effective medium model to combine the interfacial polarization effects of nonconductive particles (e.g., sand and clay) and conductive particles (e.g., graphite and pyrite) to compute the complex conductivity of fluid-filled porous material containing strongly water-wet nonconductive particles and conductive particles of any wettability.

NOMENCLATURE

PPIP model=perfectly polarized interfacial polarization model
SCAIP model=surface-conductance-assisted interfacial polarization model
a=characteristic length of inclusion phase (m)
$A_o$=surface area of graphite particle covered by oil (m$^2$)
$A_s$=surface area of graphite particle (m$^2$)
$A_w$=surface area of graphite particle covered by water (m$^2$)
$B_o$=Bond number
$D_j$=diffusion coefficient of charge carriers of medium j (m$^2$/s)
e=Euler's number
$E_0$=amplitude of the electric field (V)
$E_0$=vacuum permittivity (8.854×10$^{-12}$ F/m)
$\varepsilon_{eff}$=effective dielectric permittivity of the mixture (F/m)
$\varepsilon_j$=dielectric permittivity of medium j (F/m)
$\varepsilon_{r,j}$=relative permittivity of medium j
f=frequency (Hz)
$f_j$ ($\omega$)=dipolarizability (dipolar field coefficient) of medium j
f($\varphi$)=a function of wetting angle $\varphi$
g=gravitational acceleration (N/kg)
G=dimensionless form of h−h$_i$
h(r)=height of oil-water interface at any distance r away from the vertical axis z (m)
ĥ=dimensionless form of h
$h_c$=height where the oil-water interface contacts the particle surface (m)
$h_i$=height of oil-water interface in the absence of wetting of graphite (far-field height) (m)
H=mean curvature of the meniscus surface (m$^{-1}$)
i=square root of −1
$I_0$=modified Bessel function of the first kind of order 0
$K_0$=modified Bessel function of the second kind of order 0
$K_1$=modified Bessel function of the second kind of order 1
$L_c$=capillary length (m)
$\lambda$=surface conductance (S)
$\omega$=angular frequency of the electric field (rad/s)
$\Delta p$=Laplace pressure (Pa)

$p_o$=proportion of graphite surface that covered by oil (%)
$p_w$=proportion of graphite surface that covered by water (%)
$\varphi$=wetting angle (°)
$\phi$=porosity of the porous media (%)
$\phi_j$=volume fraction of medium j in the mixture (%)
$\phi_o$=volume fraction of oil in the mixture (%)
$\psi$=angle between oil-water interface and the horizon (x-axis) at contact point (°)
q=elementary charge (1.6×10$^{-19}$ C)
r=distance from vertical axis z (m)
r̂=dimensionless form of r
R=radius of graphite particle (m)
$\rho_o$=density of oil (kg/m$^3$)
$\rho_w$=density of water (kg/m$^3$)
$S_o$=oil saturation (%)
$\sigma$=interfacial tension between oil and water (N/m)
$\sigma_{eff}$=effective electrical conductivity of the mixture (S/m)
$\sigma_{eff}$*=effective complex electrical conductivity of the mixture (S/m)
$\sigma_j$=electrical conductivity of medium j (S/m)
$\sigma_j$*=complex electrical conductivity of medium j (S/m)
$\theta$=contact angle (°)

Another aspect of the present disclosure relates to systems and methods for using a material and subsurface characterization model to quantify the effects of wettability of nonconductive particles. Moreover, the model may be implemented to determine the wettability effects of the solid particles that produce interfacial polarization phenomena on multi-frequency electromagnetic measurements. Further, the material and subsurface characterization model, in accordance with the present disclosure, provides a novel technique for identifying a range of operating frequencies for electromagnetic measurements to characterize the contact angle of solid particles that are present within a subsurface formation.

Figure 16:
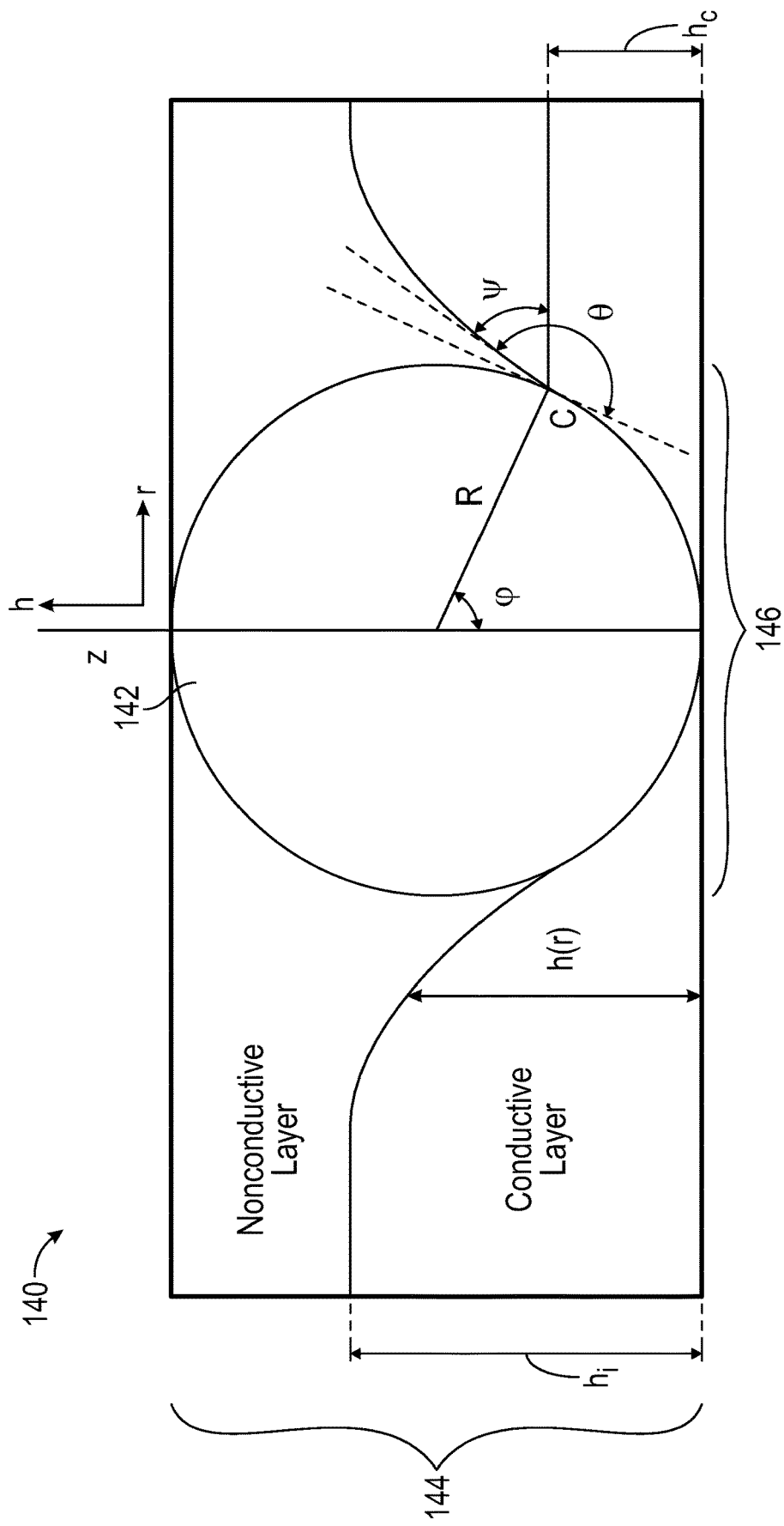
FIG. 16 is an example illustration of a cross section of a volume that includes a solid suspended in an oil-water media, in accordance with an embodiment.

With the foregoing in mind, FIG. 16 is an example illustration of a cross-section of a volume 140 (e.g., within a geological formation) that includes a solid particle 142 suspended in an oil-water media, in accordance with an embodiment. In general, the volume 140 may be assumed for developing the model, as discussed herein. As shown, the solid particle 142 is a circle (e.g., a cross-section of a sphere); however, it should be noted that, in some embodiments, the solid particle may be ellipsoidal (e.g., a first diameter 144 of the solid particle 142 may be greater than or less than a diameter 146 of the solid particle 142) or have a radial normal distribution of radii.

In the illustrated cross-section of the volume 140 shown in FIG. 16, C denotes the point where the oil-water interface (e.g., interface between the non-wetting layer and the wetting layer) contacts the particle surface; $\theta$ is the contact angle of conductive particle; $\varphi$ is the wetting angle; $\psi$ is the angle between oil-water interface and the horizon (x-axis) at point C; R is the radius of conductive particle; $h_i$ is the uniform height of oil-water interface in the absence of wetting of the conductive particle (far-field height); $h_c$ is the height where the oil-water interface contacts the particle surface, such that $h_c$=R(1−cos $\varphi$); r is the horizontal distance perpendicular to the vertical axis z; and h(r) is the height of oil-water interface at any distance r away from the vertical axis z.

The preferential spread/wetting of the wetting/non-wetting interface generates a wetting angle, which represents the surface area of the solid particle in contact with each of the two fluid phases. The interfacial polarization the phenomena due to such solid particle in contact with two distinct fluid types are entirely governed by the extent to which solid particle is surround by the wetting phase versus non-wetting phase, which is governed by the wettability and contact angle of the solid particle. For example, when water wets a clay particle, the interfacial polarization effects on the complex conductivity/permittivity measurements will be enhanced. In another example, when the clay particle is preferentially oil wet, its interracial polarization effects on the complex conductivity/permittivity measurements will diminish.

From an effective medium standpoint, the effective complex conductivity of a porous fluid-filled geomaterial containing surface-charge-bearing nonconductive particles (e.g., water-wet sand and mixed-wet clay particles) at any saturation of the wetting phase (e.g., water) may be expressed as:

$$\frac{K_{eff} - K_w}{K_{eff} + 2K_w} = \sum \phi_{n1} f_{n1}(\omega) + \sum \phi_{n2} f_{n2,w}(\omega) p_w + \sum \phi_{n2} f_{n2,nw}(\omega)(1 - p_w) + \phi_{nw} f_{nw}(\omega)$$

$K_{eff}$ is the effective complex conductivity of the porous fluid-filled geomaterial; $K_w$ is the complex conductivity of pore-filling wetting phase, which is brine or saline water in our case, with an assumption that the complex conductivity of pore-filling non-wetting phase, which is oil in our case, is negligible; f is the dipolarizability due to interfacial polarization of solid particle; ωω is the angular frequency of the external EM field; ϕ is the volume fraction of solid particles or the fluid phases; $p_w$ is the proportion of a single solid particle surface that is covered by wetting phase (water) determined using the newly developed model of wetting angle of a solid particle; and Subscripts n1, n2, nw, and w represent water-wet surface-charge-bearing nonconductive particle #1 (e.g. sand), surface-charge-bearing nonconductive particle #2 of any wettability (e.g. clay), non-wetting phase (e.g. oil), and wetting phase (e.g. water), respectively.

When a surface-charge-bearing nonconductive solid particle is not fully wet, the interfacial polarization effect of the surface-charge-bearing nonconductive solid particle may be determined as a volumetric mixing of interfacial polarization when the solid particle is completely surrounded by non-wetting fluid phase, $f_{c,nw}$, and that when completely surround by wetting fluid phase, $f_{c,w}$, expressed as $\phi_{n2} f_{n2,w}(\omega) p_w + \phi_{n2} f_{n2,nw}(\omega)(1-p_w)$, where $p_w$ is the proportion of the solid particle surface that is covered by wetting phase (water) determined using the newly developed model of wetting angle of a solid particle. For example, the portion of a single clay surface that is covered by a wetting phase may be expressed as:

$$p_w = \frac{1 - \cos\varphi}{2}$$

where φ is the wetting angle.

Dipolarizability of Nonconductive Particle (eg., Clay, Sand, Oil) Completely Immersed in Wetting Phase $$f_{non-conductive}(\omega) = \frac{Q(R + A) - P}{Q(R - 2A) + 2P}$$

where:

$$A = \frac{1}{a^2}$$

$$P = \gamma_w^2 + \xi_w^2 \frac{G^*}{H^*} + \frac{2G^*}{a^2 L}$$

$$Q = \frac{1}{iF + 1}\left[2 - \frac{a^2 \xi_h^2}{H^*}\left(\frac{L}{iF} + E\right) - \frac{2E}{L}\right]$$

$$R = \frac{P}{Q}\left(\frac{iFE + L}{iF + 1}\right)$$

$$H^* = \frac{aL_w}{F_w}, G^* = \frac{aG_w}{E_w}, L = \frac{2\lambda}{a\sigma_w}, E = \frac{\epsilon_n}{\epsilon_w}, F = \frac{\sigma \epsilon_w}{\sigma_w}$$

$$F_w = \frac{q}{\gamma_w^2 \epsilon_w} e^{-a\gamma_w}\left[\frac{1}{a\gamma_w} + \frac{1}{(a\gamma_w)^2}\right]$$

$$g_w = \frac{q}{\gamma_w \epsilon_w} e^{-a\xi_w}\left[\frac{1}{a\gamma_w} + \frac{2}{(a\gamma_w)^2} + \frac{2}{(a\gamma_w)^3}\right]$$

$$L_w = \frac{q}{\xi_w \epsilon_w} e^{-a\xi_w}\left[\frac{1}{a\xi_w} + \frac{2}{(a\xi_w)^2} + \frac{2}{(a\xi_w)^3}\right]$$

$$\gamma_w = \sqrt{\frac{i\omega}{D_w} + \frac{\sigma_w}{\epsilon_w D_w}}$$

$$\xi_w = \sqrt{\frac{i\omega}{D_w}}$$

where a is characteristic length of inclusion phase; ω is the angular frequency of the electric field; i is square root of −1; λ is surface conductance of nonconductive particle; σ is electrical conductivity; ε is dielectric permittivity; and D is diffusion coefficient of charge carriers.

If the nonconductive particle is immersed in non-wetting phase, the surface conductance may be set to be a very small number. It should be noted that the equations for the disclosed model above represent one example embodiment. That is, there can be other alternative forms for the dipolarizability of nonconductive particle (e.g. clay, sand, oil) completely immersed in wetting phase.

Inversion Algorithm

We applied the Markov Chain Monte Carlo (MCMC) inversion algorithm for the purposes of estimating water saturation, wettability of solid particles, conductivity of water/brine filling the porous material, and clay surface conductance. Implementation of the inversion scheme coupled with the new mechanistic model of wettability effects improves the interpretation and processing of subsurface electromagnetic log.

Mechanistic Model Predictions of Multi-Frequency Complex Conductivity

Based on some assumption of the properties of solid particles and fluid phases in the fluid-filled porous material and the list of unknown properties to be estimated, the disclosed mechanistic model may be used to identify the frequency range where frequency dispersions in conductivity and/or permittivity will be dominant and measurable for purposes of desired estimations. Electromagnetic (EM) measurements in all the following cases (presented in FIGS. 17A-D, and FIGS. 18A-D) were tuned to be within the frequency range identified using the mechanistic model, such that the number of discrete frequencies as which the measurements were acquired is at least 3 times the number of physical properties to be estimated.

Figure 17A:
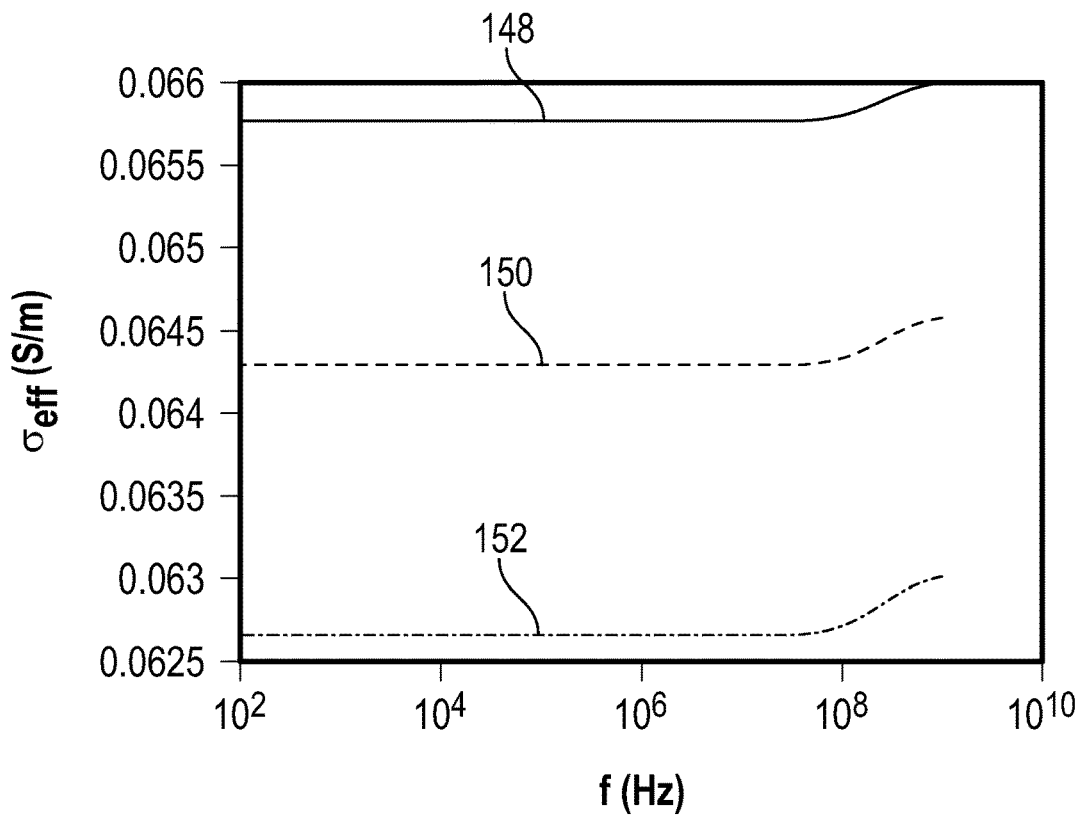
FIG. 17A shows a graph illustrating an example of determined effective conductivity for fluid-filled porous material for different contact angles with a 10% oil saturation, in accordance with an embodiment.

FIGS. 17A, 17B, 17C, and 17D (i.e., FIGS. 17A-17D) show graphs indicating the effect of contact angle on the properties of a nonconductive solid particle. More specifically, the curves 148, 150, and 152 of FIG. 17A show the effective conductivity at a contact angle of 30 degrees, 90 degrees, and 150 degrees for a mixture containing water-wet sand and clay particles with a surface conductance of $10^{-6}$ S, partially saturated with brine/water and an oil saturation of 10%.

Figure 17B:
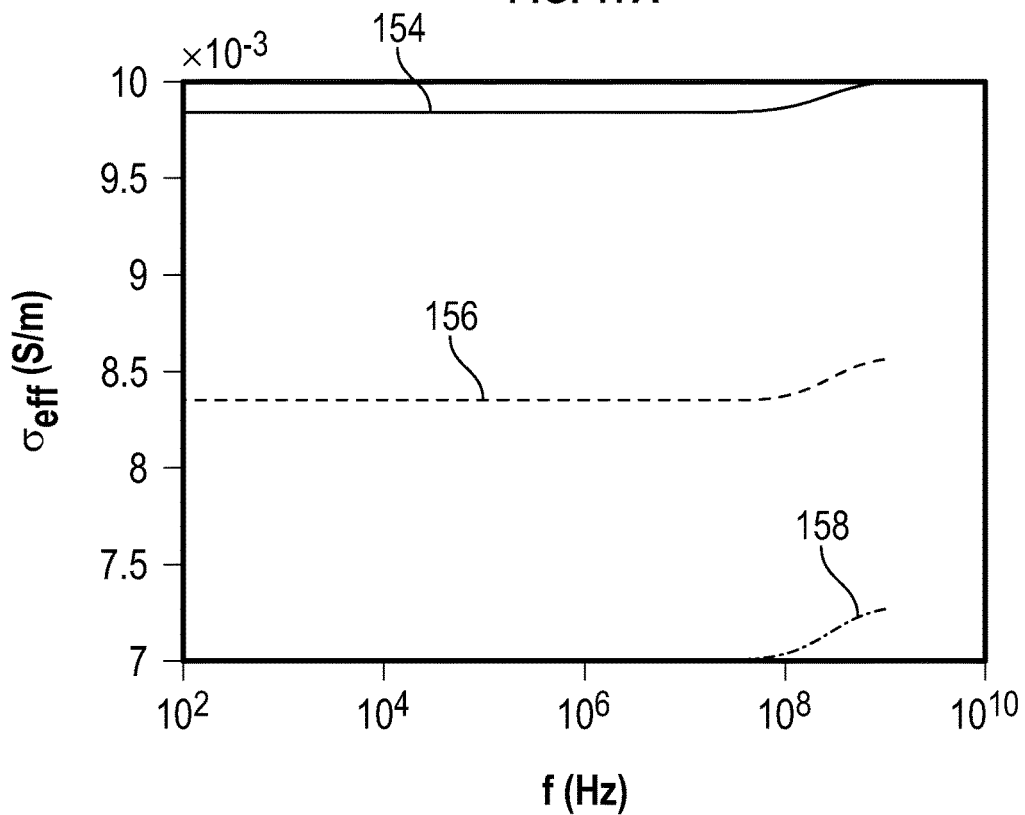
FIG. 17B shows a graph illustrating an example of determined effective conductivity for fluid-filled porous material for different contact angles with a 90% oil saturation, in accordance with an embodiment.

The curves 154, 156, and 158 of FIG. 17B show the effective conductivity at a contact angle of 30 degrees, 90 degrees, and 150 degrees for a mixture containing water-wet sand and clay particles with a surface conductance of $10^{-6}$ S, partially saturated with brine/water and an oil saturation of 90%.

Figure 17C:
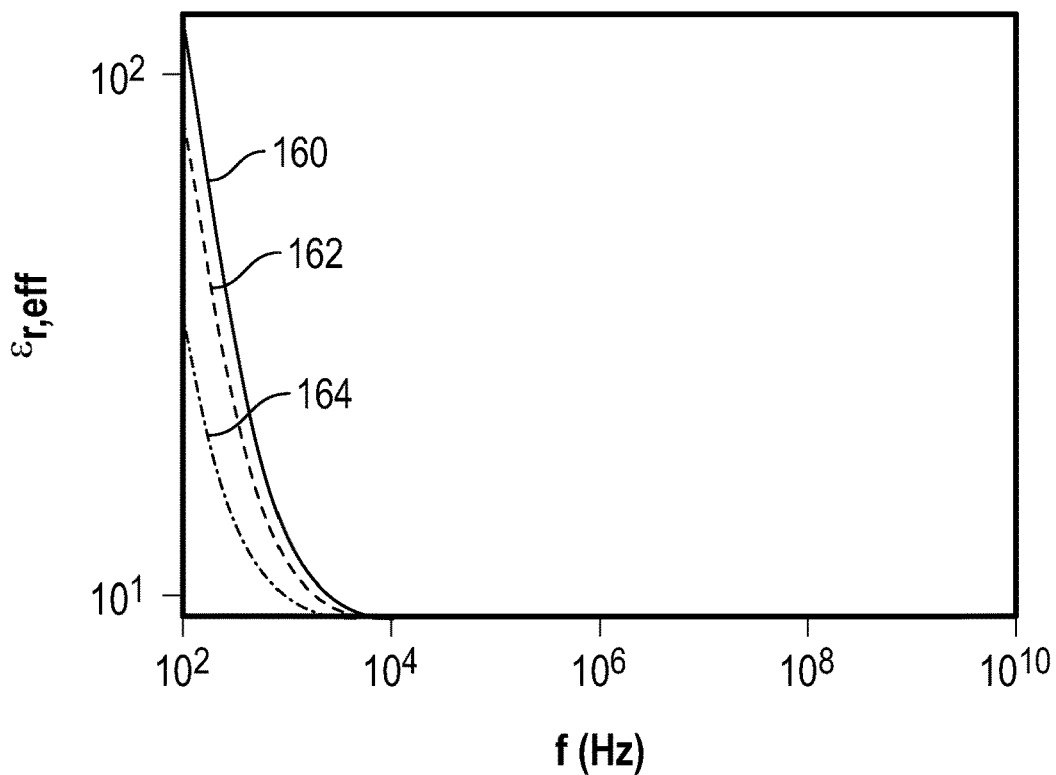
FIG. 17C shows a graph illustrating an example of determined effective permittivity for fluid-filled porous material for different contact angles with a 10% oil saturation, in accordance with an embodiment.

The curves 160, 162, and 164 of FIG. 17C show the effective permittivity at a contact angle of 30 degrees, 90 degrees, and 150 degrees for a mixture containing water-wet sand and clay particles with a surface conductance of $10^{-6}$ S, partially saturated with brine/water and an oil saturation of 10%.

Figure 17D:
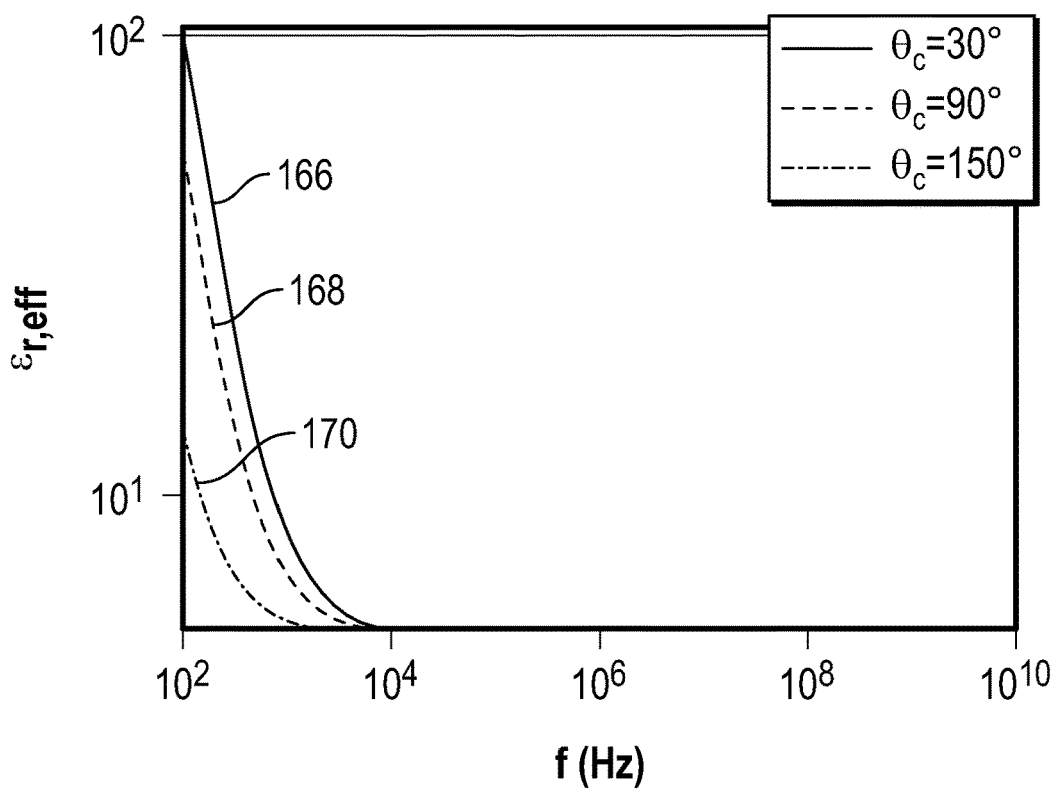
FIG. 17D shows a graph illustrating an example of determined effective permittivity for fluid-filled porous material for different contact angles with a 90% oil saturation, in accordance with an embodiment.

The curves 166, 168, and 170 of FIG. 17D show the effective permittivity at a contact angle of 30 degrees, 90 degrees, and 150 degrees for a mixture containing water-wet sand and clay particles with a surface conductance of $10^{-6}$ S, partially saturated with brine/water and an oil saturation of 90%.

In this example, the frequency dispersion of effective conductivity is relatively negligible for frequencies lower than 10 MHz, and the frequency dispersion for effective permittivity is relatively negligible for frequencies lower than 10 KHz.

As contact angle increases, i.e. the surface-charge bearing nonconductive particle becomes oil wet, the frequency dispersion of permittivity reduces. This is because the clay surface is covered more by oil, which has much less charge carriers than water and impedes the interfacial polarization in the fluid phase. The conductivity increases as contact angle decreases, because clay surface conductance will assist charge transport. At low frequency, the charge carriers quickly reach the equilibrium distribution around the surface-charge-bearing nonconductive particles' interface, so that the particles act as insulators, which lead to lower $\sigma_{eff}$ and higher $\varepsilon_{r,eff}$. This model prediction shows that the EM measurements and log responses may be acquired at low frequencies and high frequencies to capture the frequency dispersions in both permittivity and conductivity, respectively. Moreover, the effect of wettability on conductivity is higher at higher oil saturation.

Figure 18A:
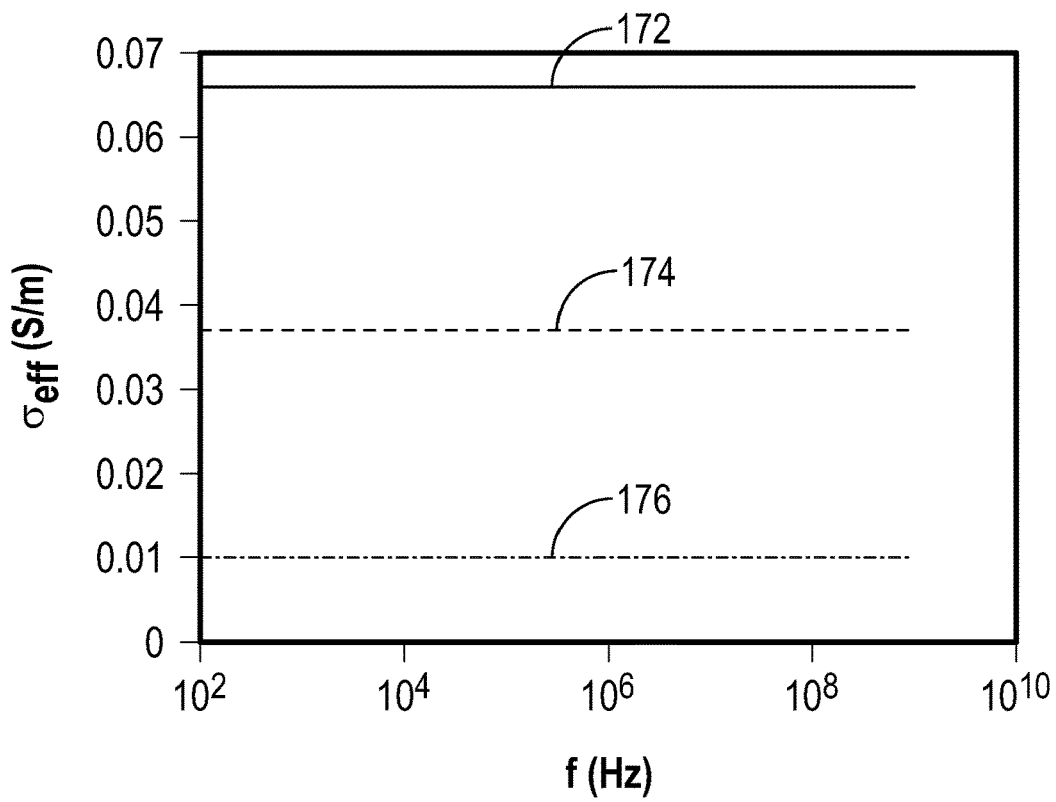
FIG. 18A shows a graph illustrating an example of determined effective conductivity for fluid-filled porous material for different amounts of oil saturation for a contact angle of 30 degrees, in accordance with an embodiment.

FIGS. 18A, 18B, 18C, and 18D (i.e., FIGS. 18A-18D) show graphs indicating the effect of oil saturation on the properties of a nonconductive solid particle. More specifically, the curves 172, 174, and 176 of FIG. 18A show the effective conductivity for a mixture containing water-wet sand and clay particles partially saturated with brine/water and an oil saturation of 10%, 50%, and 90% for a with a surface conductance of $10^{-6}$ S with a contact angle of 30 degrees.

Figure 18B:
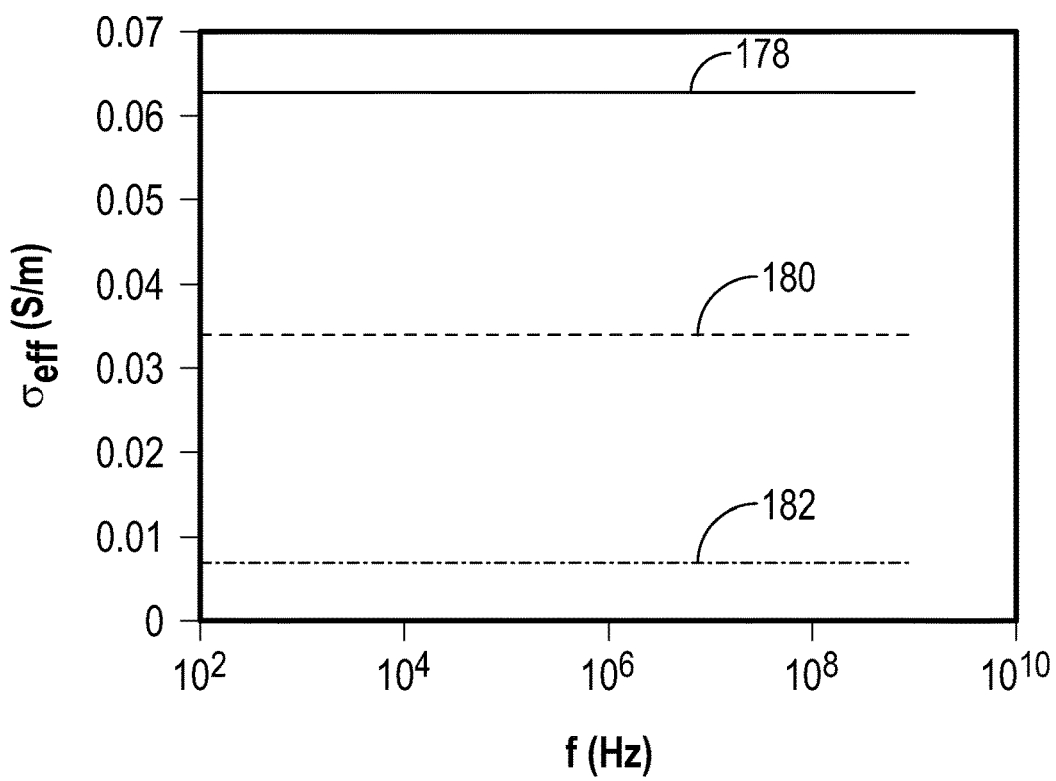
FIG. 18B shows a graph illustrating an example of determined effective conductivity for fluid-filled porous material for different amounts of oil saturation for a contact angle of 150 degrees, in accordance with an embodiment.

The curves 178, 180, and 182 of FIG. 18B show the effective conductivity for a mixture containing water-wet sand and clay particles partially saturated with brine/water and an oil saturation of 10%, 50%, and 90% for a with a surface conductance of $10^{-6}$ S with a contact angle of 150 degrees.

Figure 18C:
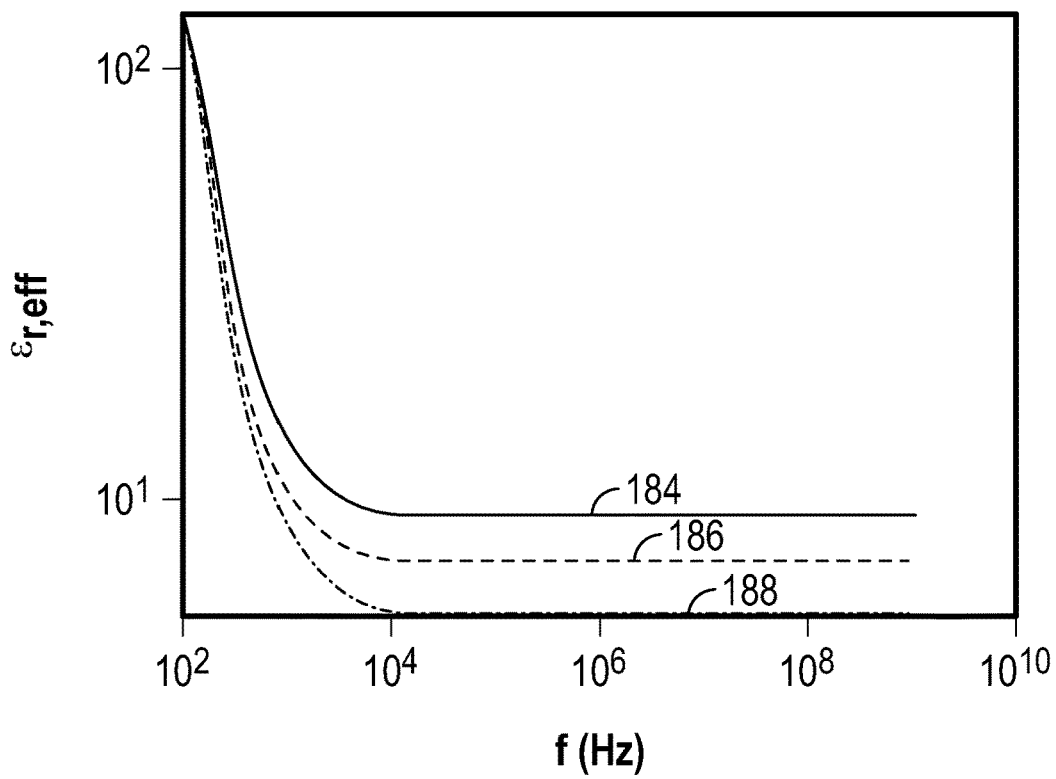
FIG. 18C shows a graph illustrating an example of determined effective permittivity for fluid-filled porous material for different amounts of oil saturation for a contact angle of 30 degrees, in accordance with an embodiment.

The curves 184, 186, and 188 of FIG. 18C show the effective permittivity for a mixture containing water-wet sand and clay particles partially saturated with brine/water and an oil saturation of 10%, 50%, and 90% for a with a surface conductance of $10^{-6}$ S with a contact angle of 30 degrees.

Figure 18D:
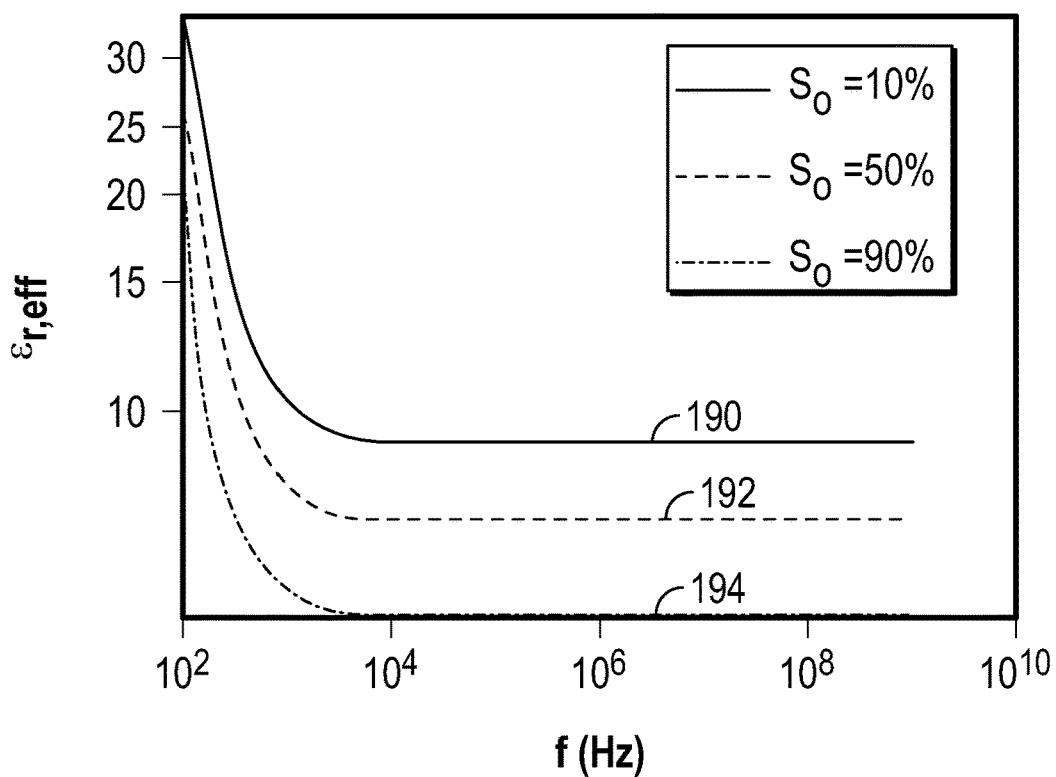
FIG. 18D shows a graph illustrating an example of determined effective permittivity for fluid-filled porous material for different amounts of oil saturation for a contact angle of 150 degrees, in accordance with an embodiment.

The curves 190, 192, and 194 of FIG. 18D show the effective permittivity for a mixture containing water-wet sand and clay particles partially saturated with brine/water and an oil saturation of 10%, 50%, and 90% for a with a surface conductance of $10^{-6}$ S with a contact angle of 150 degrees.

Figure 19A:
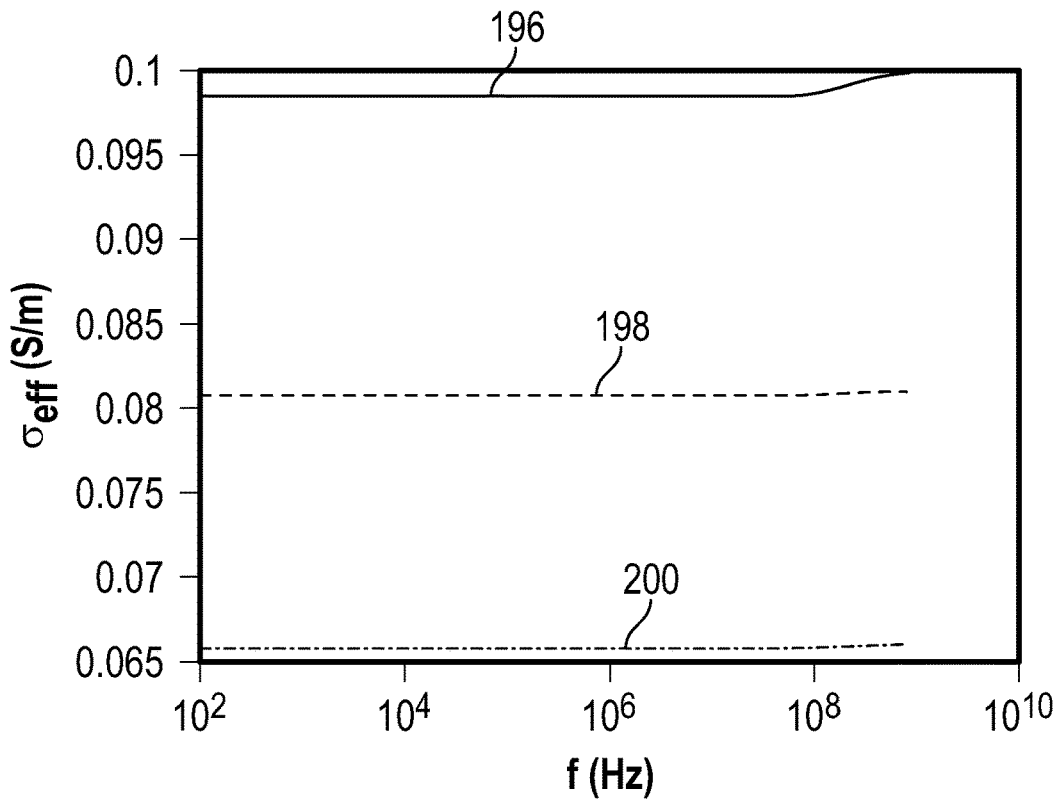
FIG. 19A shows a graph illustrating an example of determined effective conductivity for fluid-filled porous material for different surface conductance with a contact angle of 30 degrees, in accordance with an embodiment.
Figure 19B:
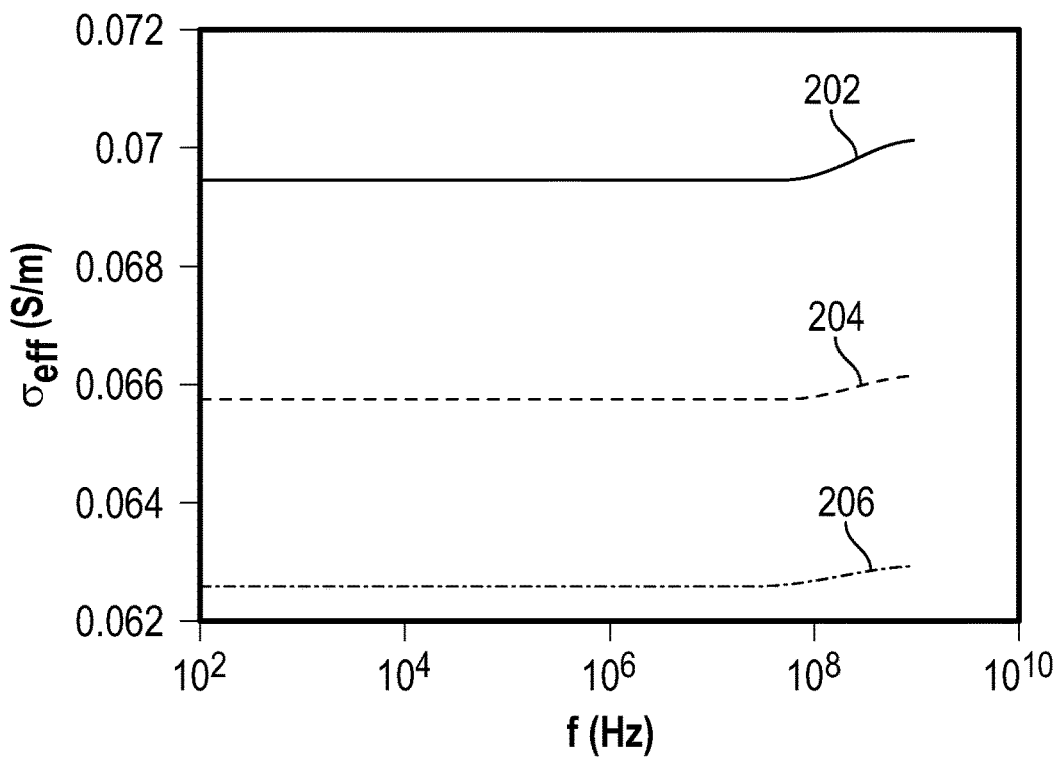
FIG. 19B shows a graph illustrating an example of determined effective conductivity for fluid-filled porous material for different surface conductance with a contact angle of 150 degrees, in accordance with an embodiment.
Figure 19C:
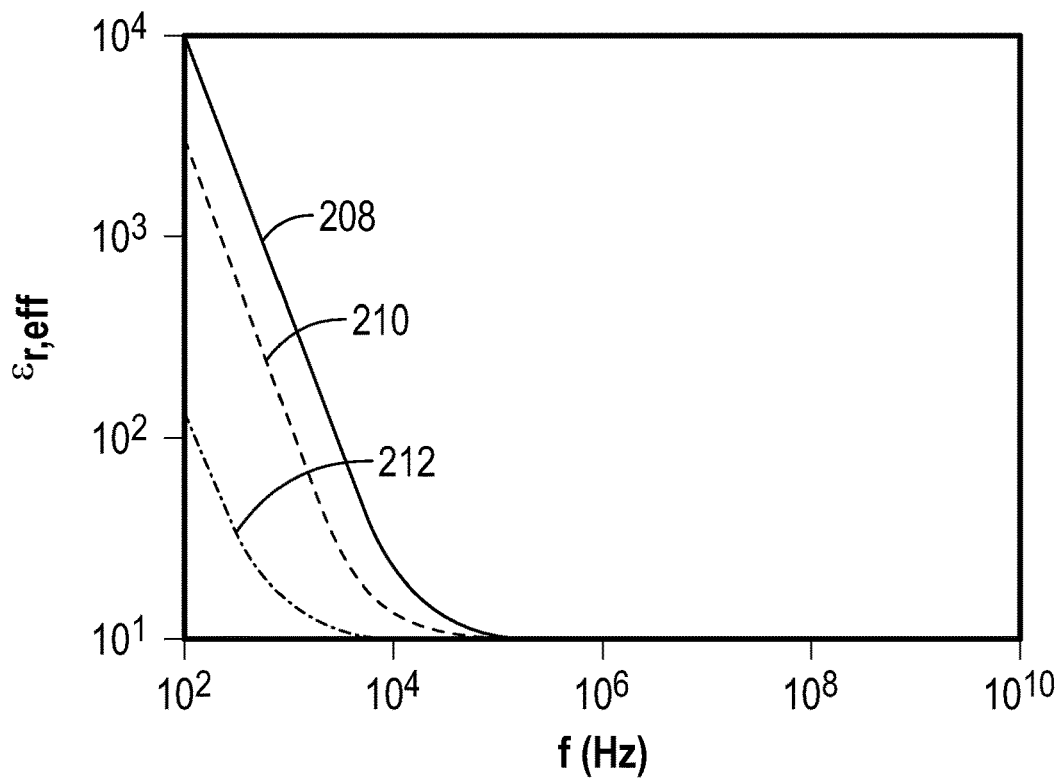
FIG. 19C shows a graph illustrating an example of determined effective permittivity for fluid-filled porous material for different surface conductance with a contact angle of 30 degrees, in accordance with an embodiment.
Figure 19D:
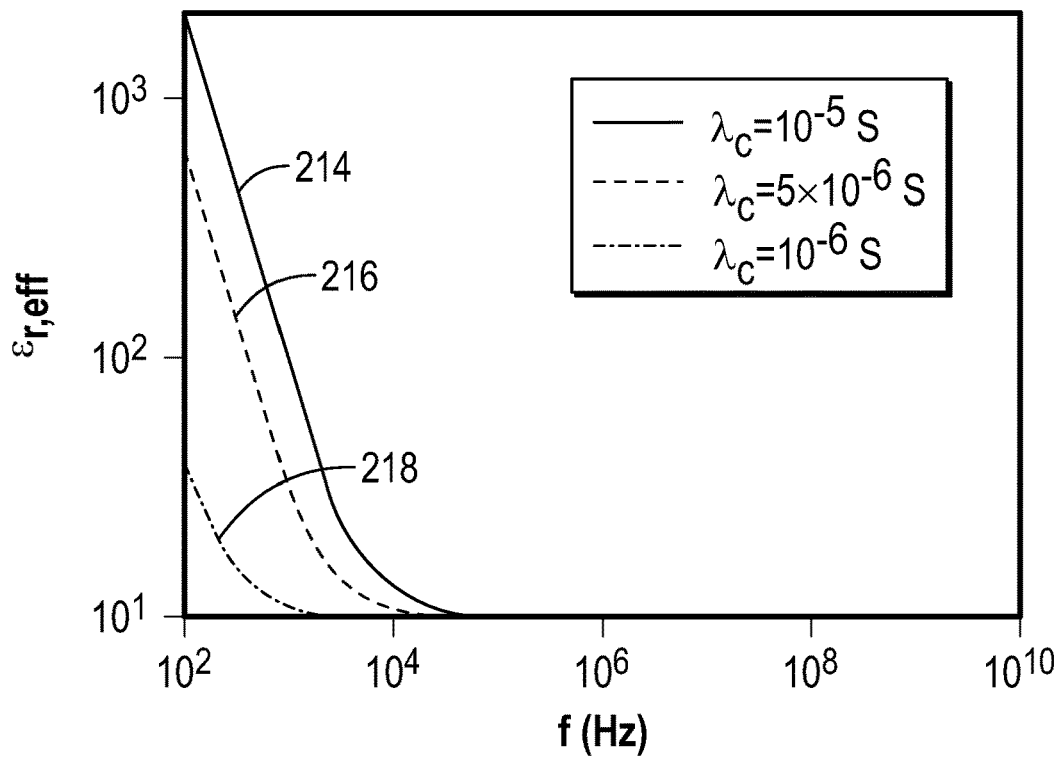
FIG. 19D shows a graph illustrating an example of determined effective permittivity for fluid-filled porous material for different surface conductance with a contact angle of 150 degrees, in accordance with an embodiment.

In this example, when comparing the different curves in FIGS. 19A and C or FIGS. 19B and C, there is negligible frequency dispersion of effective conductivity at frequency range of 100 Hz to 1 GHz, while effective permittivity shows some dispersion phenomena at frequency range of 100 Hz to 10 kHz. As oil saturation increases, both $\sigma_{eff}$ and $\varepsilon_{r,eff}$ will reduce, which has the similar trend as predicted by Archie's law and CRI model.

FIGS. 19A, 19B, 19C, and 19D (i.e., FIGS. 19A-19D) show graphs indicating the effect of surface conductance on the properties of a nonconductive solid particle. More specifically, the curves 196, 198, 200 of FIG. 19A show the effective conductivity for a mixture containing water-wet sand and clay particles partially saturated with brine/water and an oil saturation of 10% with a surface conductance of $10^{-5}$ S, $5 \times 10^{-6}$ S, and $10^{-6}$, respectively, and with a contact angle of 30 degrees.

The curves 202, 204, and 206 of FIG. 18B show the effective conductivity for a mixture containing water-wet sand and clay particles partially saturated with brine/water and an oil saturation of 10%, with a surface conductance of $10^{-5}$ S, $5 \times 10^{-6}$ S, and $10^{-6}$, respectively, and with a contact angle of 150 degrees.

The curves 208, 210, and 212 of FIG. 18C show the effective conductivity for a mixture containing water-wet sand and clay particles partially saturated with brine/water and an oil saturation of 10%, with a surface conductance of $10^{-5}$ S, $5 \times 10^{-6}$ S, and $10^{-6}$, respectively, and with a contact angle of 30 degrees.

The curves 214, 216, and 218 of FIG. 18D show the effective conductivity for a mixture containing water-wet sand and clay particles partially saturated with brine/water and an oil saturation of 10%, with a surface conductance of $10^{-5}$ S, $5 \times 10^{-6}$ S, and $10^{-6}$, respectively, and with a contact angle of 150 degrees.

When comparing the different curves in FIGS. 19A-D, it may be observed that for the smaller the surface conductance of clay, the less obvious the conductivity dispersion will be, and permittivity exhibits dispersion. As surface conductance decrease, the effective conductivity and permittivity also decrease. At low values of contact angles, i.e., water-wet state, an increase in the surface conductance of clay leads to a drastic change in both conductivity and permittivity.

Figure 20:
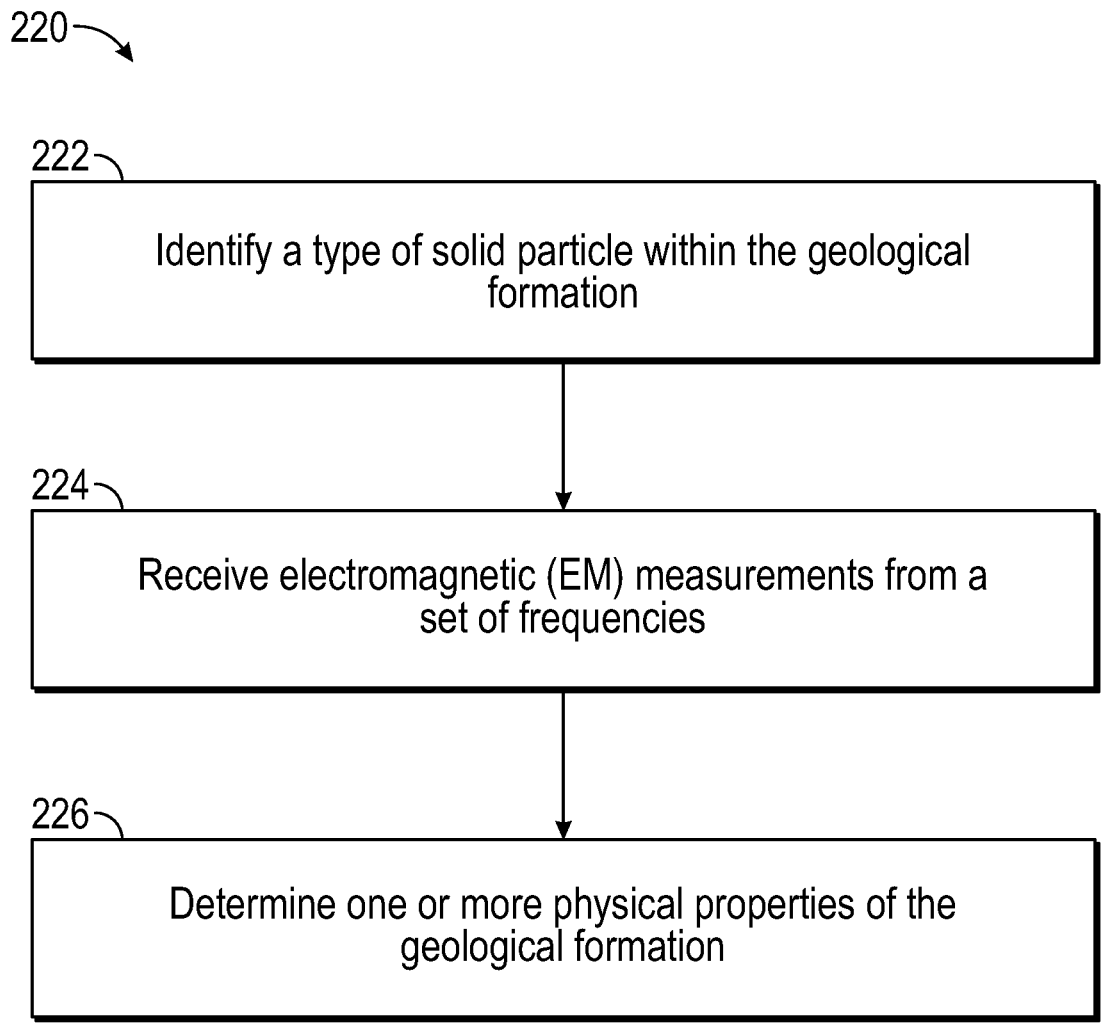
FIG. 20 is a second example of a process for determining properties of a fluid-filled formation, in accordance with an embodiment.

With the foregoing in mind, FIG. 20 illustrates an example process 220 that may be employed by the data processing system 28 to determine properties of a geological formation comprising certain types of solid particles (e.g., conductive and nonconductive) that may be used for certain oil and gas decisions, in accordance with embodiments described herein. The steps of the process 220 may be stored in the memory 32. Before proceeding, it should be noted that the process 220 is described as being performed by the processor 30 of the data processing system 28, but the process 220 may be performed by other suitable computing devices. Although described in a particular order, which represents a particular embodiment, it should be noted that the process 220 may be performed in any suitable order. Additionally, embodiments of the process 220 may omit process blocks and/or include additional process blocks.

At block 222, the processor 30 may identify a type of solid particle within the geological formation. In general, the processor 30 identifying the type of solid particle (e.g., particles) within the geological formation based on an input specifying the type of solid particles. For example, an individual may provide an input specifying that the geological formation includes nonconductive particles (e.g., clay, calcite, and quartz) or conductive particles (e.g., graphite and pyrite). In some embodiments, the processor 30 may identify the type of solid particle based on data associated with well logging measurements received by the processor. For example, the processor 30 may receive elemental data from a well logging measurement that indicates a relative percentage of certain elements. The processor 30 may compare the relative percentages to reference elemental data that indicates types of solid particles (e.g., stored in the memory 32). As such, the processor 30 may identify a type of solid particle when the received elemental data matches a particular reference elemental data for a type of solid particle. In some embodiments, the processor may At block 224, the processor 30 may receive electromagnetic measurements at a set of frequencies. In general, block 222 may occur in a general similar manner as block 52 of the process 50 of FIG. 3. For example, the processor 30 may identify a set of frequencies to perform an electromagnetic measurement based on the identified type of solid particle. That is, and as discussed herein, the material and subsurface characterization model 46 may be utilized by the processor 30 of the data processing system 28 to determine a set of frequencies that the electromagnetic well-logging tool 12 may operate to acquire electromagnetic measurements.

In some embodiments, the processor 30 may determine a type of material and subsurface characterization model 46 to use to identify the set of frequencies based on the identified type of solid particles within the geological formation. For example, the processor 30 may determine the type of material and subsurface characterization model 46 to use based on a relative conductivity (e.g., conductive, nonconductive, above or below a conductivity threshold) of regions of the geological formation, particles identified in the geological formation, or particles suspected of being in the geological formation. That is, if the identified type of solid particle corresponds to a conductive type of solid particle (e.g., graphite and pyrite), the material and subsurface characterization model 46 may be based upon the effective complex conductivity of a porous fluid-filled geomaterial containing conductive particles of any wettability (e.g., graphite particle) and fully wetted surface-charge-bearing nonconductive particles (e.g., water-wet sand and clay particles), as discussed herein. Additionally or alternatively, if the identified type of solid particle corresponds to a nonconductive type of solid particle, the material and subsurface characterization model 46 may be based upon the effective complex conductivity of a porous fluid-filled geomaterial containing surface-charge-bearing nonconductive particles (e.g., water-wet sand and mixed-wet clay particles) at any saturation of the wetting phase (e.g., water) also discussed herein. That is, the processor 30 may select one of the models described herein to determine the set of frequencies for the electromagnetic well-logging tool 12. In some embodiments, the memory 32 of the data processing system 28 may store both models (e.g., a first model based on the nonconductive particles and a second model based on the conductive particles). As such, when a received input, determination by the processor 30, or other indication specifies that the processor 30 should utilized the first model or the second model, the processor 30 may retrieve the model.

At block 226, the processor 30 may determine one or more physical properties of the geological formation using the received electromagnetic measurements as generally described with respect to block 54 of the process 50 of FIG. 4. For example, a Markov-Chain Monte-Carlo may be applied to the EM measurements received in process block 224 to determine properties such as the contact angles and other physical properties as described herein.

As one nonlimiting example of how the above-described techniques may be applied, the processor 30 may use the mechanistic model to identify the range of operating frequency within which the EM measurements and logs may be acquired for purposes of reliably estimating the desired properties of the fluid-filled porous material. According to the identified range of operating frequencies, an EM tool/equipment may be tuned to acquire the multi-frequency electromagnetic measurements and log responses. Following that, an inversion scheme coupled with a mechanistic model processes the multi-frequency electromagnetic (EM) measurements or log responses of fluid-filled porous materials to estimate the desired properties of the fluid-filled porous material. The mechanistic model is coupled with a Markov-Chain Monte Carlo (MCMC) inversion scheme to simultaneously estimate the water saturation, clay surface conductance, brine/pore-filling-fluid salinity/conductivity, and the contact angle of the particles giving rise to interfacial polarization phenomena.

Accordingly, aspects of the present disclosure provide techniques to quantify the multi-frequency complex conductivity and/or complex permittivity of fluid-filled porous materials so as to account the effects of contact angle or wettability of conductive or surface-charge-bearing nonconductive particles (or other types of solid particles that give rise to interfacial polarization) on the conductivity and permittivity and their frequency dispersions (i.e., frequency-dependent behavior). Estimate the contact angle (wettability) of conductive particles (e.g. graphite and pyrite) and surface-charge-bearing nonconductive particles (e.g. clay, calcite, and quartz) in fluid-filled porous geomaterials (in subsurface or on surface) or other fluid-filled porous materials. The disclosed techniques may be used to simultaneously estimate fluid saturations, contact angle of conductive particles, contact angle of surface-charge-bearing particles, fluid conductivity/salinity, surface conductance of solid particles, diffusion coefficients of charge carriers in various material constituents, and volume fractions of fluid and solid components in the material. Further, the disclosure techniques may enable for simultaneously estimation wettability (i.e., depends on contact angle) and oil saturation (i.e., depends on water saturation). Further still, the disclosed techniques may be used to estimate contact angle of solid particles/grains that can give rise to interfacial polarization when surrounded by fluid phases/components for various wettability scenarios. Even further, the disclosed techniques may be used to quantify the effects of contact angle or wettability of solid grains/particles (i.e., conductive or surface-charge-bearing nonconductive particle) on the net charge transport and net charge accumulation as a function of the frequency of the external electromagnetic field. The net charge transport determines the conductivity and net charge accumulation determines the permittivity that govern the electromagnetic measurements and log responses of the fluid-filled porous material. Additionally, the disclosed techniques may be used to quantify the multi-frequency complex conductivity and/or complex permittivity of fluid-filled porous materials so as to account the effects of contact angle or wettability of conductive or surface-charge-bearing nonconductive particles (e.g., other types of solid particles that give rise to interfacial polarization) on the conductivity and permittivity and their frequency dispersions (i.e., frequency-dependent behavior).

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method comprising:
  identifying at least one type of solid particle within the geological formation;
  identifying a frequency range for an electromagnetic measurement based on the identified at least one type of solid particle within the geological formation;
  conveying an electromagnetic well-logging tool into a wellbore within a geological formation, wherein the electromagnetic well-logging tool includes a transmitter and a receiver;
  producing one or more electromagnetic waves using the transmitter of the electromagnetic well-logging tool, wherein the one or more electromagnetic waves interact with the geological formation;
  receiving, by the receiver, the one or more electromagnetic waves after the one or more electromagnetic waves have interacted with the geological formation;
  generating a plurality of electromagnetic (EM) measurements associated with the geological formation based on the one or more electromagnetic waves received by the receiver, wherein the plurality of EM measurements are within the identified frequency range;
  determining a contact angle associated with solid particles within the geological formation based on the generated plurality of EM measurements, wherein the contact angle quantifies a wettability of the at least one type of solid particle within the geological formation.

2. The method of claim 1, wherein the at least one type of solid particle comprises a conductive particle.

3. The method of claim 1, wherein the at least one type of solid particle comprises a surface-charge bearing nonconductive particle.

4. The method of claim 1, wherein identifying the frequency range is performed using a mechanistic model, wherein the mechanistic model is based upon an effective complex conductivity of a porous fluid-filled geomaterial containing conductive particles of any wettability and fully wetted surface-charge-bearing nonconductive particles.

5. The method of claim 1, wherein identifying the frequency range is performed using a mechanistic model, wherein the mechanistic model is based upon an effective complex conductivity of a porous fluid-filled geomaterial containing surface-charge-bearing nonconductive particles at a saturation of a wetting phase.

6. The method of claim 1, comprising:
  providing as an input to a mechanistic model, one or more properties to be determined using the plurality of EM measurements and data indicative of a composition of the geological formation, wherein the one or more properties comprise the contact angle, and wherein the mechanistic model correlates one or more fluid phases, compositions, or both, to the contact angle of the at least one type of solid particle and correlates an interfacial polarization of the at least one type of solid particle to the contact angle of the at least one type of solid particle; and
  receiving, as an output generated from the mechanistic model, the frequency range.

7. The method of claim 6, wherein the mechanistic model is developed based on solving a Young-Laplace equation to determine a spreading of oil and water phase around a conductive particle, invoking a Poisson-Nernst-Planck (PNP) equation to quantify a dipolarizability of a partially wetted graphite particle, and using an effective medium model to combine the interfacial polarization effects of nonconductive particles and conductive particles.

8. The method of claim 1, wherein the contact angle is determined based on the generated plurality of EM measurements using a frequency-dependent complex conductivity, a frequency-dependent complex permittivity, or both associated with the type of solid particle within the geological formation.

9. The method of claim 1, wherein the frequency range corresponds to where frequency dispersions in conductivity, permittivity, or both of the at least one type of solid particle are measureable.

10. A system, comprising:
  a non-transitory machine-readable medium storing a first mechanistic model and a second mechanistic model;
  a processor configured to execute instructions stored in the non-transitory, machine readable medium to perform operations, comprising:
    identifying a type of solid particle present within a geological formation;
    identifying at least one model to use based on a relative conductivity of the type of the solid particle, wherein the model comprises the first mechanistic model, the second mechanistic model, or both;
    receiving, as an input to the identified at least one model, one or more inputs indicative of estimated properties of the porous, fluid-filled geological formation, wherein the mechanistic model correlates one or more fluid phases, compositions, or both, to a contact angle of at least one type of solid particle and correlates an interfacial polarization of the at least one type of solid particle to the contact angle of the at least one type of solid particle;
    generating, as an output by the identified at least one model, a set of frequencies to measure by an electromagnetic well-logging tool, wherein the set of frequencies corresponds to where frequency dispersions in conductivity, permittivity, or both are measureable, and
  the electromagnetic well-logging tool having a transmitter and a receiver, wherein:
    the transmitter is configured to produce one or more electromagnetic waves;
    the one or more electromagnetic waves interact with the geological formation;

the receiver is configured to receive the one or more electromagnetic waves after the one or more electromagnetic waves have interacted with the geological formation; and the electromagnetic well-logging tool is configured to generate a plurality of electromagnetic (EM) measurements within the set of frequencies based on the one or more electromagnetic waves received by the receiver.

11. The system of claim 10, wherein the set of frequencies comprises a plurality of discrete frequencies.

* * * * *